(12) United States Patent  
Ashwood

(10) Patent No.: US 8,397,011 B2  
(45) Date of Patent: Mar. 12, 2013

(54) SCALABLE MASS DATA STORAGE DEVICE

(76) Inventor: Joseph Ashwood, San Jose, CA (US)

( * ) Notice: Subject to any disclaimer, the term of this patent is extended or adjusted under 35 U.S.C. 154(b) by 516 days.

(21) Appl. No.: 11/868,005

(22) Filed: Oct. 5, 2007

(65) Prior Publication Data

US 2009/0094406 A1 Apr. 9, 2009

(51) Int. Cl.
*G06F 12/00* (2006.01)

(52) U.S. Cl. .............................. 711/5; 711/117; 711/165

(58) Field of Classification Search .............. 711/5, 117, 711/167
See application file for complete search history.

(56) References Cited

U.S. PATENT DOCUMENTS

| | | | |
|---|---|---|---|
| 5,208,491 A | 5/1993 | Ebeling et al. | |
| 5,214,768 A | 5/1993 | Martin et al. | |
| 5,229,647 A | 7/1993 | Gnadinger | |
| 5,396,596 A | 3/1995 | Hashemi et al. | |
| 5,430,859 A | 7/1995 | Norman et al. | |
| 5,432,729 A | 7/1995 | Carson et al. | |
| 5,471,603 A | 11/1995 | Yokote et al. | |
| 5,502,667 A | 3/1996 | Bertin et al. | |
| 5,615,159 A | 3/1997 | Roohparvar | |
| 5,708,668 A | 1/1998 | Styczinski | |
| 5,712,579 A | 1/1998 | Duong et al. | |
| 5,717,631 A * | 2/1998 | Carley et al. ................. | 365/174 |
| 5,742,181 A | 4/1998 | Rush | |
| 5,798,961 A | 8/1998 | Heyden et al. | |
| 5,867,733 A | 2/1999 | Meyer | |
| 5,966,027 A | 10/1999 | Kapusta et al. | |
| 6,038,627 A | 3/2000 | Plants | |
| 6,141,287 A | 10/2000 | Mattausch | |
| 6,212,194 B1 * | 4/2001 | Hsieh ............................ | 370/414 |
| 6,498,791 B2 | 12/2002 | Pickett et al. | |
| 6,567,290 B2 | 5/2003 | Alexanian | |
| 6,633,947 B1 | 10/2003 | Holman et al. | |
| 6,678,788 B1 | 1/2004 | O'Connell | |
| 6,809,947 B2 | 10/2004 | Alexanian | |
| 6,925,531 B2 * | 8/2005 | Konshak et al. ............... | 711/114 |
| 7,020,001 B2 | 3/2006 | Alexanian | |
| 7,024,506 B1 | 4/2006 | Harrington | |
| 7,035,952 B2 | 4/2006 | Elliott et al. | |
| 7,277,343 B1 * | 10/2007 | So et al. ........................ | 365/211 |

(Continued)

FOREIGN PATENT DOCUMENTS

EP 0256815 A2 2/1988

OTHER PUBLICATIONS

Extended European Search Report and Written Opinion, dated Feb. 1, 2011.

*Primary Examiner* — Jared Rutz
*Assistant Examiner* — Gurtej Bansal
(74) *Attorney, Agent, or Firm* — Hoffmann & Baron, LLP

(57) ABSTRACT

A scalable data storage device which includes non-volatile memory uses a networked bus system which can be employed on a single memory storage chip level or in a multi-chip package (MCP). The scalable data storage device uses data routing modules which are adapted to store incoming data and send outgoing data thereby providing decoupling of the networked buses. This arrangement enables significantly higher data transfer rates, surpassing DRAM SSDs at a fraction of the size and cost, provides increased volumetric density (1 TB in less than 1 cubic inch), and permits concurrency of operations. The scalable data storage device can be engineered to have a rewrite capability of over 500 times that of Flash RAM and can scale down to 8 bits and up to exabytes, yottabytes and beyond. The scalable data storage device may be used in a wide range of applications from large data centers to small consumer electronic products.

28 Claims, 28 Drawing Sheets

U.S. PATENT DOCUMENTS

| | | |
|---|---|---|
| 7,400,248 B2 * | 7/2008 | Yarvis .................. 340/572.1 |
| 7,453,884 B2 * | 11/2008 | Ma ...................... 370/395.32 |
| 7,543,177 B2 * | 6/2009 | Bullen et al. ................ 714/6 |
| 2002/0069317 A1 | 6/2002 | Chow et al. |
| 2002/0174297 A1 | 11/2002 | McDonald et al. |
| 2003/0145176 A1 | 7/2003 | Dvir et al. |
| 2003/0163606 A1 * | 8/2003 | Fukaishi et al. ................ 710/1 |
| 2004/0001479 A1 | 1/2004 | Pounds et al. |
| 2004/0001579 A1 | 1/2004 | Feinberg et al. |
| 2004/0083325 A1 | 4/2004 | Rabinovitz et al. |
| 2004/0117549 A1 | 6/2004 | Nakamura |
| 2004/0148460 A1 | 7/2004 | Steinmetz et al. |
| 2006/0168398 A1 | 7/2006 | Cadaret |
| 2006/0206662 A1 | 9/2006 | Ludwig et al. |
| 2006/0274584 A1 | 12/2006 | Flournoy et al. |
| 2007/0033362 A1 | 2/2007 | Sinclair |
| 2007/0140020 A1 | 6/2007 | Torabi et al. |

* cited by examiner

SCALABLE MASS DATA STORAGE DEVICE

BACKGROUND

Current data storage devices have severe limitations. Hard Disk Drives (HDDs) are the default mass data storage technology of choice for the majority of applications: datacenters, desktops, laptops, media center computers, and some consumer electronic products. This widespread use stems from being a low cost solution. However, HDDs apparent low cost comes with severe failings and limitations.

HDDs are not solid state and the relative low cost of HDDs comes with many failings. HDDs are implemented using a stack of disks, also referred to as platters, on which regions are magnetized with different polarities to represent data being stored. The disks spin on a spindle and can be read from or written to using a head. Each side (top and bottom) of a given disk has a corresponding head for reading and writing data, with all heads tied to a single armature. Due to the mechanical nature of HDDs and the configuration of the disks and the heads, HDDs are inherently fragile. HDDs are particularly vulnerable to damage from sudden mechanical shocks, which may cause the disks to collide with the heads. The necessity of thin platters in an effort to reduce power consumption and inertia, combined with bringing the read/write head ever closer to the platter for increased data density makes the head crashes increasingly inevitable. As a result, a drop of even a few feet can have devastating effects on the lifetime of an HDD. The volume space of the same heads and platters that cause the fragility and unreliability also prevent HDDs from achieving significant volumetric density, with the most capacious HDDs (1 TB drive in a standard 3.5 inch drive form factor) only delivering 39.5 GB per cubic inch.

Additionally, the power consumption from moving the heads and spinning the platters is also of major concern. Modern HDDs can consume 20 watts of power when running simply because it takes that much power to keep the platters spinning at the appropriate speed and to move the stack of heads at the extreme speeds needed. This power consumption drives the real cost of an HDD up substantially, making them, in fact, sometimes more expensive than other technologies.

HDDs are also far from quiet. The simple fact is that the spinning platters generate sound, and the moving heads deliver the clicking sound that everyone associates with a working HDD. In fact, most HDDs are rated at about 28 to 30 decibels, making them difficult for many people to accept in various environments, including, among others, quiet environments such as media center computers.

While HDDs have made progress in apparent concurrency with the near universal introduction of command queuing, the fact remains that this simply allows the drive to reorder instructions for improved performance, and no currently available drive offers real concurrency of operations. This would require multiple heads per platter, which is something that would raise the costs of HDDs to unacceptable levels. On top of all these shortcomings, HDDs deliver a mere 125 MB/sec maximum read/write speed.

While the rest of the computer has been following Moore's law, HDDs have not. Instead they have been moving in fits and starts, with advances like the Giant Magnetoresistive Effect coming less frequently and offering less improvement with each generation, leaving HDD capacity over 20 years behind Moore's law, and unlike all other components the basic operation has remained unchanged since IBM introduced the IBM 350 in 1956. The speed gains are actually worse with HDD read/write speeds 30 years behind Moore's law. This means that no matter how inexpensive HDDs appear, they are at best antiquated technology. Further, there is no foreseeable method for HDDs to do anything but fall further behind.

It would seem apparent that many of these flaws would go away by moving to a solid-state drive (SSD), but that is not necessarily the case. In Flash-based SSDs, many of the problems associated with HDDs remain. Generally available Flash SSDs suffer the major flaw of being almost entirely consecutive in operation and therefore incapable of concurrent operations. They are generally constrained by designs that were considered cutting edge decades ago, with limits that have been known for nearly as long. This creates major problems for Flash SSDs moving forward as the performance is limited by these designs, keeping Flash SSDs limited to only those areas that do not require great amounts of speed or capacity. Flash SSDs are solid-state, so they do not suffer from fragility as do HDDs, but the internal design and independent cell speed prevents them from currently operating faster than approximately 32 MB/sec, making Flash SSDs the slowest data storage technology in widespread use today.

Although Flash SSDs are used primarily because they allow for the smallest form factor, the total volumetric density of Flash SSDs is poor. In fact, Flash SSDs have lower volumetric density than HDDs. Further, the volumetric density will remain low due to the fact that flash chips contain more resin than flash cells, leaving the highest capacity Flash SSD available today with a total volumetric density of only 14.9 GB per cubic inch. Also, Flash SSDs wear out faster than HDDs, ie., they have a shorter life. Current Flash cells can only be written a maximum of 1 million times.

Flash cells have a well established problem that each time a cell is written, the cell degrades a small amount. Eventually the cell becomes unwritable rendering that Flash page (a collection of Flash cells that are read and written together) containing the cell unusable. Flash chips have write balancing in order to help combat this, but file usage in a computer system actually works against the write balancing. Since the vast majority of files are written once in the lifetime of the computer, the write balancing only balances between a very limited number of pages, resulting in those pages becoming exhausted.

Furthermore, Flash SSDs do not scale. In view of the way the internal structures are designed, the only method to increase capacity without massive reengineering is to attach multiple dies to a single bus, thereby increasing the parasitic drains and capacitances that eventually slow the entire chip to the point where it becomes unusable. As a result, either small capacity Flash SSD have to be accepted or larger Flash dies have to be built, which in turn raises the cost per functioning cell.

Even with multiple separately manufactured dies, the internal design of Flash SSDs prevent concurrency, providing no ability to perform multiple tasks at once, and limiting performance in yet another dimension. These limitations and the associated costs have led many organizations to use Flash ICs directly, instead of a complete Flash SSD. This usage has exactly the same problems, but in some instances can reduce the per unit monetary costs by a small amount.

The other type of SSD is DRAM-based. These DRAM SSDs make use of volatile memory and depend on a continual supply of electricity to prevent data loss. The main benefit of a DRAM SSD is speed, with some DRAM SSDs capable of 24 GB per second, and a DRAM SSD that doesn't offer at least 300 MB per second is difficult to find. DRAM SSDs have several major flaws. By far the largest flaw is price. A 1 TB DRAM SSD costs approximately $1 million. (Gear6 CACHEfx G400). The space occupied by DRAM. SSDs is also quite large with a volumetric density of only about 0.02 GB per cubic inch (TMS RamSan-400) giving DRAM SSDs by far the lowest total volumetric density, i.e., the lowest capacity per form factor, of any data storage technology in widespread use today.

Further DRAM SSDs do not scale. The internal design suffers in exactly the same way as Flash SSDs. To expand capacity, manufacturers add additional DRAM chips to one of a small number of buses and each new chip lowers the performance of that bus a small amount, until the entire system noticeably slows down.

Additionally, a DRAM SSD can consume 2400 watts of power per TB making it the most costly data storage technology in terms of power consumption as well. Consuming so much power, it is necessary to have substantial cooling fans to dissipate the heat produced, adding not just noise, often louder than HDDs, but also adding moving components that can fail leading to destruction of the data on the DRAM SSD. Thus, DRAM SSDs are simply unsuitable for the vast majority of situations, and are only considered as an option when the raw performance is so critical as to be worth the enormous costs in equipment, power consumption, air conditioning, volatility, space and noise.

In sum, no current data storage technology provides high volumetric density (data capacity per volume of space). No current data storage technology provides scalability. No current data storage technology provides substantial concurrency. No current data storage technology provides a viable technology to meet the demands of the future.

Thus, what is needed is a data storage device that provides solid-state durability, very high speeds (GB/sec), very high volumetric density (>1 TB/cubic inch), a high level of concurrency, scalability and power consumption that is economically viable.

SUMMARY OF THE INVENTION

The present invention involves a scalable data storage device, which includes non-volatile memory, uses a networked bus system and can be solid-state or MEMS-based. The scalable data storage device of the present invention uses data routing modules which are adapted to store incoming data and send outgoing data thereby providing decoupling of the networked buses. This arrangement enables significantly higher data transfer rates, surpassing DRAM SSDs at a fraction of the size and cost, provides increased volumetric density (1 TB in less than 1 cubic inch), and permits concurrency of operations. The scalable data storage device of the present invention can be engineered to have a rewrite capability of over 500 times that of Flash RAM and can scale down to 8 bits and up to exabytes, yottabytes and beyond. The scalable data storage device of the present invention may be used in a wide range of applications from large data centers to small consumer electronic products. The data storage device of the present invention is designed to use currently well developed, proven components with scientific principles that are also well understood to implement the data storage device as a chip, a multi-chip package (MCP), or as part of a System-on-a-Chip (SoC) integrating the data storage device with other devices in a single logical package.

In accordance with preferred embodiments of the present invention, a data storage device and architectures for implementing data storage which overcome the disadvantages of currently available storage devices are described.

In accordance with an embodiment of the present invention, a scalable mass data storage device includes a plurality of data routing modules configured to route information within the data storage device based upon at least one identified provided in the information. The data routing modules are electrically connected to a plurality of memory modules by way of various architectures described herein. The memory modules are configured to receive information from the routing modules based upon matching its address to the identifier. At least one memory module includes non-volatile memory for storing at least a portion of the information.

The data storage device further includes at least two buses through which the information is routed. The data routing modules are configured to store incoming data and transmit outgoing data thus enabling separate routing and memory modules to perform operations concurrently. Specifically, the buses are decoupled by the routing modules such that the routing modules transmit information to the memory modules through the system of decoupled buses. By decoupling the involved buses, the data routing module of the present invention enables the buses to function at different frequencies and electrical levels in order to reduce power consumption by running the less used bus at a lower rate than the more used bus. For example, in a two tier hierarchal structure, the bus coupling the outer routing module to the inner routing module can operate at 1 GHz, while the bus coupling the inner routing module to the memory module can run at 256 MHz.

The memory modules may operate independently and concurrently to store data or retrieve data that has been stored in the data storage device. The memory modules may be implemented based on an integrated, non-volatile Redundant Array of Independent Drives (RAID). Each of the memory modules may be uniquely identified so that each of the memory modules is independently addressable. The memory modules include memory for storing data received by the memory modules. Preferably, at least one memory module includes non-volatile memory, while other memory modules can include non-volatile memory and/or volatile memory. The memory can be, for example, a quantity of Flash memory, such as NAND Flash memory, magnetoresistive random access memory (MRAM), phase change random access memory (PRAM), ferroelectric random access memory (FeRAM), carbon nanotube memory, optical or holographic memory, Micro-electromechanical System (MEMS) based memory, or any other viable storage technology.

In view of the decoupling of the buses by the data routing modules, the data storage device of the present invention may be designed to include a low power mode of operation thus enabling greater battery life in mobile devices. A data storage device formed in accordance with the present invention including data routing modules and memory modules using Flash RAM as described herein, can consume less than about 150 mW of power by selectively powering on modules as necessary. By powering modules only when the module is needed, at any given time there will generally be no more than four (4) memory modules and two (2) data routing modules powered. Even with this selective power mode, the data storage device of the present invention can achieve four (4) times the data transfer rate of Flash while consuming approximately the same amount of power.

The data storage device of the present invention also outperforms battery operated HDDs by operating at speeds 1.5 to 9 times that of HDDs. Thus, the difference in power consumption and performance in a laptop between the present invention and HDDs provides 1 IP to 50% improvement in battery life in laptops and up to 1200% improvement in some consumer electronic devices. The data storage device of the present invention including a low power mode can be adjusted and customized to deliver the desired balance between data transfer rate and power consumption.

In full power mode, embodiments of the present invention can deliver 512 times the data transfer rate of Flash and 130 times that of HDDs. Furthermore, under full power operation, the data storage device of the present invention achieves a data transfer rate exceeding that of DRAM SSDs at a fraction of the size and cost.

Another important feature of the data storage device of the present invention is scalability. Based upon the use of data routing modules to decouple the multiple networked buses, the data storage device of the present invention provides significantly increased data transfer rates which scale with capacity. For example, one embodiment using a hierarchal bus architecture can be used well into the hundreds of petabytes.

In accordance with embodiments of the present invention, a solid state data storage device can be implemented with capacities that scale down to as little as 8 bits and up to extremely high levels, easily achieving not just petabytes, but even yottabytes and beyond. The data storage device of present invention can have a volumetric density easily exceeding 1 TB per cubic inch, data access speeds that can be substantially less than 1 ms, and data throughputs of 16 GB per second per TB, all in a device that consumes less than 150 mW of power.

The data storage device of the present invention is designed to use currently well developed, proven components with scientific principles that are also well understood to implement the data storage device as a chip, a multi-chip module (MCM), or as part of a System-on-a-Chip (SoC) integrating the data storage device with other devices in a single logical package. As a solid-state device, the embodiments of the present invention can reap the benefits of having no moving parts, being silent, reliable, durable and rugged. Thus, the data storage device of the present invention can use proven technology to achieve the speed, capacity, power consumption and ruggedness that outperforms any current data storage technology to date.

The data storage device formed in accordance with the present invention has the unique capability to absorb and utilize advantages of data storage technology from the currently widely available Flash memory, PRAM, MRAM, FeRAM, MEMS based technology or any combination of these, as well as any other type of non-volatile memory that becomes viable in the future. In some embodiments, the data storage devices may include both non-volatile and volatile memory in the memory to provide increased performance in an economical device.

As noted above, embodiments of the present invention support concurrency at the deepest level. For example, a hierarchical implementation can be used that is capable of hundreds of concurrent operations, and with simple modifications, is capable of any number of concurrent operations. With this concurrency comes scalable read/write performance. Even if built of Flash RAM capable of only 32 MB per second (MB/s), a 1 TB data storage device implemented in accordance with embodiments of the present invention can achieve 16 GB/s of throughput. The overall speed increases substantially linearly with capacity. Therefore, a X TB data storage device formed in accordance with the present invention is capable of a 16*X GB per second throughput, allowing a 1.5 TB implementation to match, and a 2 TB implementation to exceed, the speed of the fastest mass data storage device currently available, at a fraction of the size and cost.

In one embodiment of the present invention, a hierarchal (or tree-based) bus structure is implemented. A data interface module connects to one or more data routing modules at a first level, each of which can independently connect to more data routing modules at a second level. The hierarchy can continue for a number of levels, where each of the data routing modules of a level can independently connect to more data routing modules of the next level. Thus, as previously described, the data routing modules decouple the buses in the architecture to allow concurrent operations and achieve significantly increased data transfer rates. Memory modules can be at the bottom of the hierarchy (i.e. the last level) where a group of memory modules can connect to each data routing module of the previous level. The memory modules may include non-volatile memory with some routing and caching components. Each data routing module can handle processing and scheduling of data transfers between the data interface module and the memory modules.

Alternative embodiments may be implemented to interconnect various data routing modules at the same or different levels in the hierarchy to increase maximum throughput and to provide for recovery from any internal connection degradation. Multiple data interface modules can be used to scale the external speed through additional buses, or limit access to data areas based on the bus, among other uses. In some embodiments, the memory modules and routing modules can be integrated. Such integration may be useful when considering prioritization of data and data transfer. Alternative connectivity implementations are also contemplated by the present invention, such as ring layouts, star configurations, multi-tap bus configuration, and other configurations available to those skilled in the alt.

Another advantage of the data storage device of the present invention related to remapping. The data storage device of the present invention is capable of maintaining a section as normally unavailable to use for remapping of damaged or failing areas in order to increase the available number of read/write cycles by substantial amounts. The present invention can achieve 500 times the rewrite capability of Flash memory by remapping dead or dying pages and/or modules to spare modules within the device, i.e., dead memory pages or modules are logically removed upon detection, and reassigned a new address. This remapping also allows for any manufacturing errors to be compensated for through remapping the mis-manufactured pages or modules to spare locations. In one embodiment of the present invention, for example, implementing a 1 TB data storage device, 10% additional pages can result in approximately 500 times as many file system write cycles.

As noted previously, the data storage device of the present invention may be implemented using commonly available standard components, along with non-volatile memory. As a result, the data storage device can be constructed at any lithographic level desired. Thus, the same design may be used for the foreseeable future, scaling in performance and capacity without a major reengineering effort.

In one embodiment, the data storage device can include at least one data routing module, memory modules, a first bus, and a second bus. The at least one data routing module is configured to route information within the data storage device based on at least one identifier. The memory modules are configured to receive information from the at least one data routing module. At least one of the memory modules includes non-volatile memory for storing at least a portion of the information. Information is routed through the first and second buses where the first and second buses are decoupled by the at least one data routing module to permit concurrent and/or independent operation of the first and second buses. The at least one data routing module is configured to route information to at least one of the memory modules through at least one of the first bus or the second bus.

In a further embodiment, the data storage device can include data routing modules and buses. The data routing modules are configured to route information to a storage destination in the data storage device based on at least one identifier. At least one of the data routing modules includes non-volatile memory for storing at least a portion of the information. Information is routed through the buses where at least two of the buses are decoupled by one of the data routing modules to permit concurrent and/or independent operation of the buses. The data routing modules are configured to route the information through at least one of the buses to a storage destination.

In yet a further embodiment, a data storage device is disclosed that includes memory modules, at least one data interface module, and data routing modules. At least one of the memory modules includes non-volatile memory for storing data. The at least one data interface module facilitates communication between the memory modules and an external device. The data routing modules each have at least two target queues. Each of the at least two target queues identifies a unique path for routing the information. At least one of the data routing modules is configured to receive information to be routed from the at least one data interface module, separate the information into the at least two target queues based on the destination of the information, and route the information to the destination via the unique path, the destination corresponding to one or more of the memory modules. The information includes at least one identifier associated therewith and the at least one identifier identifies the destination for the information.

In still a further embodiment, a method for routing and storing data in an integrated data storage device is disclosed. The method includes providing data routing modules configured to route information within the data storage device based on at least one identifier and providing at least two memory modules. The at least two memory modules are configured to receive information from the data routing modules and at least one of the memory modules includes non-volatile memory for storing at least a portion of the information. The method also includes providing first and second buses through which the information is routed, decoupling the first and second buses with at least one of the data routing modules to permit concurrent and/or independent operation of the first and second bus, and receiving information to be routed by at least one of the data routing modules. The information includes at least one identifier associated therewith and the at least one identifier identifies a target memory module destination for the information. The method further includes routing the information to the target memory module through at least one of the first bus or the second bus and processing an instruction included in the information to perform one of storing data or retrieving data from the memory of the target memory modules.

In another embodiment, the data storage device includes memory modules, at least one data interface module, and at least two routing modules. The memory modules are configured for concurrent operation and at least one of the memory modules including a non-volatile memory for storing data. The at least one data interface module facilitates communication between the data storage device and an external device. The at least two data routing modules communicatively couple the memory modules to the data interface module. The at least two data routing modules are configured to store incoming data and transmit outgoing data enabling the data routing module to route information from the data interface module to the memory modules or from the memory modules to the at least one data interface module based on at least one identifier included in the information so that the information may be directed to two or more of the memory modules concurrently.

The above and other aspects of the present invention will become apparent upon consideration of the following detailed description of preferred embodiments thereof, particularly when taken in conjunction with the accompanying drawings wherein like reference numerals in the various figures are utilized to designate like components.

DETAILED DESCRIPTION OF PREFERRED EMBODIMENTS

Figure 1A:
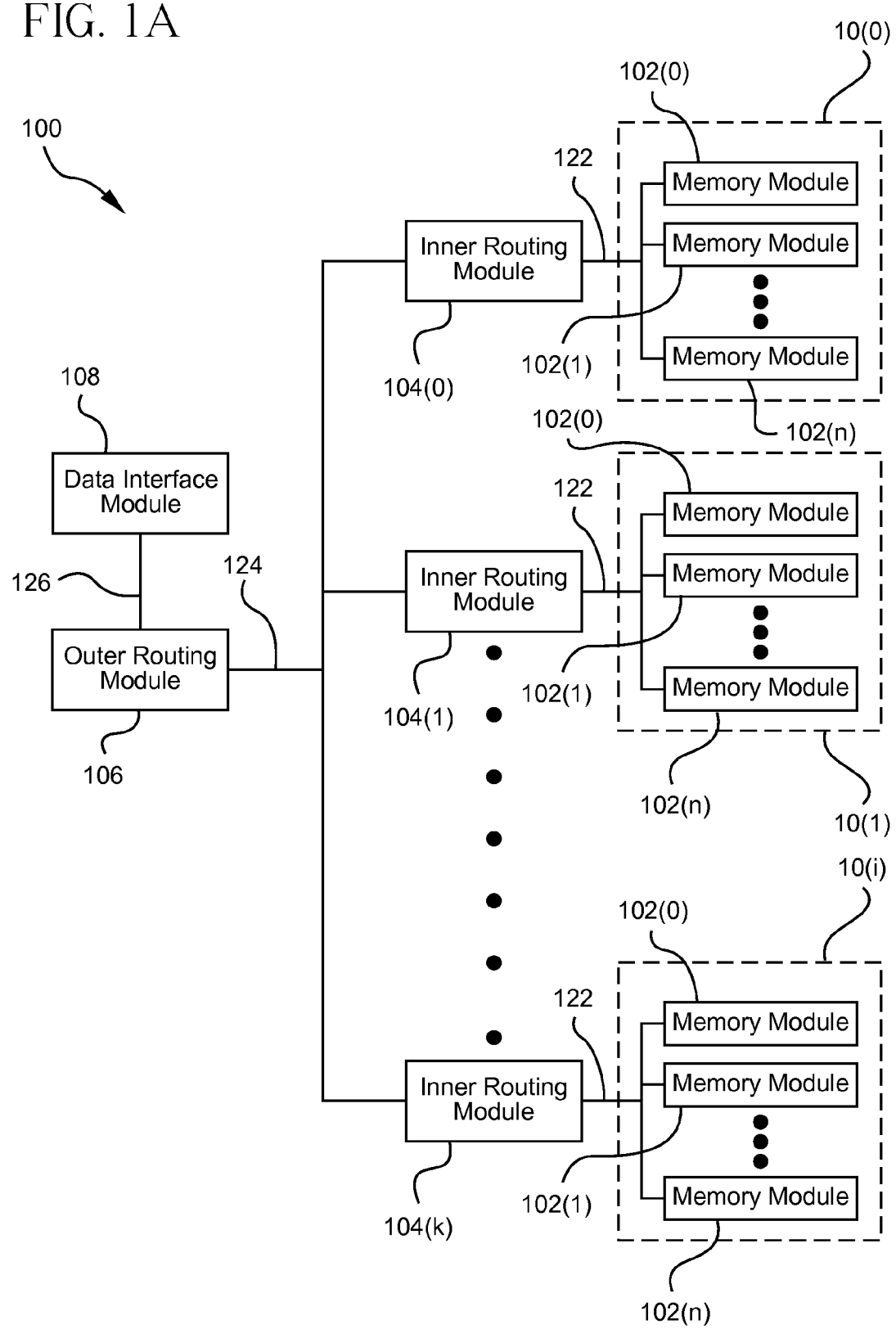
FIG. 1A depicts a data storage device implemented with a hierarchical architecture in accordance with a preferred embodiment of the present invention.

The data storage devices formed in accordance with the present invention can have scalable architectures with high density data storage capacity and high data transfer rates. In this manner, the data storage devices of the present invention are scalable in storage capacity and data transfer speed without requiring any fundamental re-engineering. The data storage devices can be implemented using relatively small form factors, while achieving a large data storage capacity. The data storage devices can be composed of solid state components that can be integrated in a single package or may be implemented using multiple packages. One or more of the components of the data storage devices can be implemented on a single semiconductor die.

The scalable architectures of the data storage devices allow the storage capacity of the data storage device to be increased or decreased without having to completely redesign the data storage devices. In addition, preferred architectures of the data storage devices enable increased data transfer rates as additional storage capacity is integrated into the data storage devices. The data storage devices can also minimize parasitic bus drain by limiting the number of devices driven by a particular bus.

In a preferred embodiment, the data storage devices can include a low power mode and/or a thermal protection system. The low power mode may operate to reduce the power consumption of the data storage devices. For example, in the low power mode the data storage device can operate at less than 150 mW. This can improve the battery life for portable applications and can enable in excess of a 1200 percent battery life increase in some applications. The thermal protection system may prevent the data storage devices from failing due to excessive heat accumulation.

The data storage devices can include one or more data interface modules for interfacing with external devices. The external device can include, but are not limited to a personal computer, a laptop computer, an MP3 player, a cell phone, other portable computing devices, or other electronic devices which require storage of data. In some embodiments, the data storage device can be configured as a direct replacement for a HDD or a SSD. The one or more data interface modules can be implemented to interface with any data transport interface known to those skilled in the art. Examples of such interfaces include, but are not limited to an HDD interface, such as Serial ATA (SATA) or Serial Attached SCSI (SAS), or an Ethernet interface, such as 10- or 100-gigabit Ethernet links.

The data storage devices preferably include data routing modules for routing information. The data routing modules are preferably configured to route information within the data storage device based upon at least one identifier provided in the information. The data routing modules can operate to electrically decouple buses through which the information is routed. The data routing modules can be configured to store or hold incoming data in, for example, a queue, and transmit outgoing data; thus enabling separate routing and memory modules to perform operations concurrently. Specifically, the buses can be decoupled by the routing modules such that the routing modules transmit information to the memory modules through the system of decoupled networked buses. By decoupling the involved buses, the data routing module of the present invention enables the buses to operate independently to allow the buses to function at different frequencies and electrical levels in order to reduce power consumption by running the less used bus at a lower rate than the more used bus.

The data storage device can include memory modules that may operate independently and concurrently to store data and/or retrieve data from memory included in the memory modules. The memory modules may be implemented based on an integrated, non-volatile Redundant Array of Independent Drives (RAID). Preferably, at least one memory module includes non-volatile memory, while other memory modules can include non-volatile memory and/or volatile memory. In some embodiments, one or more of the modules of the data storage devices can be integrated such that a single module can perform interfacing, routing, and/or storing of information.

The data storage devices can be implemented using various architectures. As a result of the architectures described herein, a terabyte (TB) or more of data can be stored in a data storage device, while the form factor of the data storage device can be smaller than 16 cubic centimeters (cm3) (about 1 cubic inch) using fabrication processes know to those skilled in the art. For example, in one embodiment, the data storage device can have a form factor volume to storage capacity of about 2.5 cm3 per 1 TB or in some instances a form factor volume of about 2.25 cm3. Additionally, exemplary embodiments of the data storage devices can achieve data transfer rates of 16.0 gigabytes per second (GB/s) or more, which exceeds currently achievable data transfer rates in data storage applications. Thus, the external interface, not the data storage devices, limits the rate at which data can be transferred using the data storage devices formed in accordance with the present invention.

Embodiments of the data storage devices can be implemented using solid state components. This mean the data storage device can be extremely durable and capable of withstanding very significant physical stresses and maintaining functionality. Using solid state technology also means that there are no moving parts to make noise, thereby allowing for comfortable use of the data storage device in Media Center PCs or elsewhere.

FIG. 1 depicts a data storage device 100 (hereinafter "device 100") having a hierarchical architecture. The device 100 can be implemented in an integrated form using a single package/chip. The device 100 can include memory modules 102, inner routing modules 104, an outer routing module 106, and a data interface module 108. One or more groups 10 of the memory modules 102 can be communicatively coupled to each of the inner routing modules 104 via buses 122. Each group 10 can have a number, n, of memory modules 102. For example, a group 10(0) of memory modules 102(0)-102(n) is connected to an inner routing module 104(0), where memory module 102(n) represents the $n^{th}$ memory module 102 of the group 10(0). The device 100 can have a number, i, of groups 10, where the group 10(i) represents the $i^{th}$ group 10 in the device 100. The inner routing modules 104 are communicatively coupled to the outer routing module 106 via bus 124. The device 100 can have a number, k, of inner routing modules 104, where inner routing module 104(k) represents the $k^{th}$ inner routing module 104 in the device 100. The outer routing module 106 is communicatively coupled to the data interface module 108 via bus 126. The buses 122, 124, and 126 may be implemented as buses. In some embodiments, the device 100 can have multiple outer routing modules 106 as well as multiple data interface modules 108.

The hierarchical architecture of FIG. 1A provides a multi-level hierarchy where the outer routing module 106 can represent a root or top level of the hierarchy. The outer routing module 106 connects to inner routing modules 104, which can be referred to as children of the outer routing module 106 or as the second level of the hierarchy. Each inner routing module 104 connects to one or more groups 10 of the memory modules 102, which can be referred to as children of their corresponding inner routing module 104, to which they connect, or as a third level of the hierarchy. The architecture of FIG. 1A is easily scalable simply by increasing the number, n, of memory modules 102 in each group 10 or by increasing the number, k, of inner routing module 104 and correspondingly increasing the number, i, of groups 10 connected thereto. As one example, the device 100 can have two (2) groups 10 of memory modules 102, where each group 10 can have sixteen (16) memory modules 102. Each memory module 102 can be capable of storing 4 GB of data to provide a total storage capacity of 128 GB for the device 100. As another example, the device 100 can have eight (8) groups 10 of memory modules 102, where each group can have sixty-four (64) memory modules 102. Each of the memory modules 102 can be capable of storing 4 GB of data to provide a total storage capacity of 2048 GB or 2 Terabytes (TB) for the device 100.

Scaling can continue by adding additional memory modules 102 and/or inner routing modules 104. For example, outer routing module 106 can connect to sixty-four (64) inner routing modules 104 and the each inner routing module 104 can connect to a group of sixty-four (64) memory modules 102. This provides 4096 of the memory modules 102 that collectively can store 16 TB of data where each of the memory modules has a storage capacity of 4 GB. In addition, the device 100 in this example can achieve a data transfer rate of about one hundred twenty-eight (128) gigabytes per second (GB/s) due to the hierarchical architecture and the concurrent operation of the memory module 102.

Data transfer rate of the device 100 scales with the storage capacity of the device 100. For example, doubling a number of memory modules 102 that can operate concurrently can double the data transfer rate of the device 100. In one example, the device 100 can have five hundred twelve (512) memory modules 102 capable of operating concurrently at 32 MB/sec, which can provide a data transfer rate of about 16 GB/s. Increasing the number of memory modules 102 capable of operating currently to 1,024 can provide a data transfer rate of about 32 GB/s.

The memory modules 102 can be accessed concurrently and/or in parallel and can operate to store data or retrieve data that has been stored in the device 100. The memory modules 102 can be implemented based on an integrated, non-volatile Redundant Array of Independent Drives (RAID). RAID techniques, such as striping, mirroring, parity, etc., can be applied across the memory modules 102 in a manner known to those skilled in the art. Each of the memory modules 102 in a group 10 can be uniquely identified by an identifier, such as an address. As a result, the memory modules 102 in each of the groups 10 can be independently addressable within their group 10. Information can be routed to one or more of the memory modules 102 in one or more of the groups 10 based on one or more identifiers included in the information that correspond to the one or more memory modules 102 in one or more of the groups 10. For example, the inner routing module 104(0) can connect to the group 10(0) of memory modules 102, which can include sixty-four (64) memory modules 102. Each of the sixty-four (64) memory modules 102 can be associated with a unique identifier within the group 10(0).

The memory modules 102 have a specified storage capacity which may vary depending on the application and from each other. The storage in the memory modules 102 may be accessed based on pages. A page, as used herein, refers to a block of memory that must be accessed for each data access operation. For example, one of the memory modules 102 may have a storage capacity of 2 GB and may have 524,288 pages, where each page is 4096 bytes.

The inner routing modules 104 operate to route information to one or more of the memory modules 102 in each of the groups 10. Each of the inner routing modules 104 can be uniquely identified by an identifier, such as an address. As a result, each of the inner routing modules 104 can be independently addressable. The inner routing modules 104 can determine which of the memory modules 102 should receive the information based on an identifier included in the information that is associated with one or more of the memory modules 102. The inner routing modules 104 also operate to pass information to the outer routing module 104.

The outer routing module 106 operates to route information to one or more of the inner routing modules 104 based on an identifier included in the information that is associated with the one or more inner routing modules 104. The outer routing module 106 can also receive information from the inner routing modules 104 and can transfer this information to the data interface module 108.

The routing modules (e.g., inner routing module 104 and the outer routing module 106) can electrically decouple the buses 122, 124, and 126 so that the routing modules and memory modules can operate independently and concurrently. The decoupling can be achieved by the data routing modules by storing incoming information before sending the information towards its destination. This allows the storage capacity and data transfer rate to scale without requiring scientific advances. The decoupling by the routing modules can also enable the buses 122, 124, and/or 126 to function independently as well as at different frequencies and electrical levels. This can provide a reduction in power consumption because the least utilized bus can be operated at a lower data transfer rate than the most utilized bus. For example, for the hierarchal architecture depicted in FIG. 1A, the bus 124 between the outer routing module 106 and the inner routing module 104 can operate at 1 GHz, while the bus 126 between the inner routing module 104 and the memory modules 102 can operate at 256 MHz. In addition, as information passes through the routing module, degradation that can occur from the resistance and capacitance of the buses 122, 124, and/or 126 can be eliminated or reduced. As a result, there is no limit to the number of routing modules through which the information can pass before the information reaches its destination.

The data interface module 108 can be implemented to interface with any external data transport interface available to those of ordinary skill in the art. Data transport interfaces include, but are not limited to an HDD interface, such as SAS and SATA, or an Ethernet interface. The data interface module 108 can receive information from an external device and can transmit information to an external device. The data interface module 108 can convert information that is received in an external protocol into a protocol for communicating with the outer routing module 104 and can map external addresses to internal addresses of the device 100 in a manner well known to those of ordinary skill in the art. In some embodiments, the data interface module 108 can be integrated with the outer routing module 106.

The information transferred between the modules 102-108 of the device 100 can include commands/instructions, payload data, error checking and correcting (ECC) codes, command queuing data, identifiers, etc. The terms "commands" and "instructions" are used interchangeably herein and are used to instruct the various modules 102-108 of the device 100 to perform one or more specified operations, such as data access operations (e.g., read and write commands). Some commands that can be implemented can include a read command, a write command, a read response, a write response, a cleanup command, power-down command, power-on command, cell query command, bulk erase command, bank reset command, etc. Payload data, as used herein, can refer to data that is to be stored or that was retrieved from storage as well as parameters for instructions, such as a page range for a bulk erase instruction. ECC codes, as used herein, are codes that are used to ensure that the information being transferred between the modules of the device 100, as well as between the device 100 and an external device, do not contain errors. Command queuing data, as used herein, refers to data that is used for command queuing in the modules of the device 100. Identifiers are used to identify one or more destinations for the information.

Command queuing, as used herein, refers to processing multiple commands that have been issued in an order that is determined by the device 100, where some commands can be processed simultaneously. In some embodiments, command queuing data may be propagated through the modules 102-108 of the device 100. In other embodiments, the data interface module 108 may perform command queuing based on identifiers in the information, such as an address.

The identifiers included in the information can include identifiers corresponding to each of the inner routings 104(0)-104(k), the memory modules 102(0)-102(n) within each of the groups 10(0)-10(i), and/or specific storage locations in the memory modules 102. For example, information which is directed to a target memory module can include an address that identifies to which of the inner routing modules 104 and ultimately to which of the memory modules 102 the information should be sent.

In one embodiment, the outer routing module 108 can connect to eight (k=8) of the inner routing modules 104 and each inner routing module 104 can connect to one of eight (i=8) groups 10 of sixty-four (n=64) memory modules 102. Therefore, in this embodiment, there can be a total of five hundred twelve (512) of the memory modules 102 in the device 100. Each of the memory modules 102 can store 2 GB of data and can contain 524,288 pages of 4096 bytes each. This embodiment, therefore, has a storage capacity of 1 TB. A 3-bit address can be used to uniquely identify each of the eight (8) inner routing modules 104 connected to the outer routing module 106. A 6-bit address can be used to uniquely identify each of the sixty-four (64) memory modules 102 in one of the groups 10. A 14-bit address can be used to uniquely identify a specific page in one of the memory modules 102. Therefore, in this embodiment, a 23-bit address can be used to uniquely identify a specific page in a specific memory module 102. In the case where a page is 512 bytes instead of 4096 bytes, 3 more bits can be added to the address, therefore, requiring a 26-bit address.

In other embodiments, a cylinder-head-sector (CHS) routing technique that is modified to be used with the device 100 can be implemented. Implementing an addressing scheme using CHS can allow the device 100 to be a direct replacement for any interface that uses CHS addressing, such as some HDD interfaces. The addressing can include a query system to determine the number of cylinders, heads and sectors. The number of pages in one of the memory modules 102 can represent a number of sectors, where each page is represented as one sector. The number of memory modules 102 can represent a number of cylinders, where each memory module 102 is represented as one cylinder. The number of inner routing modules 104 can represent a number of heads, where each inner routing module 104 can be represented as one head. Thus, to access a specific page in one of the memory modules a cylinder, a head, and a sector are specified.

The buses 122, 124, and 126 can each be formed from one or more buses. The one or more buses can each have one or more lines to communicatively couple the modules 102, 104, 106, and/or 108. Each of the buses 122, 124, and 126 can be decoupled to permit independent operation. As one example, each of the buses 122 between each of the inner routing modules 104 and the groups 10 of memory modules 102 are decoupled to permit concurrent operations. As another example, the bus 124 and the bus 126 are decoupled by the outer routing module 106 to permit independent operation of the buses 124 and 126. The exemplary architectures, described herein, can minimize the effect of a parasitic drain that results from driving a large number of components with the bus and in some cases also results from parasitic capacitance that forms, for example, between the bus and a ground. The parasitic drain can reduce the speed at which the bus can operate and cause undesired slewing of the signals transported on the bus. By segmenting into a number of decoupled networked buses, based on, for example, the hierarchical architecture illustrated in FIG. 1A, each bus drives fewer devices than conventional flat architectures.

As an example, for a conventional architecture to have five hundred twelve (512) data storage components, the bus is required to drive all five hundred twelve (512) data storage components, whereas using the architecture depicted in FIG. 1A, the most devices a single bus has to drive is the number, n, of memory modules 102 in one of the groups 10. As a result, the device 100 can have five hundred twelve (512) memory modules 102 divided evenly among eight (8) groups 10 such that each of the eight (8) groups 10 includes sixty-four (64) memory modules 102 and the most components required to be driven by a given bus is sixty-four (64). In the present example, therefore, the maximum number of components driven by a given bus is reduced by a factor of eight (8) as compared to a conventional data storage device.

Each of the buses 122, 124, and 126 can be synchronized. The synchronization can be attributed, in part, to having primary instructions (e.g. issue-command and get-response instructions) that are similar in length and construction. The primary instructions can include a read command (carrying address information), a write command (carrying a data and an address), a read response (carrying data), and a write response (carrying a success or failure response). In some embodiments, fixed length operations can be implemented so that some or all of the instructions can have the same size.

The speed at which the buses 122 operate can be slower than the speed at which the bus 124 operates as a result of the decoupling. For example, the buses 122 can operate in excess of 256 MHz and can, for example, deliver information at 256 megabytes per second (MB/s). The bus 124 can operate in excess of 1 GHz and can, for example, achieve a throughput of 1 GB/s. The speed and throughput can be attributed to factors, such as short traces and few components as well as other factors known to those skilled in the art. In addition to instructions and payload data, these buses can also transport command queuing data, addresses, an ECC code, etc. The throughput of the buses 122 and 124 can be optimized to achieve desired speeds.

Information can be routed through the device 100 through the buses 122, 124, and 126, which create unique paths for the information to follow. For example, the information can include an identifier that identifies the memory module 102 (0) in the group 10(0) as a destination for the information. The information can pass from the data interface module 108 to the outer routing module 106 via bus 126. The outer routing module 106 can route the information to the inner routing module 104(0) via the bus 124. Subsequently, the information can be routed to the memory module 102(0) by the inner routing module 104(0). As a result, a unique path is used to route information to and from each of the memory modules 102.

In some embodiments, the device 100, the memory modules 102, the inner routing modules 104, the outer routing module 106, and/or the data interface module 108 may operate in a low power mode and/or may have a thermal protection system. In the low power mode, each of the memory modules 102, the inner routing modules 104, the outer routing module 106, and/or the data interface module 108 can remain in a low power or a powered off state until they are required to perform an operation at which time they may operate in a high power or powered on state. Once the operation is complete, the memory modules 102, the inner routing modules 104, the outer routing module 106, and/or the data interface module 108 that completed the operation can return to a low power or powered off state until the next time they are required to perform an operation.

For embodiments that include a thermal protection system, the temperature of the device 100, the memory modules 102, the inner routing devices 104, the outer routing device 106, and/or the data interface module 108 can be monitored. When the temperature exceeds a specified temperature one or more of the modules 102-108 can power off until it is appropriate for these modules to be powered on again.

Additionally, one or more of the modules (e.g., memory modules 102, routing modules 104 and 106, and/or data interface module 108) of the data storage device 100 can be integrated such that a single module can perform interfacing, routing, and/or storing of information. For example, the data interface module 108 can be integrated into the outer routing module 106 so that the outer routing module can perform interfacing with an external device and routing of information. Additionally, the data storage device 100 can be formed using fabrication processes known to those skilled in the art, such as those implemented by Hynix Semiconductor, Inc. or Taiwan Semiconductor Manufacturing Company (TSMC), Ltd., so that a terabyte (TB) or more of data can be stored in the data storage device 100 having the form factor that is smaller than 16 cubic centimeters (cm3) (about 1 cubic inch).

Figure 1B:
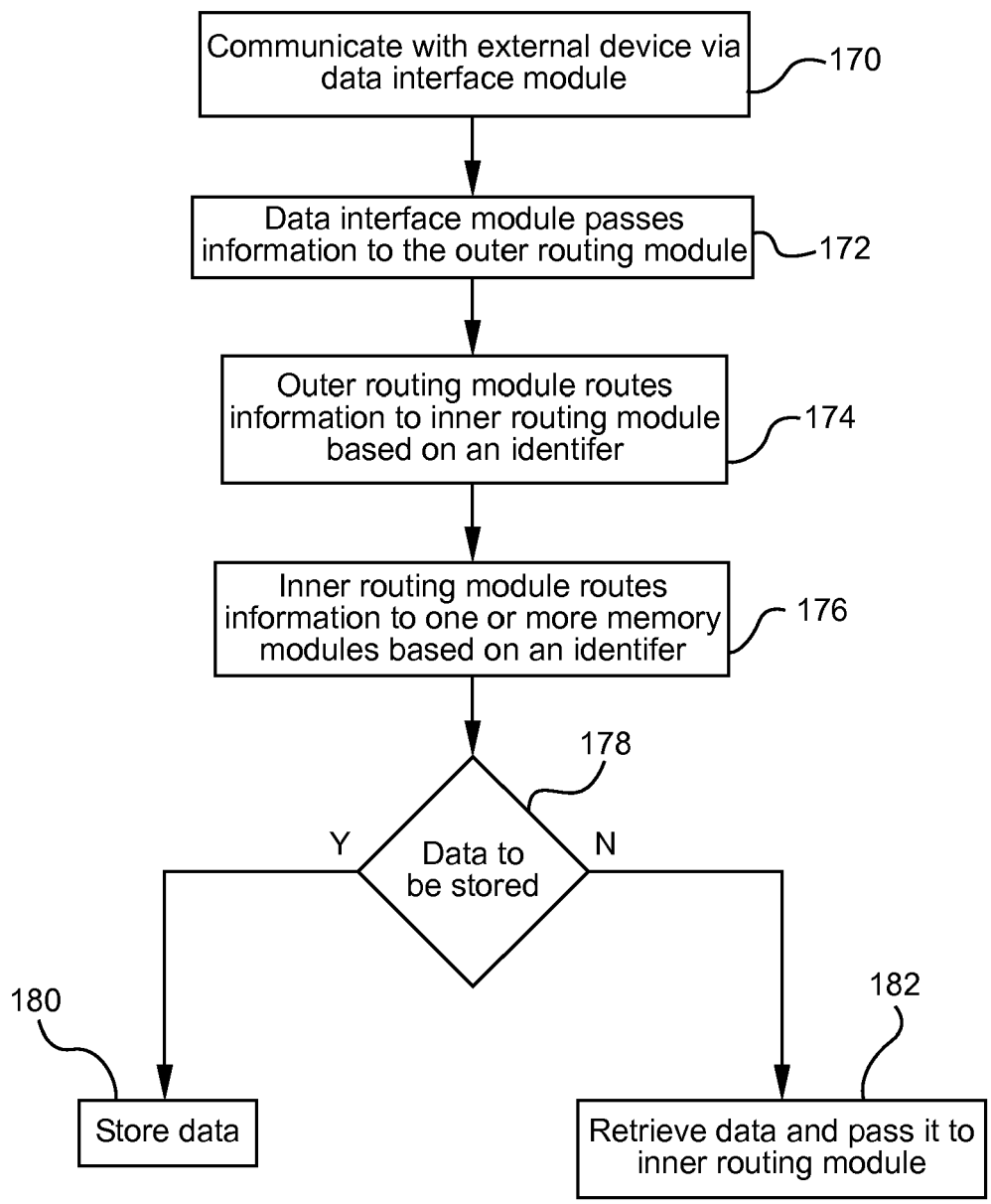
FIG. 1B depicts a flow diagram of the operation of the data storage device of FIG. 1A.

FIG. 1B depicts an exemplary flow diagram of the operation of the device 100. The device 100 can interact with external devices to store data and retrieve data that is stored by the device 100. The data interface module 108 communicates with devices external to the device 100 and in some cases converts incoming and outgoing data in accordance with one or more data transport interfaces (step 170). The data interface module 108 can be implemented using any data transport interface available to those skilled in the art, such as an HDD interface or an Ethernet interface. The data interface module 108 processes information received from an external device when the external device desires to access the device 100 to read data from or store data in the device 100. The data interface module 108 can also transmit information stored in the device 100 to external devices.

After the data interface module 108 processes the information received, the data interface module 108 passes the information to the outer routing module 106 (step 172). In some instances, the outer routing module 106 can provide a status indicator to the data interface module 108 to prevent the data interface module 108 from passing information to the outer routing module 106. When the outer routing module has a response available for the data interface module 108, the outer routing module 106 can provide a status indicator, such as an available signal, to the data interface module 108 so that the data interface module 108 can initiate the transfer of the response. The outer routing module 106 routes the information to one or more of the inner routing modules 104 using one or more unique identifiers included in the information (step 174). To route the information, the outer routing module 106 determines which of the one or more inner routing modules 104 is associated with the one or more identifiers included in the information. The outer routing module 106 transfers the information to the appropriate inner routing module(s) 104 based on the identifiers. In some instances, the outer routing module 106 can respond to the information without further transferring the information.

Upon receiving the information, the inner routing module 104 can route the information to one or more of the memory modules 102 in the group 10 of memory modules 102 that are communicatively coupled to the inner routing module 104. The inner routing module 104 routes the information to one or more of the memory modules 102 in the group 10 based on one or more identifiers included in the information that are associated with the one or more memory modules 102 (step 176). In some instances, the inner routing module 104 can respond to an instruction included in the information without further transferring the information to one or more memory modules 102. The inner routing module 104 can provide a status indicator, such as a full signal, to the outer routing module 106 to prevent the outer routing module 106 from passing information to the inner routing module 104. When the inner routing module 104 has a response available for the outer routing module 106, the inner routing module 104 can provide a status indicator, such as an available signal, to the outer routing module 106 so that the outer routing module 106 can initiate the transfer of the response. If the data included in the information that is received by the one or more memory modules 108 is to be stored (step 178), the one or more memory modules store the data (step 180). If, however, the data received by the one or memory modules 102 is associated with, for example, a read request (step 182), the one or more memory modules 102 retrieve the appropriate data from storage and pass it to the corresponding inner routing module 104 (step 184).

In some embodiments, data to be stored may be distributed across multiple memory modules concurrently. For example, data included in the information may be partitioned into a number of segments and the segments of data could be routed through one or more of the inner routing modules 104 to one or more of the memory module 102 for storage. This can allow for efficient use of the inner routing modules 104, memory modules 102, buses 122, and bus 124, as well as providing redundancy in case of failure.

In some instances, extra spare memory modules 102 may be connected to each inner routing module 104 or an extra, spare inner routing module 104, with a group of extra spare memory modules 102 connected thereto, can be connected to the outer routing module 106. The extra spare memory modules 102 can be provided in case there are memory location failures, such as page or module failures. One or more of the extra spare memory modules 102 can store information related to memory locations that failed, such as where bad pages or modules are located and any remapping information associated with bad pages or modules. The extra normally unavailable memory can store data included in the information when one or more memory locations fail. The data interface module 108 can remap the memory locations that fail to the extra memory in order to increase an available number of read/write cycles and the at least one data routing module routing the information to the extra memory location based on the remapping. For example, when a page of one of the memory modules 102 in a group fails, the data interface module 108 can write information related to the page that failed to a specified storage location in a specified one of the extra spare memory modules 102. When the device 100 is powered on, a startup sequence may occur where the data interface module 108 reads remapping information from the specified storage location in the extra spare memory module 102. Subsequently, any request directed to a page or module with a failure is automatically redirected to a specified page in an extra spare memory module 102. This remapping can be implemented in a manner that is compliant with the remapping that is performed by external interfaces, such as SAS and SATA.

Figure 2A:
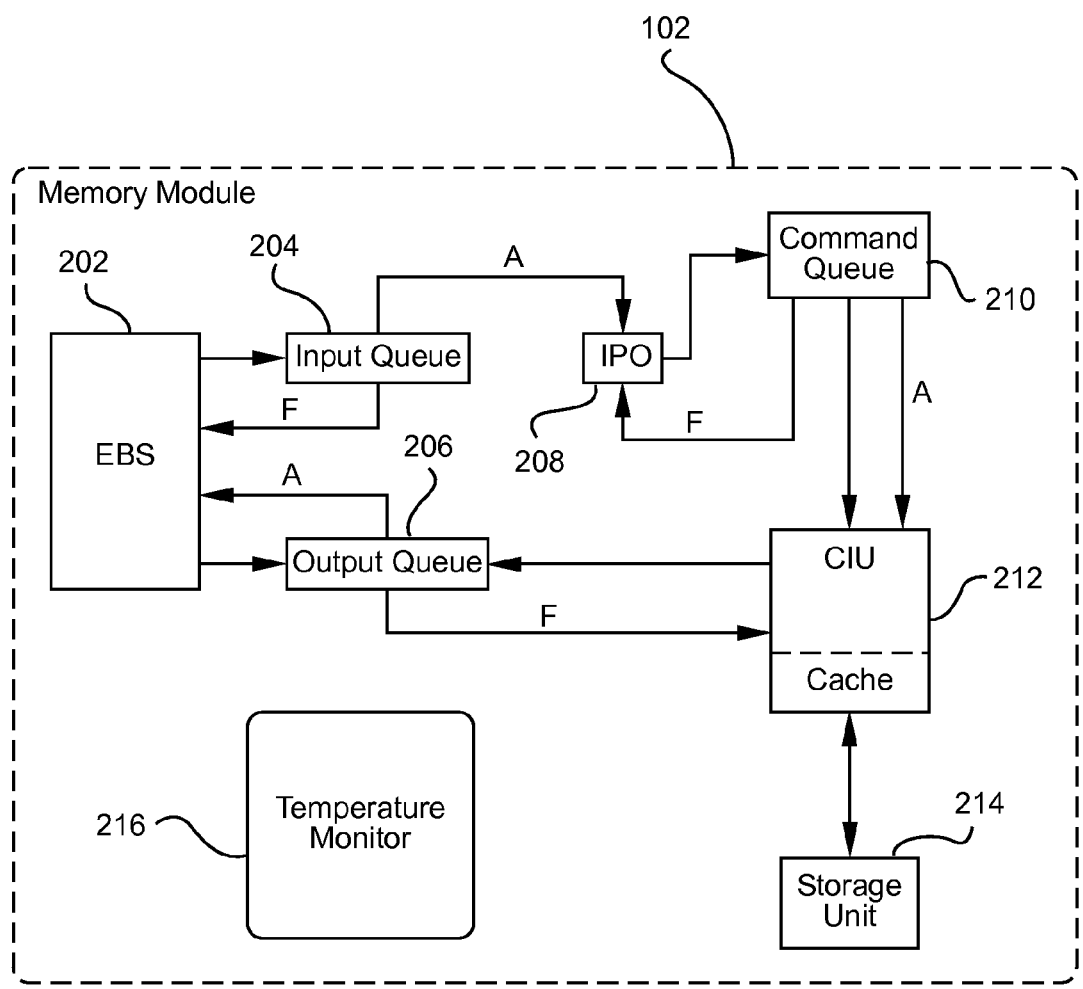
FIGS. 2A-B depict preferred embodiments of the memory modules of the data storage device.

FIG. 2A depicts a block diagram of a preferred embodiment of one of the memory modules 102, where each of the memory modules 102 can be implemented in a similar manner. The memory module 102 includes an external bus slave 202 (hereinafter "EBS 202"), an input queue 204, an output queue 206, an instruction parser/generator/optimizer 208 (hereinafter "IPO 208"), a command queue 210, a command issue unit 212 (hereinafter "CIU 212"), a storage unit 214, and optionally, a temperature monitor module 216.

The EBS 202 provides an interface for communicating with one or more of the inner routing modules 104 that are communicatively coupled to the memory module 102. The EBS 202, therefore, connects the memory modules 102 to the inner routing module 104 via the bus 122, which may be a serial or parallel bus. The EBS 202 is also communicatively coupled to the input queue 204 and the output queue 206. The EBS 202 receives information, such as instructions and/or data that is routed to the memory module 102 from the inner routing module 104. The information received may instruct the memory module 102 to store the data that is received or may instruct the memory module 102 to retrieve data from the storage unit 214. The EBS 202 interacts with the input queue 204 and the output queue 206 to facilitate processing the information received. For example, the EBS 202 can add data to the input queue 204 to be processed by the memory module 102 or can remove data from the output queue 206 and transfer it to the inner routing module 104. The EBS 202 can also broadcast information relating to the status of the input queue 204 and the output queue 206 to the inner routing module 104. The EBS 202 can receive information relating to an operation as a single unit or in multiple units. The information may include an address that is associated with that particular memory module 102, an address for retrieving data from the storage unit 214, an address for storing data in the storage unit 214, data to be stored in the storage unit 214, instructions for a read operation, instructions for a write operation, etc.

The input queue 204 queues information received by the memory module 102 via the EBS 202 for subsequent processing. The input queue 204 can have one or more indicators for indicating the status of the input queue 204. In one embodiment, the input queue 204 can have a full signal (F) to indicate that the input queue 204 is full and that there are no queue locations available. The input queue 204 can communicate with the EBS 202 using the full signal so that the EBS 202 knows that the input queue 204 is full. The EBS 202 can relay the full signal to the inner routing module 104, as a busy signal, to prevent any further information from being sent to the memory module 102. The input queue 204 can also have an available signal (A) to indicate that there is information in the input queue 204 to be processed. The input queue 204 can communicate with the IPO 208 using the available signal to indicate to the IPO 208 that the input queue 204 contains information to be processed.

The output queue 206 queues responses, when appropriate, to information received by the memory module 102. The output queue 206 is in communication with the EBS 202 and the CIU 212. The responses, such as, for example, data retrieved for a read instruction, are received from the CIU 212. The output queue 206 holds the responses until the EBS 202 removes the responses from the output queue 206. The output queue 206 can have one or more indicators for indicating the status of the output queue 206. In one example, the output queue 206 can have a full signal to indicate that the output queue 206 is full and that there are no queue locations available. The output queue 206 can communicate with the CIU 212 using the full signal so that the CIU 212 knows that the output queue 206 is full. The output queue 206 can also have an available signal to indicate that there is information in the output queue 206 to be processed. The output queue can communicate with the EBS 202 using the available signal to indicate to the EBS 202 that the output queue 206 contains a response to be passed to the inner routing module 104 and generally to an external device. The EBS 202 can pass the available signal to the inner routing module 104 so that the inner routing module 104 knows information is available from the memory module 102.

The IPO 208 is in communication with the input queue 204 and the command queue 210. When information is available from the input queue 204, which may be indicated by the available signal communicated to the IPO 208, the IPO 208 may remove the information from the input queue 204. The IPO 208 converts the information transferred over the bus to the protocol that is associated with the storage unit 214. The IPO 208 can also generate commands, such as cleanup, power-down, power-up, cell query, bulk erase, bank reset, etc. As a result, the information received by the IPO 208 and the information output from the IPO 208 may not have a 1-1 correspondence and in some cases the IPO 208 may output commands that have no external cause (e.g. a power-down command). Additionally, the IPO 208 may combine several commands included in received information into a single internal command (e.g. a bulk erase created from several smaller erase commands). After the IPO 208 processes the information and as long as the command queue is not full, the IPO 208 places the processed information in the command queue 210.

The command queue 210 is communicatively coupled to the IPO 208 and the CIU 212. The command queue 210 holds the preprocessed information provided by the IPO 208 in a queue. The preprocessed information in the command queue is removed by the CIU 212. The command queue 210 can have one or more indicators for indicating the status of the command queue 210. In one example, the command queue 210 can have a full signal to indicate that the command queue 210 is full and that there are no queue locations available. The command queue 210 can communicate with the IPO 208 using the full signal so that the IPO 208 knows that the command queue 210 is full. In another example, the command queue 210 can have an available signal to indicate that there is information in the command queue 210 to be processed. The command queue 210 can communicate with the CIU 212 using the available signal to indicate to the CIU 212 that the command queue 210 contains information to be further processed.

The input queue 204, output queue 206, and/or command queue 210 can be implemented to decouple the running speeds of the various components of the memory module 102.

For example, the presence of the input queue 204 allows the IPO 208 to function at a different speed than the EBS 202. As a result, the EBS 202 can function at a higher or lower speed than the IPO 208 without interfering with data access operations. This decoupling enables the entire device 100 to function at higher speeds than the speed of an individual conventional non-volatile Random Access Memory (NVRAM).

The CIU 212 is communicatively coupled to the command queue 210, the output queue 206, and the storage unit 214. The CIU 212 processes the information being held in the command queue 210 and issues commands to the storage unit 214. The CIU 212 can have internal memory, such as cache/register system with a number of slots similar to registers used in central processing units (CPUs). The CIU 212 provides a response, if one is necessary, for the command series, as instructed by the information processed by the IPO 208. The CIU 212 places responses into the output queue 206.

The storage unit 214 stores data received by the memory module 102. In a preferred embodiment, at least one memory module 102 includes a storage unit composed of non-volatile memory so that stored data is maintained when no power is being supplied. In some embodiments, one or more of the memory modules can include a storage unit that is composed of volatile memory where stored data is not maintained when power is not being supplied. In one embodiment, the storage unit 214 can be formed of non-volatile Random Access Memory Modules (NVRAM). The NVRAM can be a quantity of Flash memory, such as NAND Flash memory. The Flash memory can be arranged in a configuration such that page erasures and write balancing are easily implemented. Specific storage locations or memory cells in the storage unit 214 can be implemented using a conventional matrix decoding scheme such that each storage location can be identified by a row and column. Alternatively, the specific storage locations of memory cells of the storage unit can be implemented based on a hierarchical decoding scheme such that specific storage locations or memory cells can be identified based on their position in the hierarchy.

In some embodiments, one or more of magnetoresistive random access memory (MRAM), phase change random access memory (PRAM), ferroelectric random access memory (FeRAM), carbon nanotube memory, optical or holographic memory, Micro-electromechanical System (MEMS) based memory, etc., can be used to implement the storage unit 214. In addition, or alternatively, Write Once Read Many (WORM) media may be implemented using the storage unit 214. The storage unit 214 may include, but does not require error checking and correcting code (ECC) processing, such as a Reed-Solomon encoder/decoder or other ECC processing known to those skilled in the art. In some embodiments, the data interface module 108 can contain an ECC encoder and decoder to account for both the storage/retrieval errors and transfer errors along the buses.

Figure 2B:
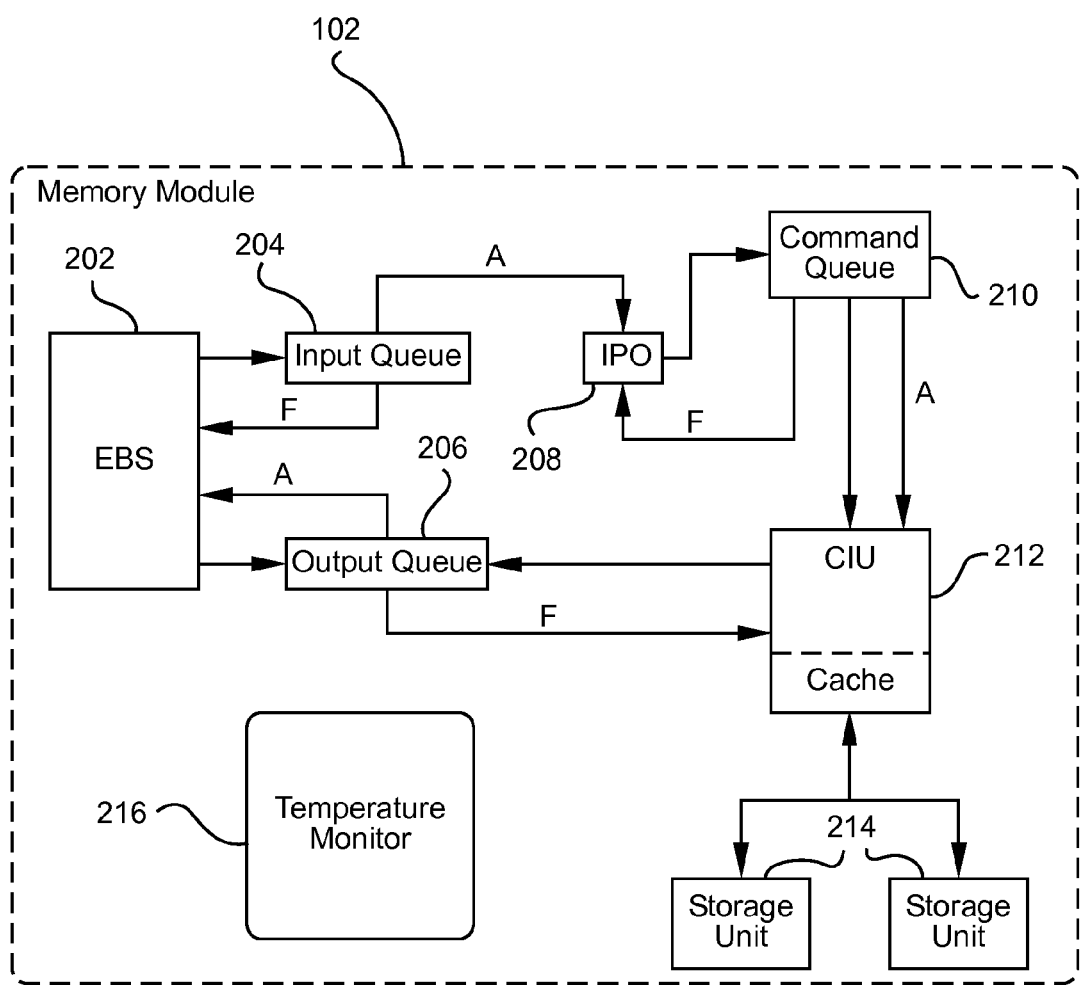

In one embodiment, the memory modules 102 can have multiple storage units 214. In this embodiment, the memory module 102 may include multiple instances of CIU 212 where each of the CIUs 212 can include their own cache. Alternatively, as depicted in FIG. 2B, a single CIU 212 can interact with each of the multiple storage units 214. In this case, the CIU 212 may use select enable signals to communicate with each of the storage units so that the CIU 212 can control which of the storage units 214 are enabled. In other embodiments, multiple storage units 214 can be connected based on a ring network topology, such as a arbitrated ring network, a token ring network, a combination of a arbitrated and token ring network, a segmented ring network, etc. For example, the multiple storage units 214 can be implemented using HLNAND from MOSAID Technologies, Inc. Multiple storage units 214 can be implemented based on an integrated, non-volatile Redundant Array of Independent Drives (RAID). RAID techniques, such as striping, mirroring, parity, etc., can be applied across the memory modules 102 in a manner known to those skilled in the art.

The temperature monitor module 216 monitors the temperature of the memory module 102 and/or the components therein. When the temperature sensed by the temperature monitor module 216 exceeds a threshold temperature, the temperature monitor module 216 may power off the memory module 102 or components therein, to prevent the memory module 102 from being damaged. In one embodiment, the temperature monitor module 216 can insert a power-down command into the IPO 208 or the command queue 210 when the temperature monitor module 216 detects that the memory module 102 is overheating. When the IPO 208 or the command queue receives the power-down command from the temperature monitor module 216, the IPO 208 or command queue 210 can place the power-down command appropriately. When the power-down command is processed, the memory module 102 can complete any operations currently being performed and then can power off to give the memory module 102 a chance to cool. In other embodiments, when the power-down command is processed, the memory module 102 can power off immediately.

While the memory module 102 is powered off, the temperature monitor module 216 can continue to monitor the memory module 102. The temperature monitor module 216 can continuously or periodically monitor the temperature. For example, the temperature monitor module 216 may check the temperature after every few milliseconds when the memory module is powered off in order to determine when the module has cooled to a desired temperature. In preferred embodiment, when the memory module 102 is powered off, the power consumption can be substantially zero. When the memory module 102 is powered off, the full signal from input queue 204 can be set to prevent new instructions from being sent to the memory module 102. Alternatively, a separate powered off signal may be used.

Figure 2C:
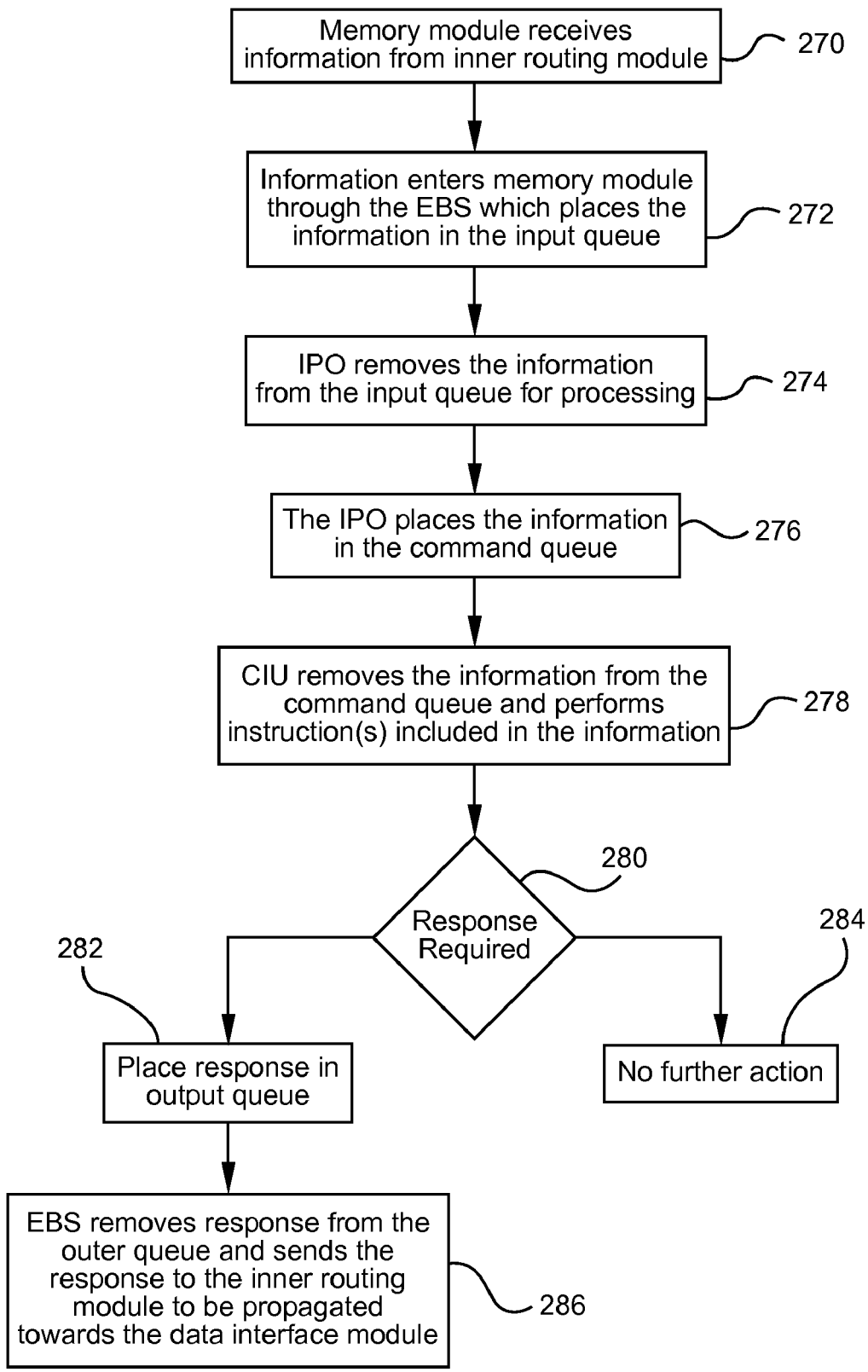
FIG. 2C depicts a flow diagram of the operation of one of the memory modules of the data storage device.

FIG. 2C depicts a preferred flow diagram of the operation of one of the memory modules 102. Information is received by the memory module 102 from the inner routing module 104 through bus 122 (step 270). The information follows a pre-described path within the memory module 102 by entering through EBS 202 and being placed into the input queue 204 (step 272). The information is removed from the input queue 204 by the IPO 208 to be processed and optimized (274). The IPO 208 subsequently places the information in the command queue 210 (276). The information is removed from the command queue 210 by the CIU 212, which reads the information and performs the instructions included in the information through its cache system and the storage unit 214 (step 278). When the instructions require a response (step 280), the requested response is written to output queue 206 by the CIU 212 based on data in the cache system and/or the storage unit 214 (step 282). Otherwise no further action is taken (step 284). The EBS 202 removes the response from the output queue 206 and the response is sent to the inner routing module 104, through bus 122, to be propagated towards the data interface module 108 (step 286). By providing a non-branching path for the instructions to follow, the performance can be predicted for the memory module 102 and complications can be avoided that can occur from complicated traffic routing. The memory modules 102, therefore, can be implemented with fewer transistors than conventional memory units without reducing the data transfer rate.

Figure 2D:
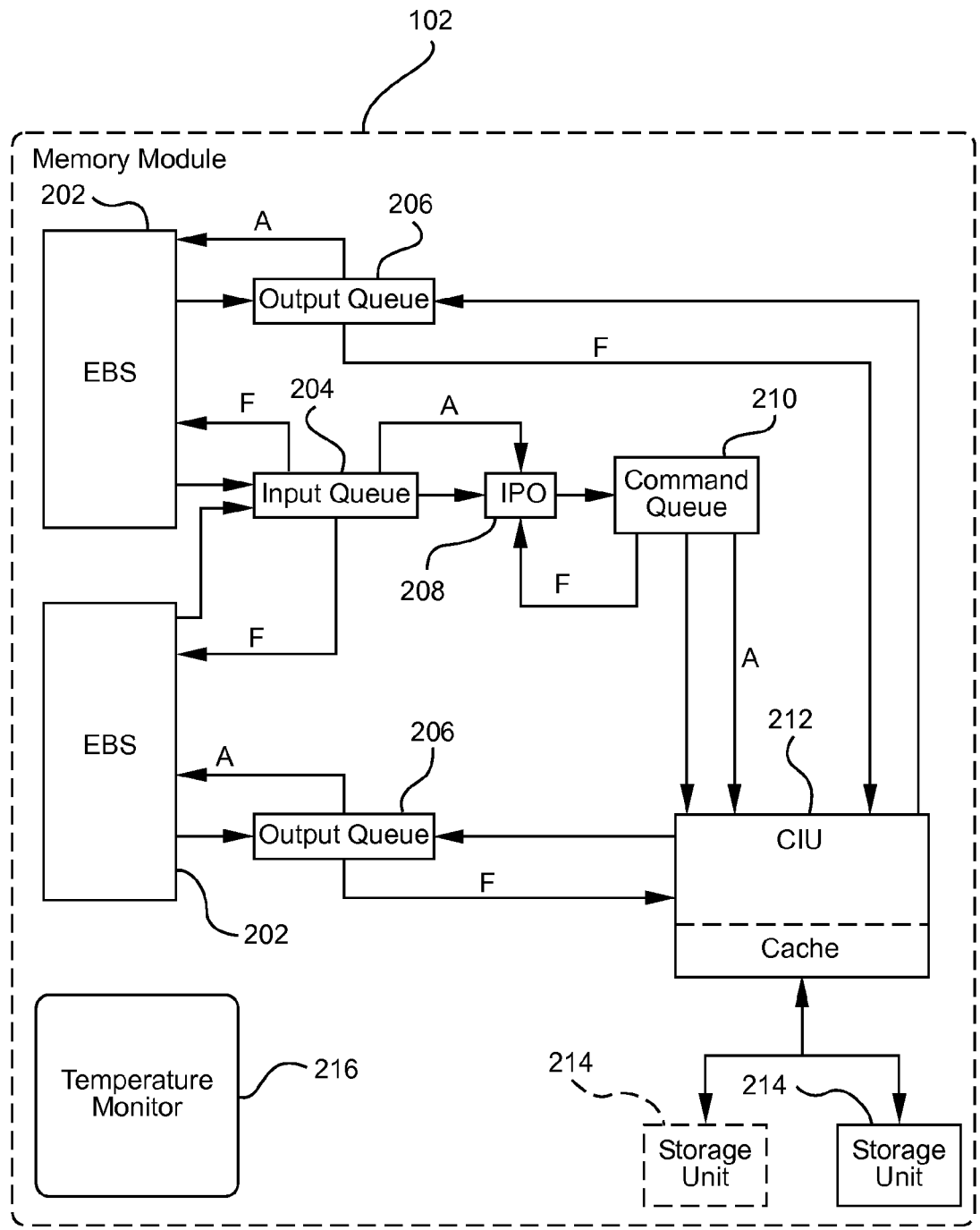
FIG. 2D depicts another preferred embodiment of the memory modules of the data storage device.

FIG. 2D depicts a block diagram of another preferred embodiment of one of the memory modules 102. In this embodiment, memory module 102 includes a first EBS 202', a second EBS 202", the input queue 204, a first output queue 206', a second output queue 206", the IPO 208, the command queue 210, the CIU 212, and the storage unit 214. In this embodiment, the first and second EBS 202' and 202" provide multiple interfaces for interacting with one or more inner routing modules 104. The first and second EBS 202' and 202" are connected to the input queue 204. The first EBS 202' is connected to the first output queue 206' and the second EBS 202" is connected to the second output queue 206". The first and second output queues 206' and 206" are connected to the CIU 212. All other connections are the same as those illustrated with respect to the memory module 102 depicted in FIG. 2A.

Information can be received by each EBS 202' and 202" to provide redundancy in case one of the first EBS 202' or the second EBS 202" fails. The information received is placed in the input queue 204 for processing. The first output queue 206' and the second output queue 206" both contain the same information. Information in the first output queue 206' is removed by the first EBS 202' and information in the second output queue is removed by the second EBS 202". Alternatively, or in addition, each EBS 202' and 202" may receive different information, and may be connected to separate buses, and the different information may be integrated into the input queue 304 in an appropriate manner. The separate buses may connect to the same inner routing module 104 or each separate bus may connect to a different inner routing module 104. Otherwise, the embodiment of the memory module 102 depicted in FIG. 2D, functions in an identical manner the memory module 102 depicted in FIG. 2A.

Figure 3A:
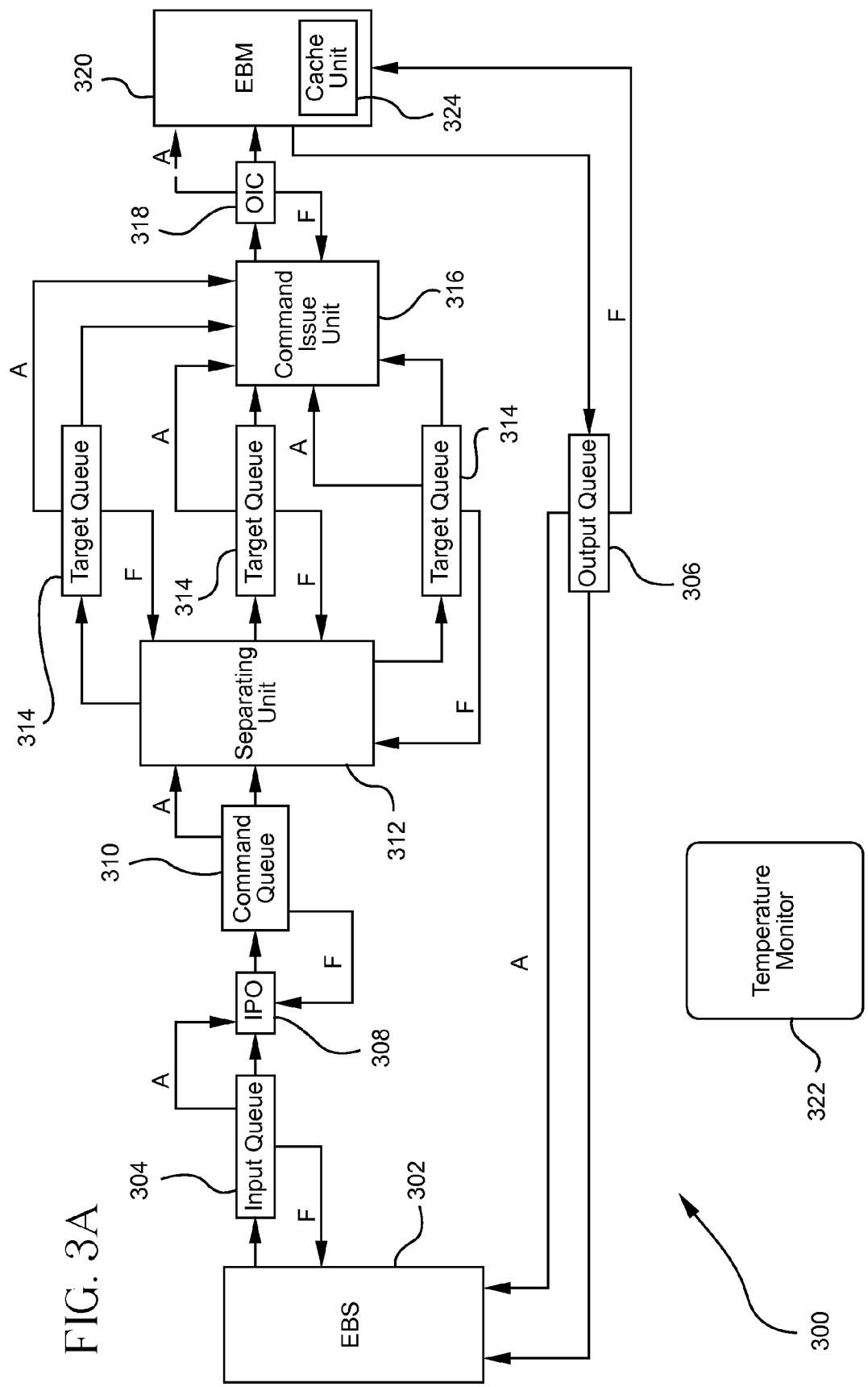
FIG. 3A depicts a preferred embodiment of the routing module of the data storage device.

FIG. 3A depicts a block diagram of a preferred embodiment of a routing module 300 that can be implemented for the routing modules 104 and 106, where some or all of the routing modules (e.g., the inner routing modules 104 and outer routing modules 106) can be implemented in a similar manner. The routing module 300 includes an external slave bus (EBS) 302, an input queue 304, an output queue 306, an instruction parser/generator/optimizer (IPO) 308, command queue 310, separating unit 312, target queues 314, command issue unit (CIU) 316, outbound instruction cache (OIC) 318, an external bus master (EBM) 320, and optionally, a temperature monitor module 322.

The EBS 302 provides an interface for communicating with other modules of the device 100 that are communicatively coupled to the routing module 300. For example, the EBS 302 of the outer routing module 106 can communicate with the data interface module 108 and/or the EBS 302 of the inner routing module 104 can communicate with the EBM 320 of the outer routing module 106. The EBS 302 is also communicatively coupled to the input queue 304 and the output queue 306. The EBS 302 receives information, such as instructions and/or data that is routed to the routing module 300 from the other modules of the device 100.

The EBS 302 interacts with the input queue 304 and the output queue 306 to facilitate processing information received by the routing module 300. For example, the EBS 302 can add information to the input queue 304 to be processed by the routing module 300 or can remove information from the output queue 306 and transfer it to the other modules connected to the routing module 300. The EBS 302 can also broadcast information relating to the status of the input queue 304 and the output queue 306 to other modules of the device 100. The EBS 302 can receive information relating to an operation as a single unit or in multiple units. The information may include an identifier that is associated with that particular inner routing modules 104, particular memory modules 102, an address for retrieving data from the memory module 102, an address for storing data in the memory modules 102, data to be stored in the memory modules 102, instructions for a read operations, instructions for a write operation, etc.

The input queue 304 is communicatively coupled to the EBS 302 and the IPO 308. The input queue 304 functions in a similar manner as the input queue 204 (FIG. 2). The input queue 304 queues received information in preparation for processing by the IPO 308. Like the input queue 204, the input queue 304 can provide indicators to indicate the status of the input queue 304. For example, a full signal and an available signal can be used to communicate with the EBS 302 and the IPO 308, respectively.

The output queue 306 is communicatively coupled to the EBS 302 and the EBM 320. The output queue 306 functions in a similar manner as the output queue 206 (FIG. 2). The output queue 306 queues information received from the EBM 320. The information in the output queue 306 can be removed by the EBS 302 and the EBS 302 can pass the information to other modules connected to the EBS 302. Like the output queue 206, the output queue 306 can provide indicators to indicate the status of the output queue 306. For example, a full signal and an available signal can be used to communicate with the EBS 302 and the EBM 320, respectively.

The IPO 308 is communicatively coupled to the input queue 304 and the command queue 310. The IPO 308 can convert information received via the EBS 308 into a format used by EBM 320. The IPO 308 can also generate commands, such as cleanup, power-down, power-up, cell query, bulk erase, bank reset, etc. As a result, the input information to the IPO 308 and the output information from the IPO 308 may not have a one-to-one correspondence. In some cases, the information that is output from the IPO 308 may relate to commands that have no external cause (e.g. a power-down command). In addition, the IPO 308 may be able to combine several external commands into a single internal command (e.g. a bulk erase created from several smaller erases). After processing the information and if the command queue 310 is not full, the IPO 308 can place processed information in the command queue 310.

The command queue 310 is communicatively coupled to the IPO 308 and the separating unit 312. The command queue 310 holds preprocessed information that is output by the IPO 308 in a queue so that separating unit 312 can separate the information into target queues 314. Like the command queue 210 (FIG. 2) of the memory modules 102, the command queue 310 of the routing module 300 can provide indicators to indicate the status of the command queue 310. For example, a full signal and an available signal can be used to communicate with the IPO 308 and the separating unit 312, respectively.

The separating unit 312 is communicatively coupled to the command queue 310 and target queues 314. The separating unit 312 separates the information in command queue 310 according to a destination specified by the information. The destination represents one or more modules of the device 100 that are in communication with the routing module 300. For example, one or more inner routing modules 104 may represent a destination of information in the outer routing module 106 and one or more memory modules 102 may represent a destination of information in the inner routing modules 104. The destination can be specified by identifiers included in the information, such as one or more addresses. The one or more modules specified as the destination for the information are referred to herein as target modules. As the separating unit separates the information, the separating unit 312 inserts the information into the appropriate target queue 314 that is associated with the target module.

The target queues 314 are each communicatively coupled to the separating unit 312 and the CIU 316. Each of the target queues 314 in the outer routing module 106 correspond to a specified inner routing module 104 and each of the target queues 314 in the inner routing module 104 correspond to a specified one of the memory modules 102, which represents the target memory module for the information. The number of target queues 314 in the outer routing module 106 can equal the number, k, of inner routing modules 104 connected to the outer routing module 106. Likewise, the number of target queues 314 in the inner routing module 104 can equal the number, n, of memory modules 102 connected to the inner routing module 104. Each of the target queues 314 hold information placed in them by the separating unit 312 based on the destination of the information. As a result, each of the target queues 314 can identify a unique path for routing the information. The target queues 314 can each provide indicators to indicate the status of the target queues 314. For example, a full signal and an available signal can be used to communicate with the separating unit 312 and the CIU 316, respectively. When the one or more of the target queues 314 are full, the separating unit 312 cannot insert information into the one or more target queues 314. In this case, the separating unit 312 performs no further processing until the desired one or more of the target queues 314 are no longer full.

The CIU 316 is communicatively coupled to the target queues 314 and the OIC 318. The CIU 316 pulls in information out of the target queues 314 and places the information into OIC 318 in an orderly manner. When one or more target queues 314 indicate that they have information available, for example using the available signal, the CIU 316 systematically pulls the information from each of the one or more target queues 314 so that the information is processed efficiently. To determine the order of the commands to be placed into the OIC 318, the CIU 316 examines an incoming available signal supplied by the EBM 320, giving precedence to responses and reading them in sequentially for fairness. When none of the target queues 314 indicate there is information available, the CIU 316 places a no-operation instruction in the OIC 318. To avoid bottlenecking, the CIU 316 does not place two sets of information from the same target queue 314 in the OIC 318 at any given time. This allows the target memory module to set or reset its status indicators accordingly. Since the target modules can generally function several times slower than the routing module 300, there is no performance penalty.

The OIC 318 is communicatively coupled to the CIU 316 and the EBM 320. The OIC 318 can include a cache for holding information, such as current and next instructions. The OIC 318 holds pending information that may be transferred to the appropriate target memory module. The OIC 318 can function to provide a look-ahead operation for the routing module 300. The look-ahead operation provides the EBM 320 advanced notice of which modules of the device 100 are required for completing an operation specified by an instruction in the information. For example, the look-ahead operation in the inner routing module can be used for providing advanced notice of which of the memory modules 102 are required for completing the next operation. The advanced notice can be in the form of a look-ahead value, which can include information in the OIC 318 that is scheduled for, but has not yet been processed by the EBM 320.

The look-ahead operation allows for faster operation in a low-power mode by allowing instructions to overlap, creating an opportunity for the target module to power Lip some or all of the components that may be necessary to complete the operation specified by the next instruction to be processed. The OIC 318 allows the EBM 320 to function at an appropriate speed to interact with the buses 122 and 124 to which it can connect. The OIC 318 can provide indicators, such as a full signal and/or an available signal, to indicate the status of the OIC 318. For example, a full signal and an available signal can be used to communicate with the CIU 316 and the EBM 320, respectively. When the OIC 318 indicates it is full, for example using the full signal, the CIU 316 delays further processing until the OIC 318 no longer indicates that is it full.

The input queue 304, output queue 306, target queues 314, and/or OIC 318 can be implemented to decouple the buses 122, 124, and/or 126, and therefore can be implemented to decouple the memory modules 102, routing modules 300 (e.g., inner routing module 104 and outer routing modules 106), and/or the data interface module so that the modules of the data storage device can operate independently and/or concurrently. This independence and concurrency allows the data storage device 100 to scale the storage capacity and data transfer rate without requiring scientific advances. The decoupling can also enable the buses 122, 124, and/or 126 to function independently as well as at different frequencies and electrical levels. This can provide a reduction in power consumption because the least utilized bus can be operated at a lower data transfer rate than the most utilized bus. The decoupling is preferably achieved by storing or holding information in the queue 304, output queue 306, target queues 314, and/or OIC 318 before sending the information towards its destination. In addition, as information passes through the input queue 304, output queue 306, target queues 314, and/or OIC 318, degradation that can occur from the resistance and capacitance of the buses 122, 124, and/or 126 can be eliminated or reduced. As a result, there is no limit to the number of routing modules through which the information can pass before the information reaches its destination.

Additionally, input queue 304, output queue 306, target queues 314, and/or OIC 318 can be implemented to decouple the running speed of the various components of the inner routing module 104. For example, the presence of the input queue allows the IPO 308 to function at a different speed than the speed of the EBS 302. As a result, the EBS 302 can function at a higher or lower speed than the IPO 308. This decoupling enables all contained modules to operate at the most appropriate speed.

The EBM 320 is communicatively coupled to the OIC 318 and one or more other modules of the device 100. For example, the EBM 320 of one of the inner routing modules 104 is communicatively coupled to a group of memory modules 102 and the EBM 320 of the outer routing module 106 is communicatively coupled to the inner routing modules 104. The EBM 320 can include a cache unit 324, which is discussed in more detail below. The EBM 320 sends information it receives from the OIC 318 towards target memory modules. The EBM 320 receives requested responses from the modules of the device 100 that are in communication with the EBM 320 and receives full and available signals from the modules. The EBM 320 provides the look-ahead value to the target modules to allow the target modules to prepare for the receipt of information. For example, with reference to the embodiment of the device 100 depicted in FIG. 1A, the EBM 320 of the outer routing module 106 can send the look-ahead value, received from the OIC 318, to one or more of the inner routing modules 104 to allow the one or more inner routing modules 104 to prepare for the next operation. Likewise the EBM 320 of the inner routing module 104 can send the look-ahead value, received from the OIC 318, to one or more of the memory modules 102 to allow the one or more inner routing modules 104 to prepare for the next operation. In addition, the EBM 320 performs cache lookups, which can allow the EBM 320 to satisfy some commands specified in the information it receives from the OIC 318 without propagating the commands towards the target memory module(s). When the EBM 320 observes that one or more of the target memory modules has indicated that they are full, a no-operation command is sent instead of the current information and the current information (along with any subsequent information) is delayed.

The EBM 320 examines the information to determine the type of instruction that it specifies. Some instruction types include a get-response instruction or an issue-command instruction. A get-response instruction is issued without further inspection and a response is retrieved and data (if any) is placed into the cache. Subsequently the entire response is sent to the output queue 306. In some embodiments, the EBM 320 converts the response to a protocol used by the EBS 302 to communicate with the other modules of the device 100. In other embodiments, a component similar to the IPO 308 can be implemented between the EBM 320 and the output queue 306 to facilitate a conversion of the response to the protocol used by the EBS 302. When the EBM 320 determines that the information includes an issue-command instruction, the EBM 320 checks the cache unit 324 to see whether the issue-command can be satisfied by the cache unit 324. If the issue-command can be satisfied by the cache unit 324, the information that satisfies the issue-command is placed in the output queue 306 and the instruction is replaced by a no-operation command. If, however, the issue-command cannot be satisfied by the cache unit 324, the issue-command is propagated towards the appropriate target memory module.

The cache unit 324 of the EBM 320 is an instruction response cache used by the EBM 320 to help minimize the number of commands issued by the EBM 320. The cache unit 324 temporarily stores data that has been recently and/or frequently retrieved from the memory modules 102 so that when subsequent requests for this data are made, the device 100 does not require re-accessing the corresponding memory module 102. The cache unit 324 can, therefore, reduce the number of times a memory module is accessed. This can reduce the amount of energy expended by each of the memory modules 102 and lengthen the lifetime of the memory modules 102.

The temperature monitor module 322 monitors the temperature of various components in the routing module 300. The temperature monitor module 322 can request a power-down command be inserted in the command queue 310 or the CIU 316. The power-down command can be used to power off some or all of the components in the routine module 300 to allow the routing module 300 to cool off. The temperature monitor module 322 also continues monitoring the components of the routing module 300 during the powered off state. The temperature monitor module 322 can continuously or periodically sense the temperature of the components in the routing module 300 to determine when the routing module 300 has cooled to a desired temperature. For example, the temperature monitor module 322 can check the temperature every few milliseconds. During powered off state, the full signal from input queue 304 is set, which is communicated to the EBS 302 and ultimately to other modules of the device 100. This prevents any new information from being sent to a powered off routing module 300.

Figure 3B:
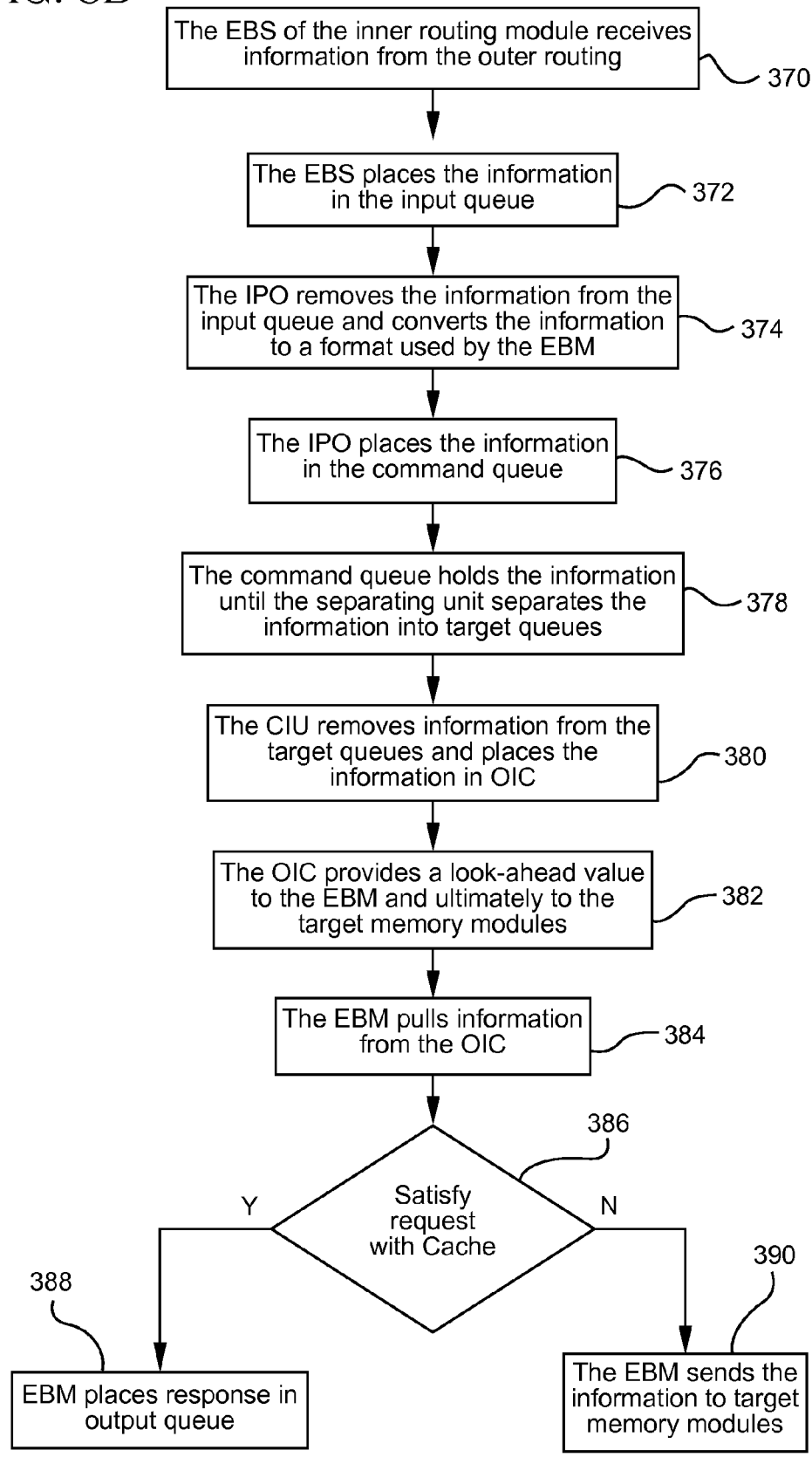
FIG. 3B depicts a flow diagram of the operation of the routing module depicted in FIG. 3A implemented as an inner routing module.

FIG. 3B depicts a flow diagram of the preferred operation of one of the inner routing modules 104 based on the embodiment of the routing module 300 depicted in FIG. 3A. The EBS 302 receives information from the outer routing module 106 and can broadcast information relating to the status of the input queue 304 and the output queue 306 to the outer routing module 106 (step 370). The EBS 302 places the information received from the outer routing module 106 into the input queue 304 (step 372). The IPO 308 can remove the information from the input queue 304 and can convert the information received to a format used by the EBM 320 (step 374). After processing the information, the IPO 308 can place processed information in the command queue 310 (step 376). The command queue 310 holds preprocessed information in a queue until the separating unit 312 separates the information into target queues 314, which identify a unique path for routing the information (step 378). The CIU 316 removes information from the target queues 314 and places the information into OIC 318 in an orderly manner so that only one instruction for each target is placed in the OIC 318 at a time (step 380). The OIC 318 provides a look-ahead value, which is to be transmitted, via the EBM 320, to the memory modules 102 associated with the next instruction to be processed (step 382). The EBM 320 pulls information from the OIC 318 for further processing (step 384). If the EBM 320 can satisfy a request included in the information using the cache unit 324 (step 386), the EBM 320 places the response in the output queue 306 (step 388). Otherwise, the EBM 320 sends the information to target memory modules for further processing (step 390).

Figure 3C:
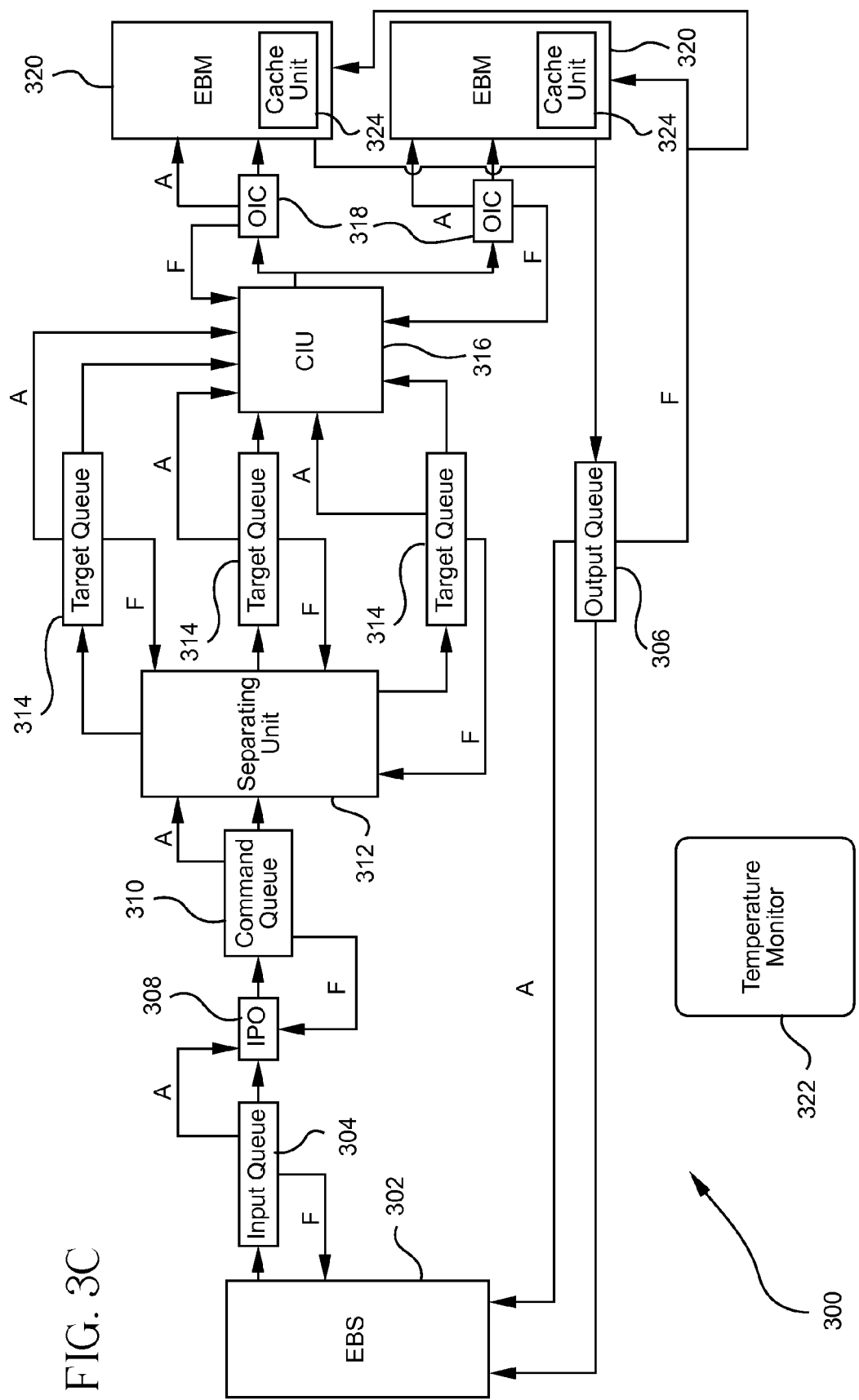
FIGS. 3C-E depict other preferred embodiments of the routing module of the data storage device.

FIG. 3C depicts a block diagram of a further preferred embodiment of a routing module 300 that can be implemented as the routing modules 104 and/or 106, where some or all of the routing modules can be implemented in a similar manner. In FIG. 3C, the routing module 300 can include multiple OICs 318 and multiple EBMs 320. The CIU 316 can pass identical information to each of the OICs 318, which then can pass the information to the EBMs 320. This can provide for redundancy in case one of the OICs 318 or the EMBs 320 fails. Alternatively, or in addition, each EBM 320 can connect to a separate bus. For example, the inner routing module 104 can have multiple EBMs 320 each connected to separate buses which drive different groups 10 of memory modules 102 and/or the outer routing module 106 can have multiple EBMs 320 each connected to separate buses which drive different inner routing modules 104.

Figure 3D:
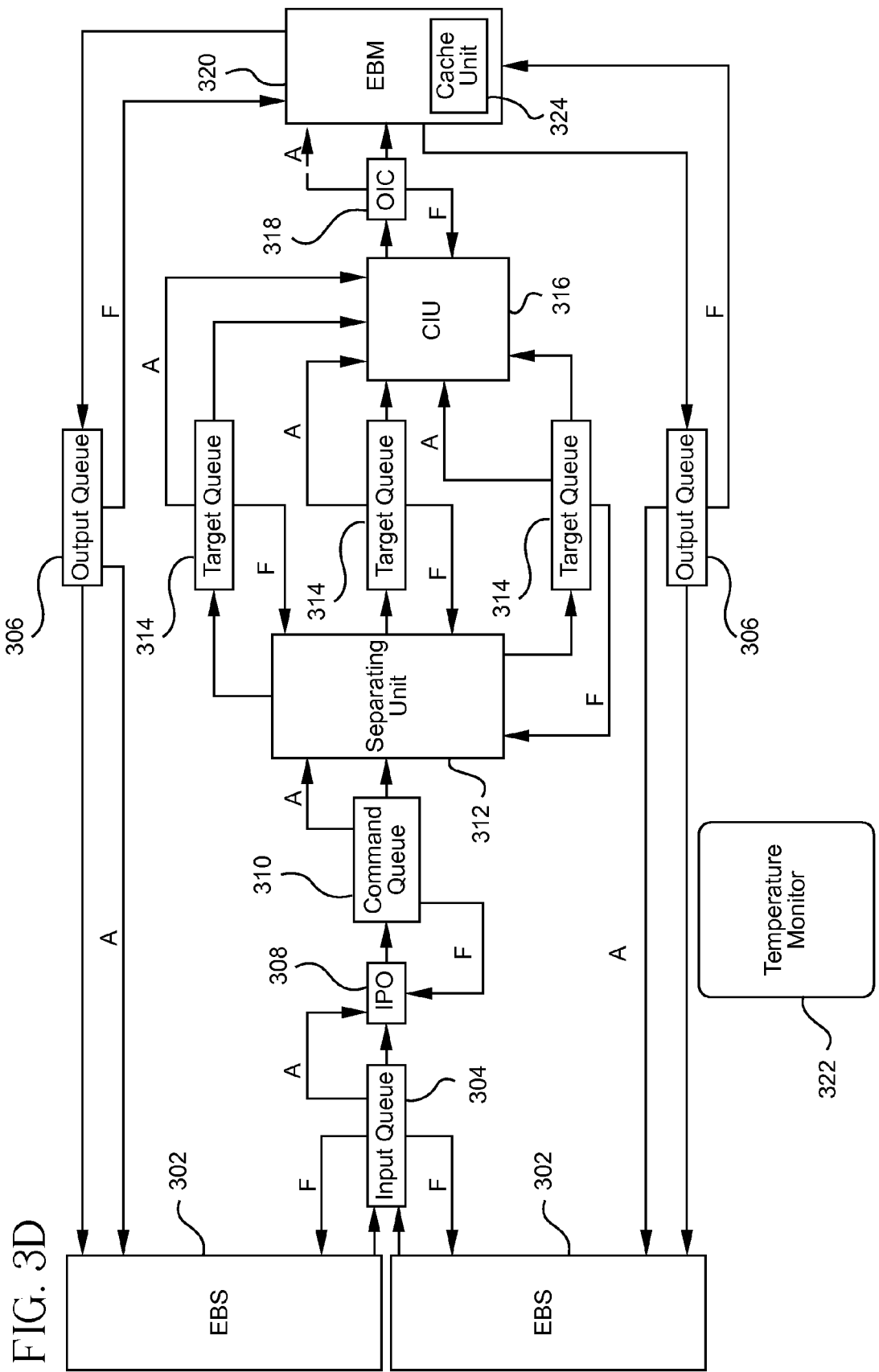

FIG. 3D depicts a block diagram of another exemplary embodiment of a routing module 300 that can be implemented as the routing modules 104 and/or 106, where some or all of the routing modules can be implemented in a similar manner. In this embodiment, routing module 300 can include multiple EBSs 302 and multiple output queues 306. In this exemplary embodiment, the EBSs 302 provide multiple interfaces for interacting with the other modules of the device 100. For example, the inner routing module 104 can have multiple EBSs 302 for interfacing with one or more outer routing modules 106 and/or the outer routing module 106 can have multiple EBSs 302 for interfacing with one or more data interface modules 108. The EBSs 302 are each connected to the input queue 304. One of the EBSs 302 is connected to a corresponding output queue 306 and another EBS 302 is connected to another corresponding output queue 306. The output queues 306 can be connected to the EBM 230. All other connections are the same as the exemplary embodiment of the routing module 300 depicted in FIG. 3A.

In some embodiments, identical information can be received by each EBS 302 to provide redundancy in case one of the EBSs 302 fails. The information received is placed in the input queue 304 for processing. Alternatively, or in addition, each EBS 302 may receive different information, and may be connected to separate buses, and the different information may be integrated into the input queue 304 in an appropriate manner. Likewise, the output queues 206 can contain the same information or different information. Otherwise, the embodiment of the routing module 300 depicted in FIG. 3D functions in an identical manner as the embodiment of the routing module 300 depicted in FIG. 3A. As will be appreciated by those skilled in the art, various combinations of components can be included in the routing module 300. For example, the routing module 300 can include multiple EBSs 302, multiple output queues 306, multiple OICs 318, and/or multiple EBMs 320.

Figure 3E:
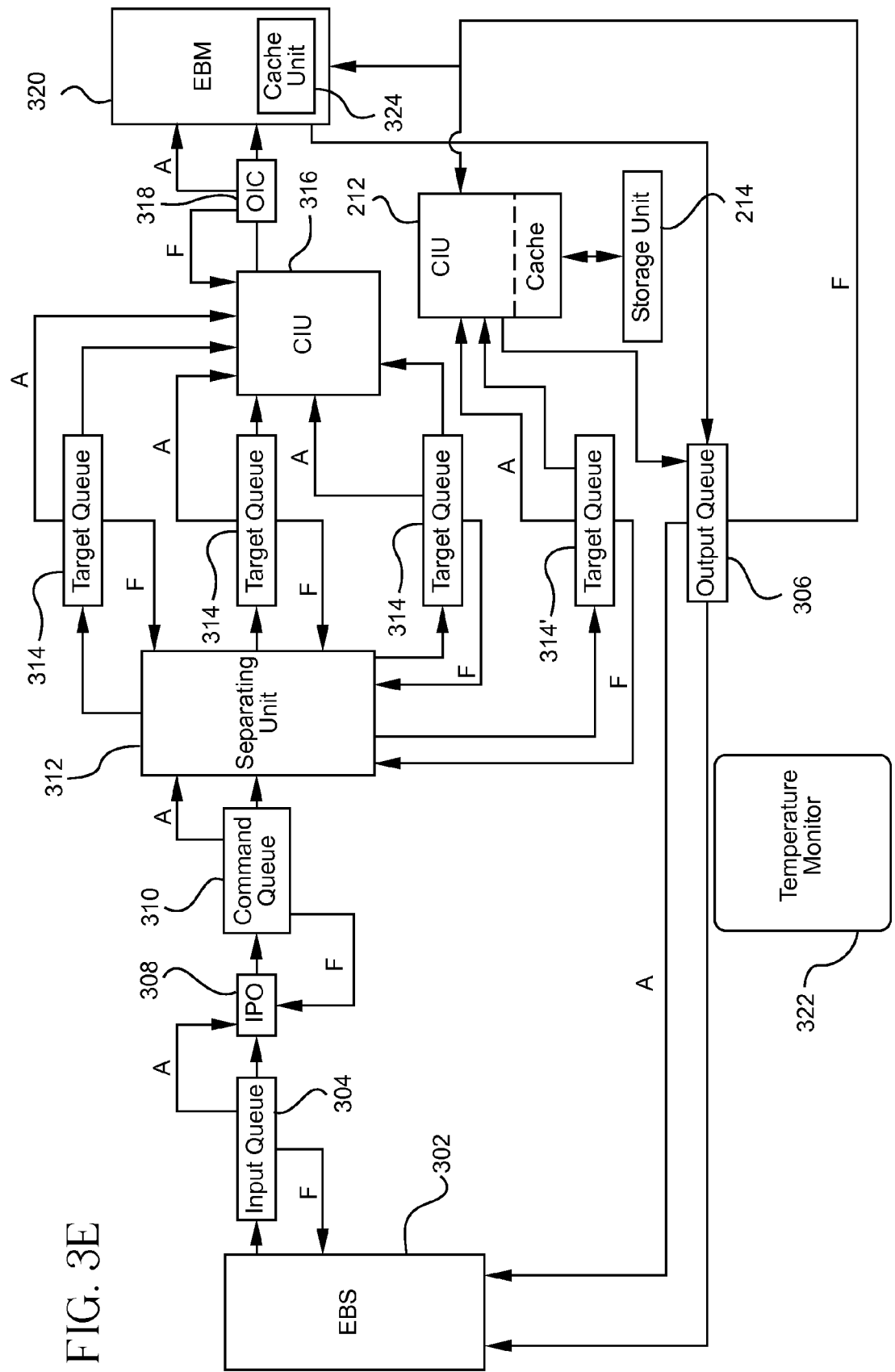

FIG. 3E depicts a block diagram of another preferred embodiment of the routing module 300 that includes memory for storing data. Such a routing module can be referred to as a "routing memory module." The routing module 300 can include the EBS 302, input queue 304, output queue 306, IPO 308, command queue 310, separating unit 312, target queues 314, a target queue 314', CIU 316, OIC 318, EBM 320, and temperature monitor 322 of the embodiments of the routing module 300 depicted in FIGS. 3A-D The module 300 can also include the CIU 212 and storage unit 214. The target queue 314' is implemented in a similar manner as the target queues 314. The target queue 314' can be communicatively coupled to the CIU 212 identifying a unique path for the information to follow. Information can flow from the EBS 302 to the separating unit 312, as described above with regard to the routing module 300 of FIG. 3A. The separating unit 312 can separate the information based on one or more identifiers included in the information. Information that is placed in the target queue 314' is processed by the CIU 212. The CIU 212 processes the information being held in the target queue 314' and issues commands to the storage unit 214. The CIU 212 can provide a response to the information processed by the IPO 308 when appropriate. The CIU 212 places responses into the output queue 306'. The output queue 306' can be implemented in a similar manner as the output queue 306, except that the output queue 306' can receive inputs from the CIU 212 and the EBM 320. Otherwise, the embodiment of the module 702 depicted in FIG. 3E, functions in an identical manner as the routing module 300 depicted in FIG. 3A.

The inner routing modules 104 and the outer routing modules 106 can be implemented in accordance with those embodiments depicted in FIGS. 3A-E. In a preferred embodiment, the IPO 308 of the outer routing module 106 can be greatly diminished. For example, the outer routing module 106 need not perform any management functions associated with the managing the memory modules 102 beyond occasional notifications of its own condition (e.g. power-up and power-down) and possibly one-by-one sending of broadcast information (e.g. power-down, mode change, etc). In addition, the outer routing module 106 may or may not include a cache unit 324 in the EBM 320. Since the outer routing module 106 can be a reduced/optimized version of the embodiments of the routing modules depicted in FIGS. 3A and 3C-E, the outer routing module 106 can consume less power than the inner routing module 104. The data routing modules described herein can be formed, at least in part, using solid state or MEMS technology. For example, the routine modules can process the information, which can be in the form of light, using electromechanical mirrors.

The data interface module 108 of the device 100 can interface with external devices and is communicatively coupled to the outer routing module 106. The data interface module 108 can convert an interface of an external device using a specified interface, such as HDD interface (e.g., SATA or SAS), an Ethernet interface, or any other suitable interface known to those skilled in the art. The data interface module 108 can perform error checking and correcting (ECC) operations. The ECC operations can be, for example, Reed-Solomon coding or variations of the same. The ECC processing can be included in the data interface module 108 to provide maximum consolidation of the device 100 and to provide maximum reusability of the various components of the device 100. Placing the ECC processing in the data interface module 108 also allows for correcting transit errors from interference on the buses 122, 124, and 126 along with spontaneous changes in the storage units 214 (FIG. 2).

While exemplary embodiments of the data interface module 108 include the ECC processing in the data interface module, the ECC processing can be implemented in other modules of the device 100. For example, the ECC processing could be implemented in one or more of the outer routing module 106, the inner routing modules 104, and/or the memory modules 102. Alternatively, ECC processing may not be implemented by the device 100.

In one embodiment, buses 122 and 124 each include two buses. The first bus can be referred to as a next-target bus. The next-target bus is a bus that can operate at low speeds. In one example, the bus 122, which connects the inner routing module 104 to a group of the memory modules 102, can include the next-target bus to provide a path to notify one or more of the memory modules 102 in the group to which the next instruction is going to be directed based on the look-ahead value. The memory modules 102 to which information is directed can be referred to as target memory modules. Both the memory modules 102 and the inner routing modules 104 can set/read the next-target bus at the appropriate time. In one example, where each inner routing module 104 connects to one of the groups 10 having sixty-four memory (64) modules 102, the next-target bus can consist of at least six lines allowing for sixty-four (64) addresses to enable a unique identification of each of the memory modules 102 in each group 10.

The second bus can be referred to as an instruction-bus. The instruction-bus can carry information between the outer routing modules 106, the inner routing modules 104, and/or the memory modules 102. Various types of information can be passed using the instruction-bus, which can include issue-command instructions, get-response instructions, and/or no-operation instructions.

The issue-command instruction is an instruction that is passed to a target memory module for processing by the target memory module. The issue-command instruction is placed in the input queue 204 of the target memory module to begin the processing of the issue-command instruction.

The get-response instruction is handled directly by the EBS 202 in the target memory module 102. The EBS 202 reads the first response from the output queue 206 and sends the payload data to the EBM 320 of the inner routing module 104.

The no-operation instruction indicates to the target memory module 102 that no action is to be taken by the target memory module 102. When the target memory module receives the no-operation instruction, the no-operation instruction is discarded within the EBS 202 of the target memory module 102.

Using the EBM 320 as a strict bus controller eliminates any potential bus contention that may arise. This allows the buses to approximately reach a theoretical throughput limit. Various factors are taken considered when implementing the buses, such as capacitance, parasitic drain, resistance, etc.

Referring to FIGS. 1A and B through FIGS. 3A-E, each memory module 102 can a have a slower data transfer rate than the device 100 can have. For example, the memory modules 102 may implement the storage unit 214 with NVRAM in the form of currently available NAND flash memory, which may operate at a data transfer rate of 32 megabytes per second (MB/s). However, since the device 100 can be implemented according to the hierarchical architecture depicted in FIG. 1A, which can allow each memory module 102 of the device 100 to operate concurrently, the data transfer rate of the device 100 can be 32 MB/s multiplied by the number of memory modules 102 in the device 100. For example, when the device 100 is implemented with five hundred twelve (512) memory modules 102 divided among eight (8) groups 10, the device 100 can operate at a data transfer rate of about 16 GB/s (512×32 MB/s). Further, since the device 100 is scalable, more memory modules 102 can be included in the device 100 to increase the storage capacity as well as to increase the data transfer rate of the device 100.

In the disclosed embodiments, the device 100 can include five hundred twelve (512) memory modules 102 that include storage units composed of 16 gigabit NAND Flash designs. In some of these embodiments, the outer outing module 106 can connect to eight (8) inner routing modules 104 and each inner routing module 104 can connect to a group of sixty-four (64) memory modules 102. The device 100 can operate at a speed of, for example, about 16 GB/s for a read operation, and 12 GB/s for a write operation. As such, one or more 100-gigabit Ethernet connections with a performance of 12.5 GB/s, which is scheduled for general availability in late 2008, can be used to implement various aspects of this embodiment.

Figure 4A:
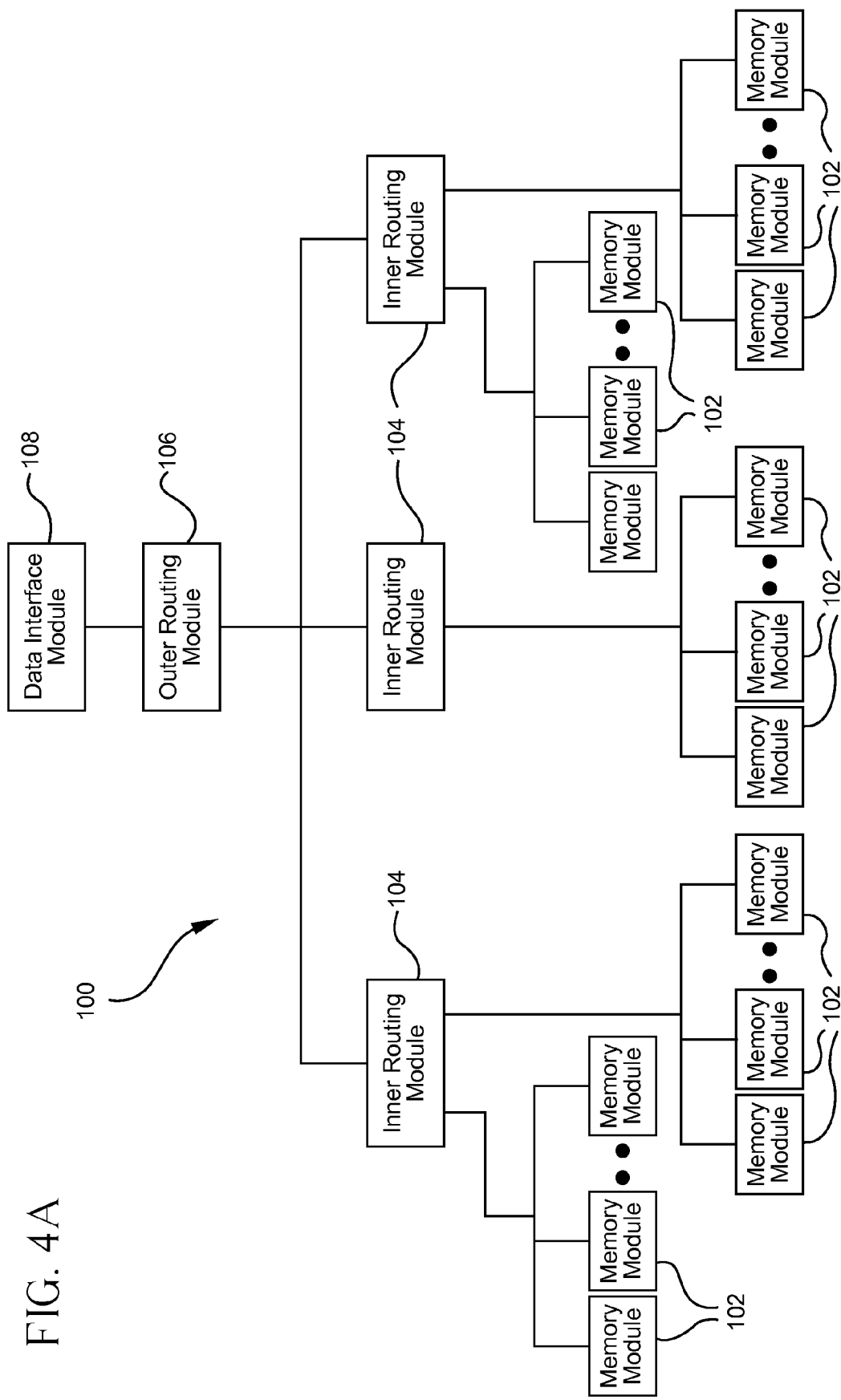
FIGS. 4A-C depict a data storage device implemented with a modified hierarchical architecture in accordance with a preferred embodiment of the present invention.
Figure 4B:
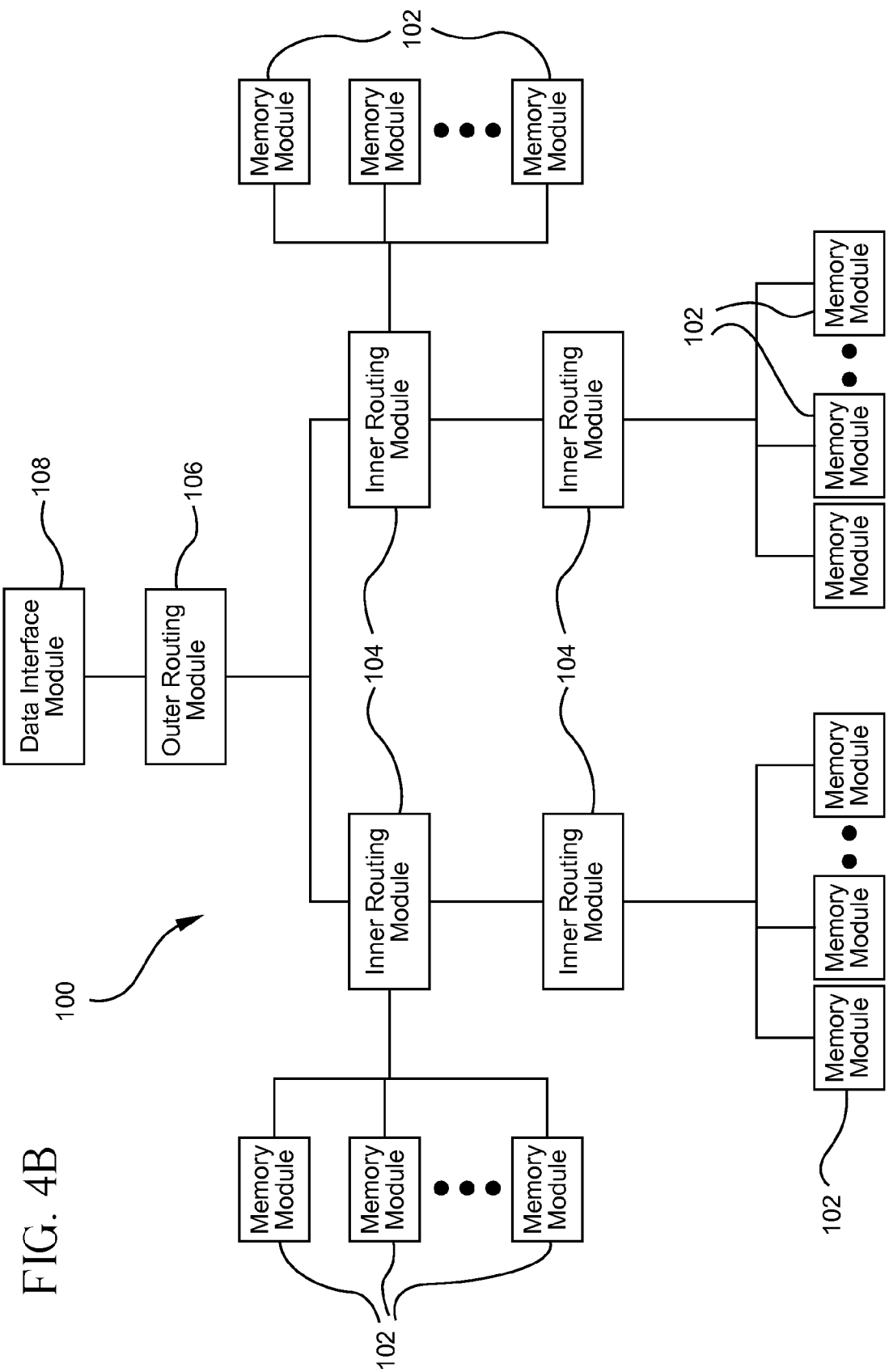
Figure 4C:
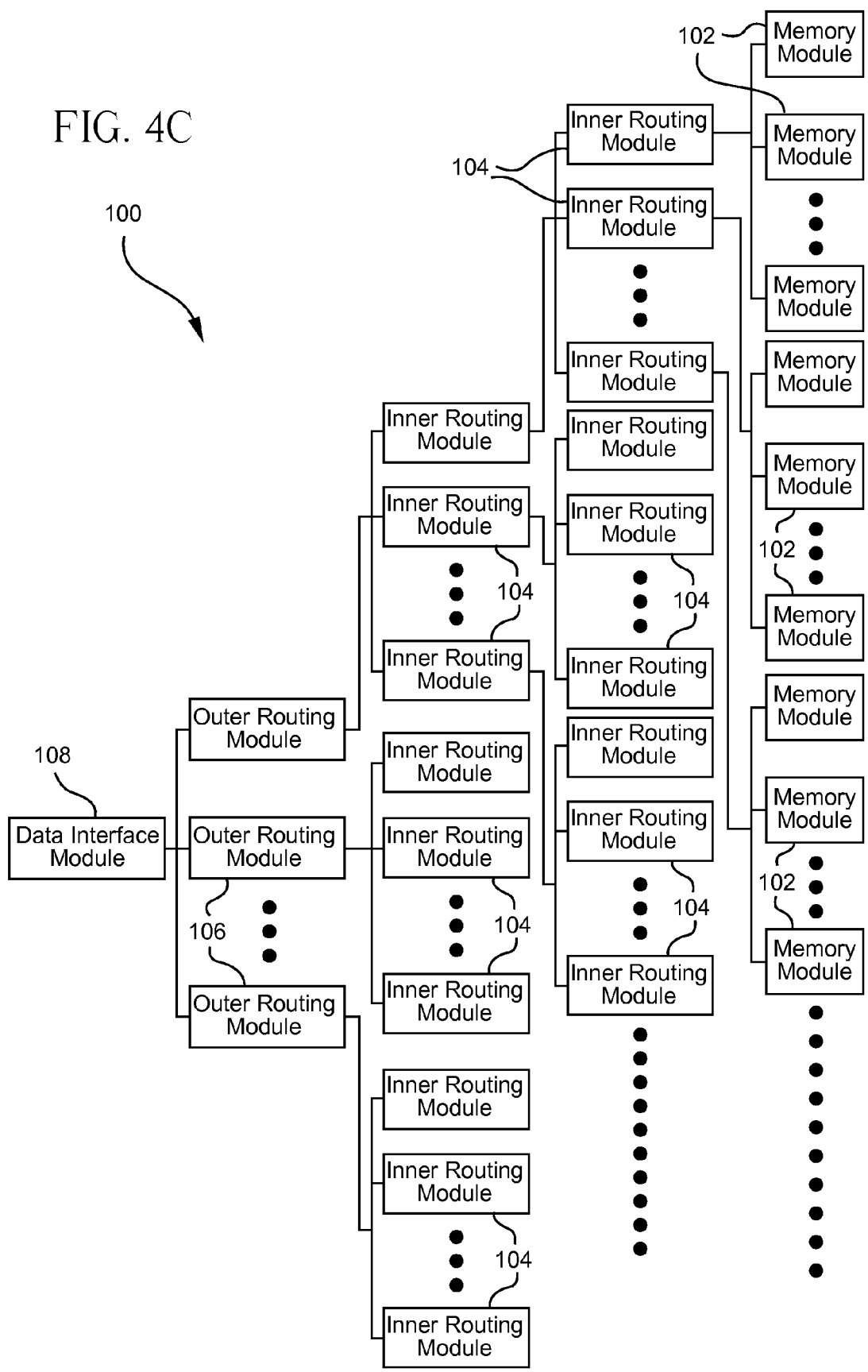

FIGS. 4A-C depict various embodiments of the present invention using a modified version of the hierarchical architecture depicted in FIG. 1A. The embodiments of the device 100 depicted in FIGS. 4A-C can function in a similar manner to the embodiment of the device 100 depicted in FIG. 1A. In FIG. 4A, the multiple groups 10 of memory modules 102 can connect to a single inner routing module 104. In FIG. 4B, there can be multiple inner routing modules 104 connected together and each inner routing module can be further connected to one or more groups 10 of memory modules 102. In FIG. 4C, another level of inner routing modules 104' can be added to the device 100. In this embodiment, the outer routing module 106 still connects to the inner routing modules 104. However, the inner routing modules 104 can each connect to a group of one or more inner routing modules 104', which in turn can connect to a group of memory modules 102.

Figure 5:
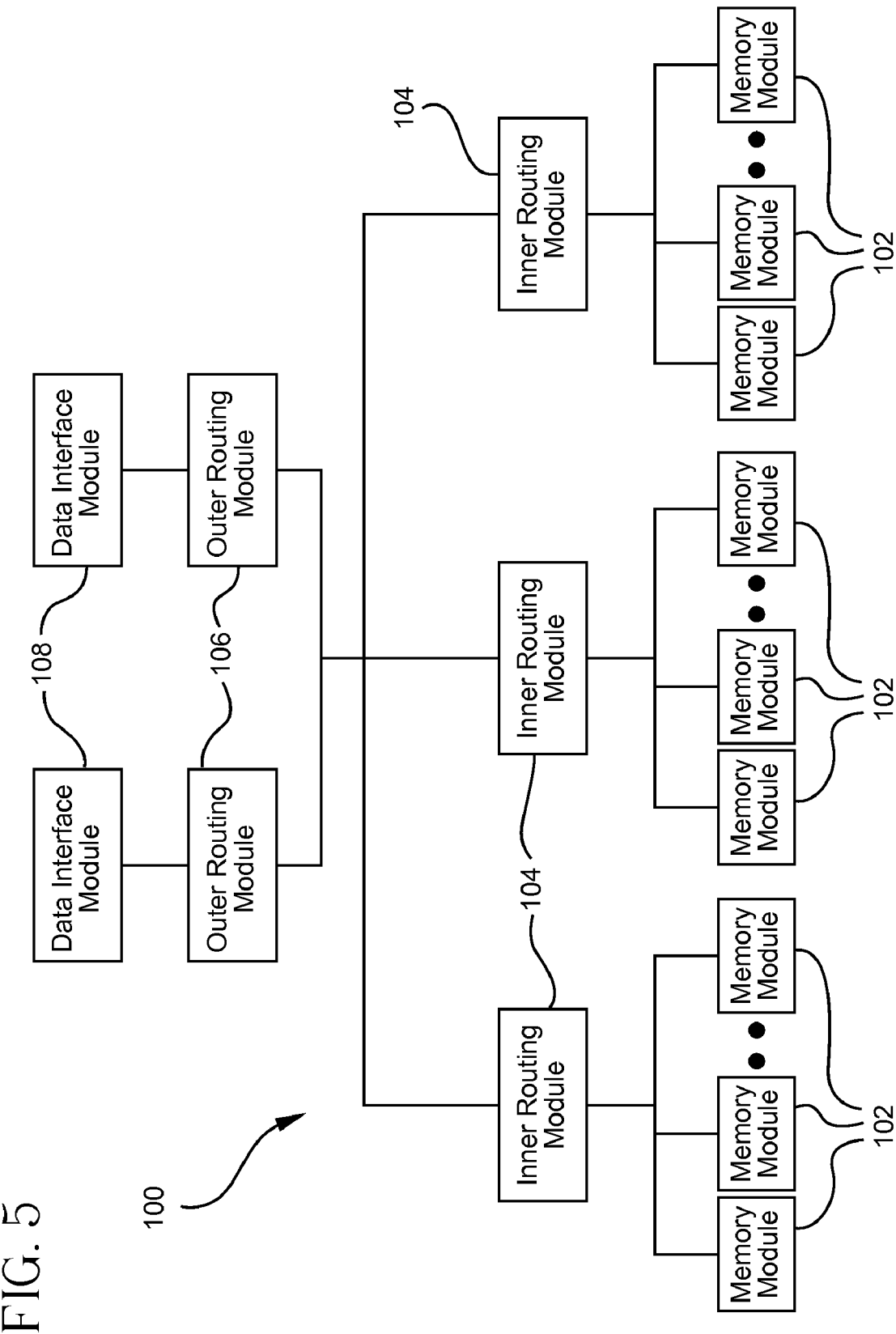
FIG. 5 depicts a data storage device implemented with another modified hierarchical architecture in accordance with a preferred embodiment of the present invention.

FIG. 5 depicts another embodiment of the hierarchical architecture of the device 100. In this embodiment, the device 100 can include multiple data interface modules 108 and/or multiple outer routing modules 106. The multiple data interface modules 108 and the multiple outer routing modules 106 can be provided for separating read and write paths and may allow the device 100 to operate at an increased data transport rate. Alternatively, or in addition, the multiple data interface modules 108 and the multiple outer routing modules 106 can be used for both read and write operations. In some embodiments, a single data interface module 108 can be used with multiple outer routing modules 106 or multiple data interface modules 108 can be used with a single outer routing module 106. Using multiple interfaces (e.g., data interface modules 108 and outer routing modules 106) can increase throughput of external data transport interfaces. The device can interface with multiple external interfaces such that each external interface can operate concurrently to account for the limitations of the external interfaces. For example, thirteen (13) 10-gigabit Ethernet channels, or two (2) 100-gigabit Ethernet channel, can support a data transfer rate of 16 GB/s at which the device 100 can operate.

Figure 6A:
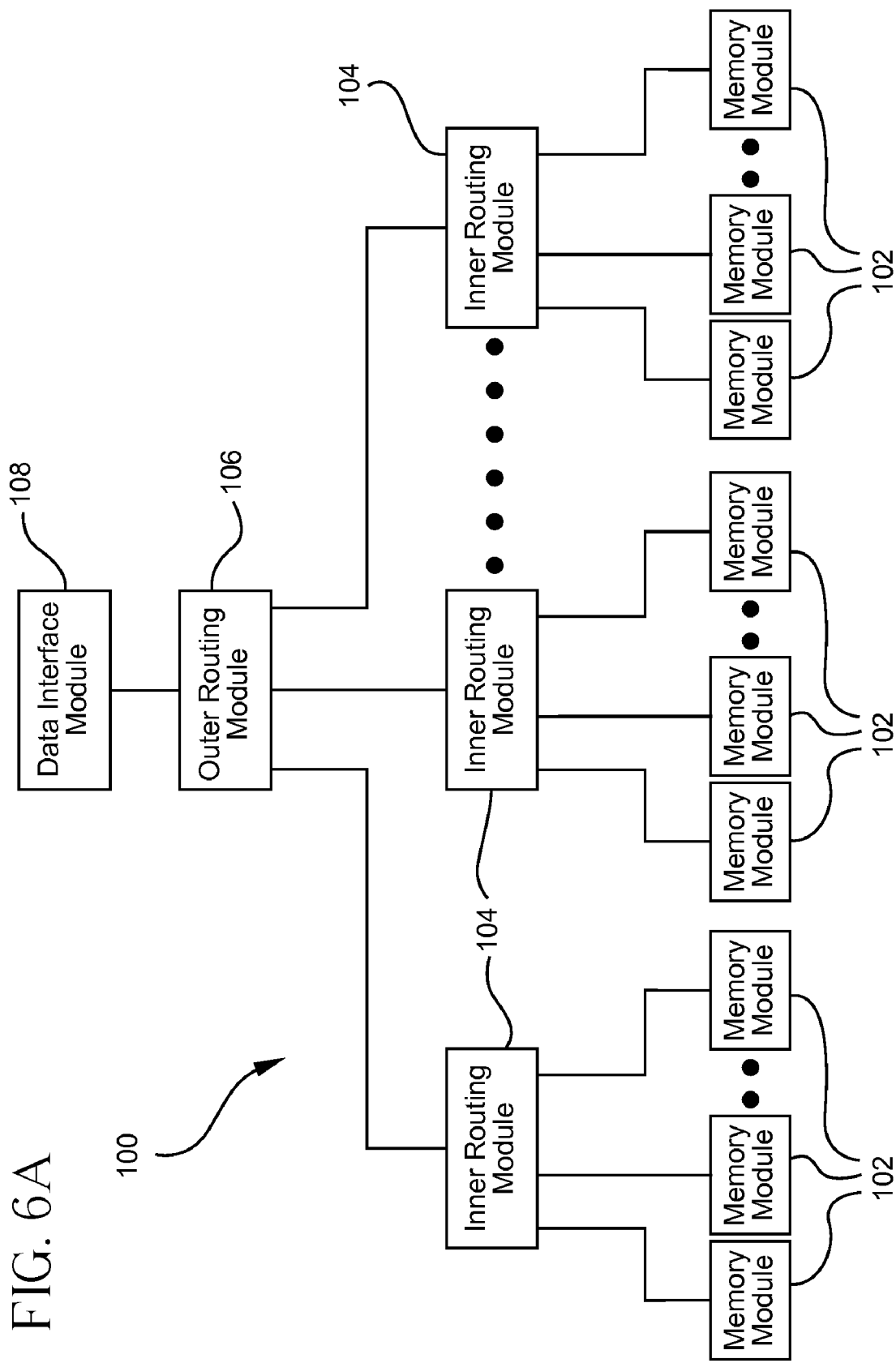
FIG. 6A depicts a data storage device implemented with a star architecture.

FIG. 6A depicts a star architecture of device 100 that is formed in accordance with the present invention. The star architecture of device 100 can include memory modules 102, inner routing module 104, outer routing modules 106, and the data interface module 108. The star architecture of device 100 can function in a similar manner as the hierarchical architecture depicted in FIG. 1A. The star architecture uses point-to-point connections so that, for example, each inner routing module 104 independently connects to the outer routing module 106 and each memory module 102 independently connects to a corresponding inner routing module 104.

Figure 6B:
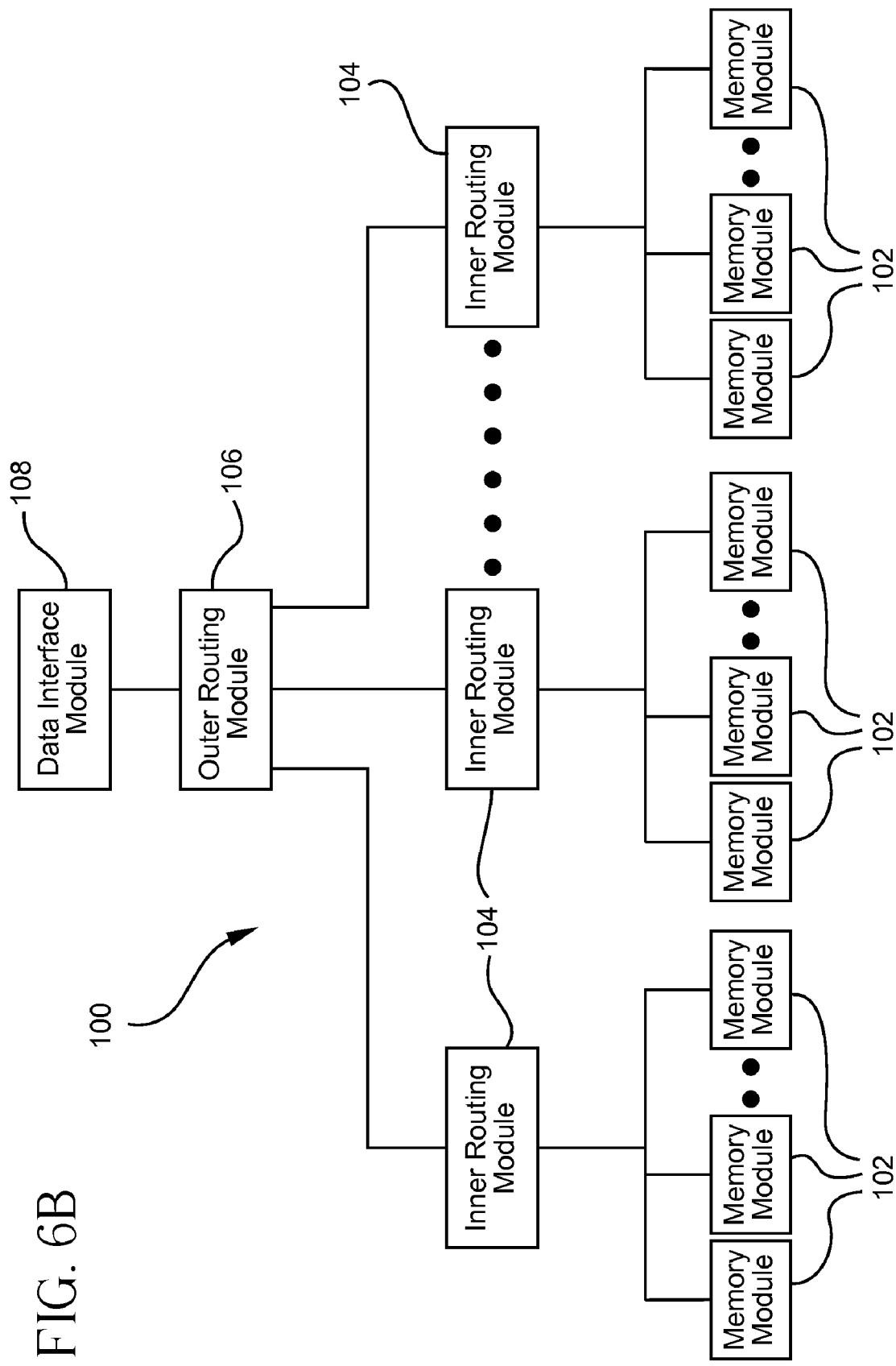
FIG. 6B depicts a data storage device implemented with a modified star architecture.

FIG. 6B depicts a modified star architecture of device 100 in accordance with the present invention. The modified star architecture of device 100 can include memory modules 102, inner routing module 104, outer routing modules 106, and the data interface module 108. The modified star architecture of device 100 can function in a similar manner as the hierarchical architecture depicted in FIG. 1A. The modified star architecture uses point-to-point connections between the outer routing module 106 and the inner routing modules 104 to independently connect each of the inner routing modules 104 to the outer routing module. The connection between the inner routing modules 104 and the memory modules 102 remain the same as depicted in FIG. 1A.

The modified star architecture can provide some bus management optimizations over the hierarchical architecture and the star architecture. By connecting the outer routing module 106 to the inner routing module 104 using the star architecture (i.e. point-to-point connections), the buses in the device 100 can be run from the same clock, which may save engineering time. The outer routing module can be optimized using the star architecture to reduce the number of transistors required to implement the outer routing module 106 by raising the number of buses required to communicate with the inner routine modules 104. The inner routing module can have an optimized EBS 302 since it no longer has to consider the target address of the incoming information.

Figure 7:
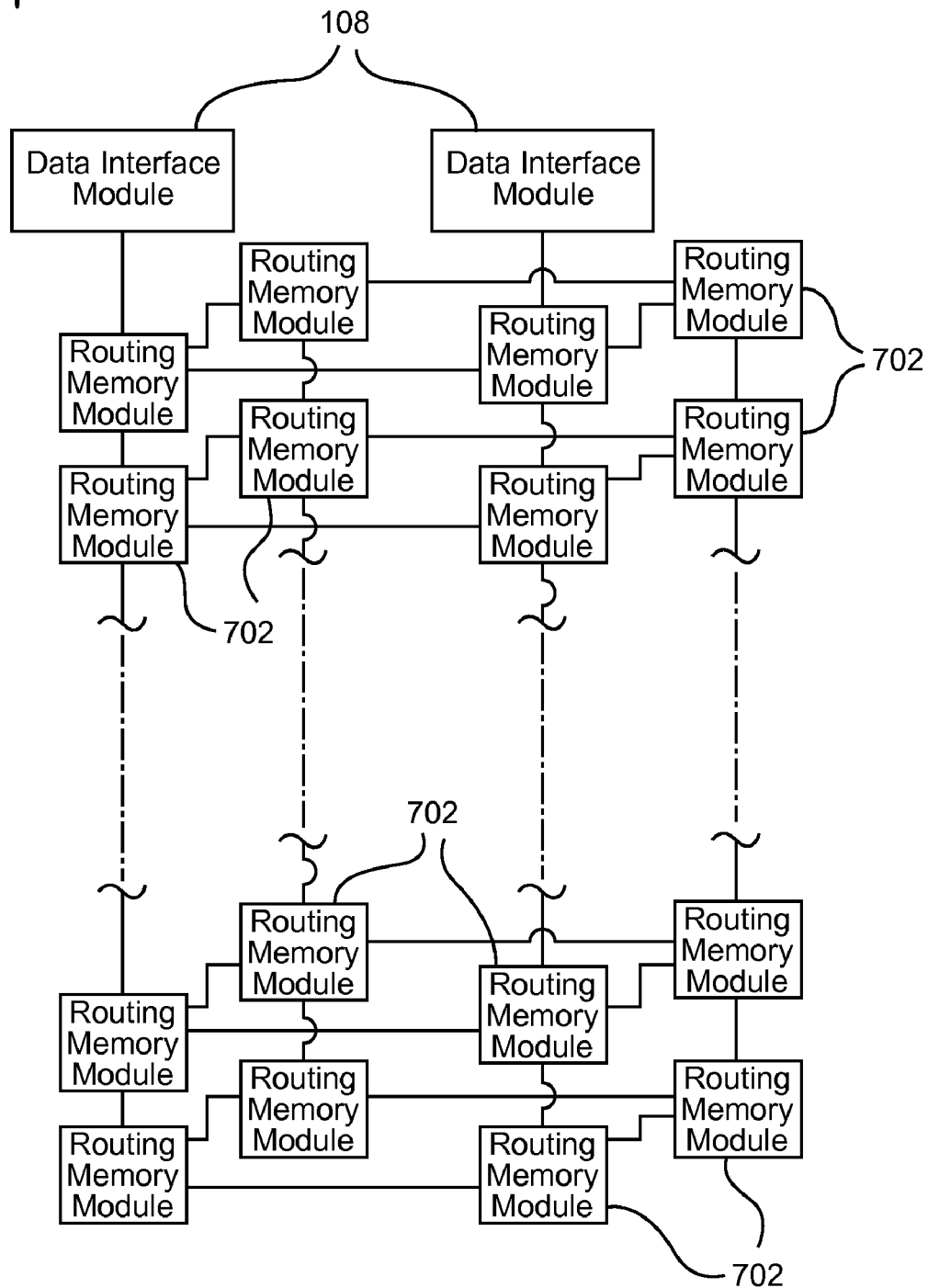
FIG. 7 depicts a data storage device implemented with a cube connectivity architecture.

FIG. 7 depicts a cubed connectivity hierarchy of the device 100 that is formed in accordance with the present invention. The cubed connectivity architecture of the device 100 can include multiple interfaces 108 connected to multiple routing memory modules 702. The routing memory module 702 can be an optimized combination of one of the routing modules (e.g., routing module 300) and one of the memory modules 102. In operation, information that is received by one or more of the data interface modules 108 is passed to one of the routing memory modules 702. Each routing memory module 702 is communicatively coupled to four other modules. When one of the routing memory modules 702 receives the information, the routing memory module 702 determines the destination of the information. If the destination of the information is the storage unit in the routing memory module 702, the routing memory module 702 performs the operation included in the information, for example, to store data contained in the information. If, however, the routing memory module 702 is not the destination, the routing memory module 702 pushes the information to another one of the routing memory modules 702, which performs the same process. The process can continue until the information reaches the appropriate destination.

Figure 8:
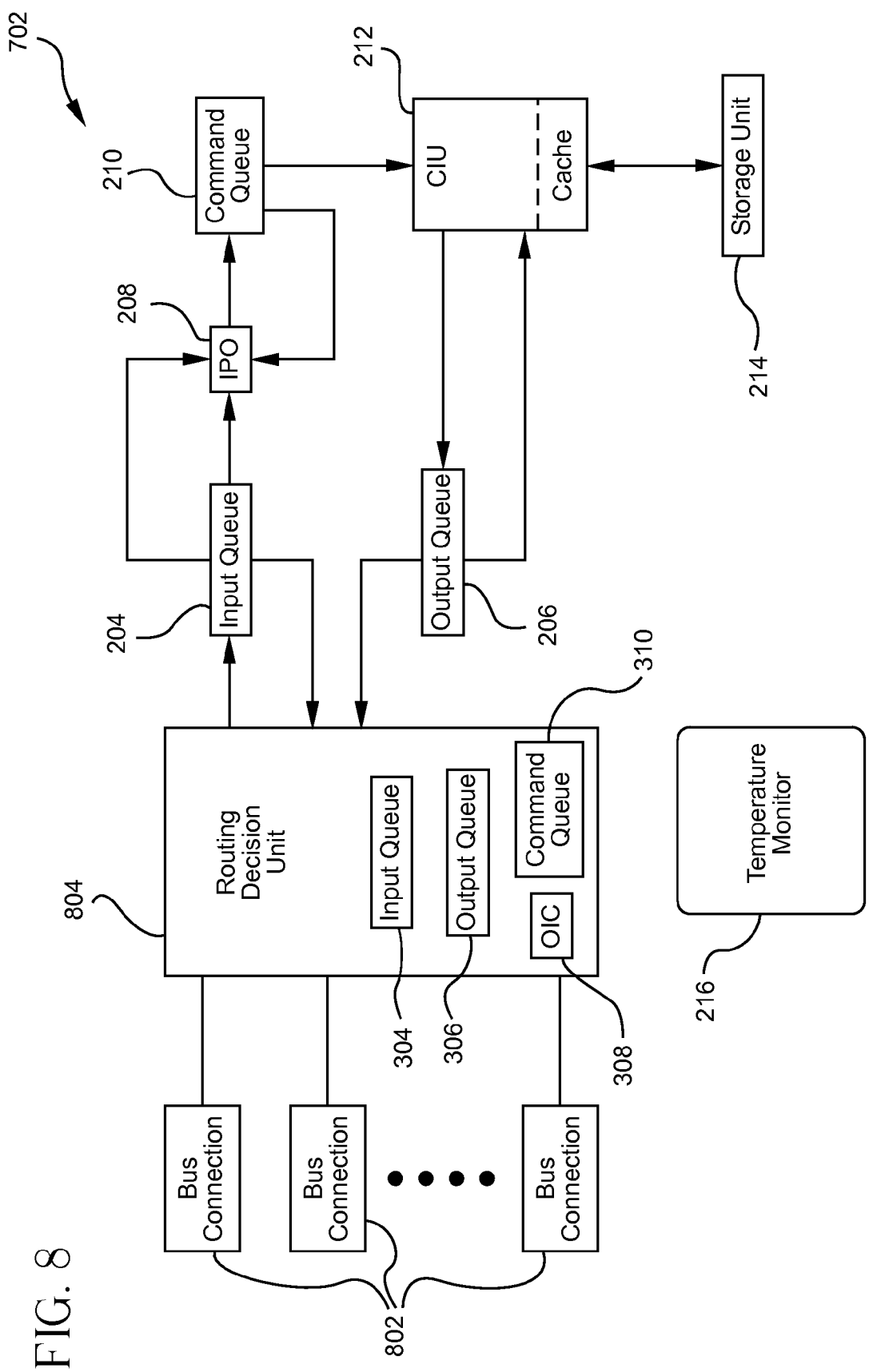
FIG. 8 depicts a preferred embodiment of a routing memory module in accordance with the present invention.

FIG. 8 depicts a preferred embodiment of the routing memory module 702. The routing memory module 702 can include multiple bus connections 802, a routing decision unit 804, the input queue 204, the output queue 206, the IPO 208, the command queue 210, the CIU 212, and the storage unit 214. The bus connections 802 can connect the routing memory module 702 to one or more buses and can provide some, none, or all of the functionality of the EBS 302 and/or the EBM 320. The bus connections 802 can provide multiple paths through which the information can be sent to and from the routing memory module 702. This enables the routing memory module 702 to connect to multiple modules in the data storage device 100 each module being decoupled from one another as a result of the routing decision unit 804.

The routing decision unit 804 can function to route information to the CIU 212 to perform an instruction included in the information or can route the information to another module. The routing decision unit 804 can include the input queue 304, output queue 306, target queues 314, and/or OIC 318, which can function and be configured in a similar manner as that of the routing module 300. Using an identifier included in the information, the routing decision unit can determine whether it represents a destination for the information or whether another module is the destination of the information. For the case where the routing memory module 702 is not the destination, the routing decision unit 804 can determine where to send the identifier in the information and/or by using a routing protocol, such as, for example, the Border Gateway Protocol (BGP) standard defined by the Internet Engineering Task Force (IETF) or any other suitable routing protocols known to those skilled in the art. The routing decision unit 804 can also connect to the input queue 204 and the output queue 206 to pass data to and receive data from the CIU 212. The remaining connections are identical to those of the memory module 102 and operate in the same manner.

Thus in operation, the routing memory module 702 can receive information via one or more of the bus connections 802. The bus connection(s) can pass the information to the decision routing unit 804, which determines whether an identifier included in the information corresponds to the routing memory module 702. If the identifier does correspond to the routing memory module 702 and the input queue 204 is not full, the routing decision unit 804 can place the information into the input queue 204. Once the information is placed in the input queue 204, the information can be processed in a manner that is identical to the processing of information in the memory module 102. Likewise, when there is a response available in the output queue 206, the routing decision unit 804 can remove the information from the output queue 206 and pass it to another module via one or more of the bus connections 802.

When the routing memory module 702 does not represent the destination of the information, or in some instances if the input queue is full or if there output queue 306 provides a response, the routing decision unit 804 can route the information to another module using a routing protocol, such as version four (4) of the Border Gateway Protocol (BGP4) defined in Request For Comments (RFC) 4271.

Figure 9:
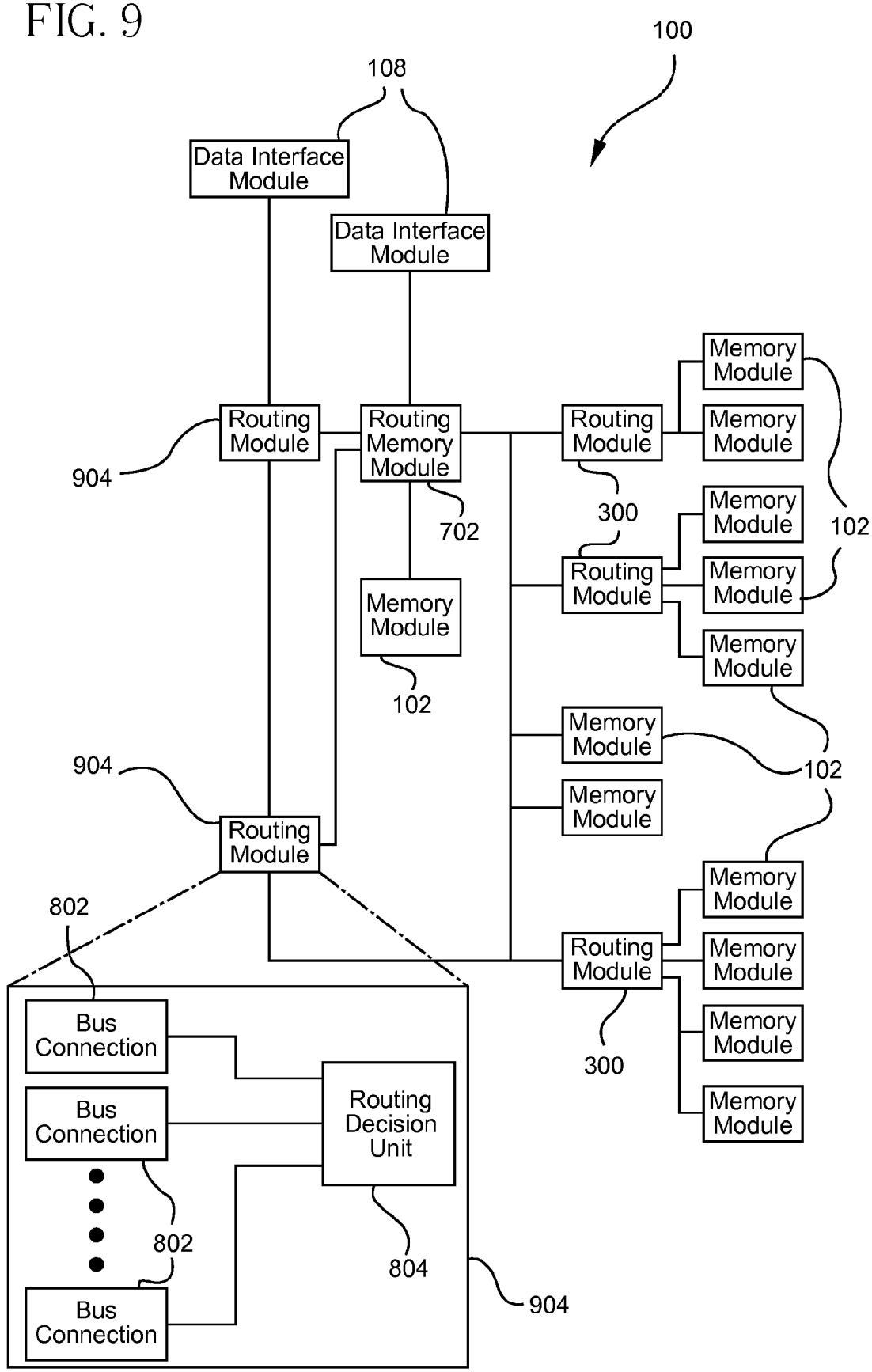
FIG. 9 depicts a data storage device implemented with a higher level connectivity architecture.

FIG. 9 depicts an embodiment of the device 100 formed in accordance with the present invention having higher levels of connectivity with multiple data interface modules 108. The device 100 can include memory modules 102, data interface modules 108, routing memory modules 702, and routing modules 904, which can be include the bus connections 802 and the routing decision unit 804 to route the information using a routing protocol, such as the BGP protocol. The data interface modules 108 can connect to one or more of the routing memory modules 702 or the routing modules 904. Each of the modules can be communicatively coupled to one or more other modules. Information can be routed as described herein and data can be stored in or retrieved from the memory modules 102 and/or the routing memory modules 702 as well as from a cache in the routing modules 904.

While various architectures have been disclosed herein, those skilled in the art will recognize that other architectures can be implemented without deviating from the scope of the present invention. For example, the portions of the device 100 may be implemented using one or more ring networks, such as arbitrated ring networks, token ring networks, combined token and arbitrated networks (hereinafter "combined ring network"), and segmented ring networks.

Figure 10:
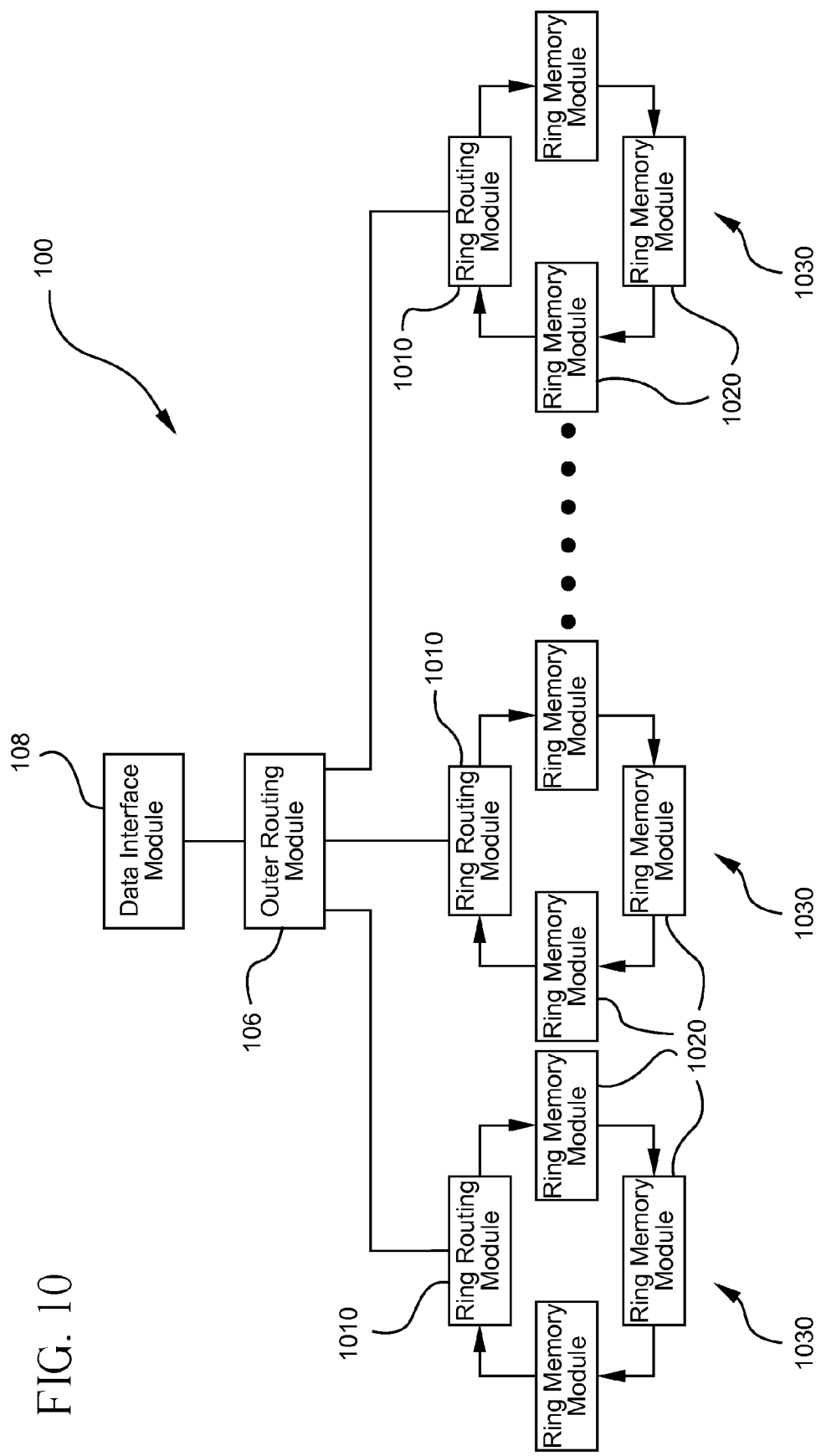
FIG. 10 depicts a data storage device implemented with a ring network architecture.

FIG. 10 depicts a block diagram a preferred ring network embodiment of the device 100 in accordance with the present invention. The device 100 preferably includes the data interface module 108, the outer routing module 106, ring routing modules 1010, and ring memory modules 1020. The outer routing module 106 can connect to a number of ring routing modules 1010. Each of the ring routing modules 1010 provide an entry point onto a ring 1030 of ring memory modules 1020, which can store information or pass it along the ring 1030.

In operation, information can enter the device 100 via data interface module 108. The data interface module 108 can pass the information to the outer routing module 106, which can route the information to one or more of the ring routing modules 1010 based on one or more identifiers associated with the information. For example, the information can be passed from the outer routing module 106 to one of the ring routing modules 1010 based on an address included in the information. The ring routing module 1010 can pass the information to one of the ring memory modules 1020, which can perform the instructions included in the information or can pass the information to the next ring memory module on the ring 1030. This process can continue until the instructions included in the information are performed.

Figure 11:
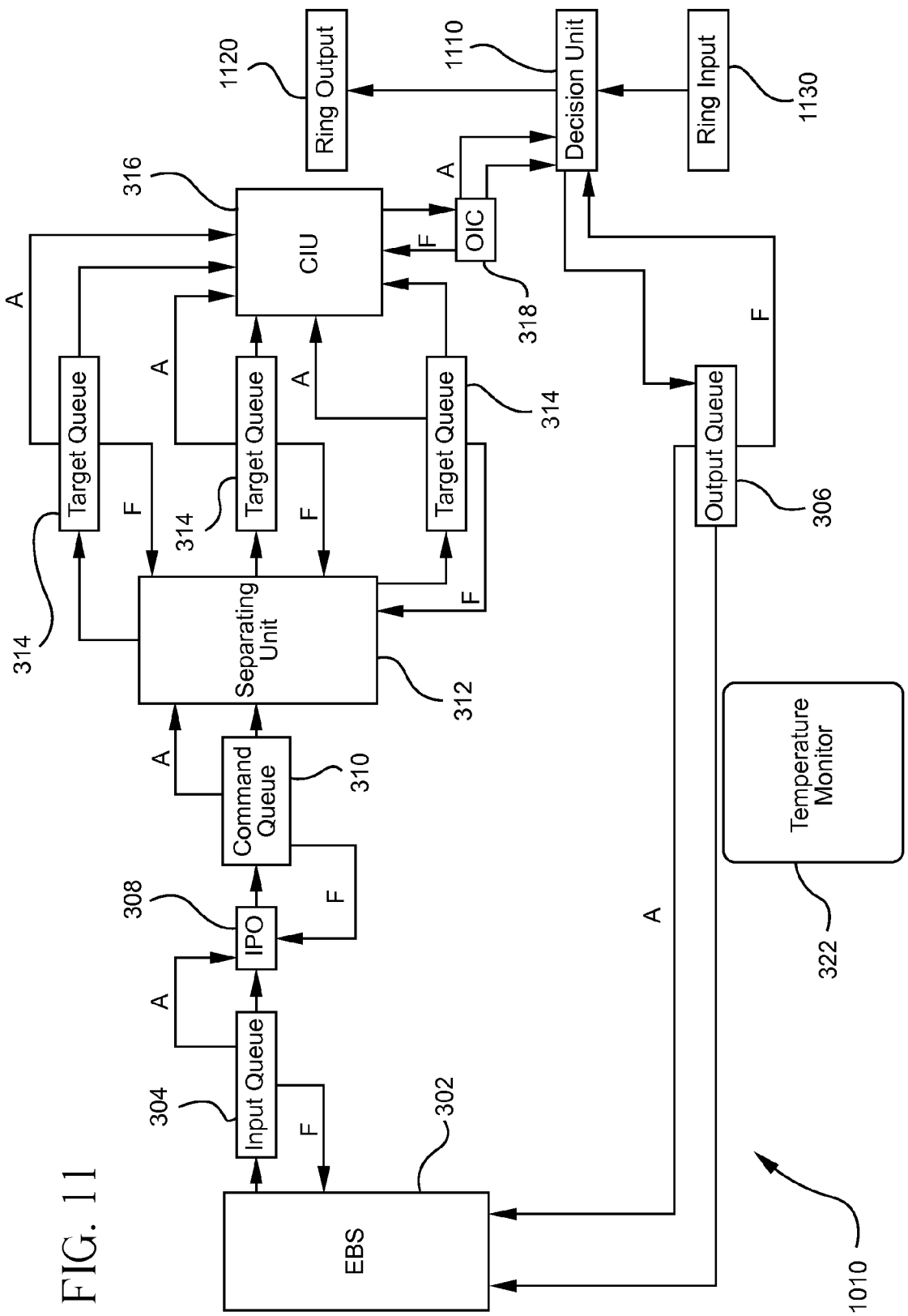
FIG. 11 depicts a block diagram of a ring routing module in accordance with a preferred embodiment of the present invention.

FIG. 11 depicts a block diagram of the ring routing module 1010 in accordance with a preferred embodiment of the present invention. The ring routing module 1010 preferably includes the EBS 302, input queue 304, output queue 306, IPO 308, command queue 310, separating unit 312, target queues 314, CIU 316, OIC 318, temperature monitor 322, a decision unit 1110, a ring output 1120, and a ring input 1130. The decision unit 1110 is communicatively coupled to the OIC 318, output queue 306, ring output 1120, and ring input 1130. Otherwise, the embodiment of the ring routing module 1010 depicted in FIG. 11, includes connections identical to those of the routing module 300 depicted in FIG. 3A.

The decision unit 1110 can receive information from the OIC 318. The decision unit can also receive information from the ring input 1130. The information received by the decision unit 1110 from the ring input 1130 can be a response related to a completed instruction or can be information related to a request for the performance of an instruction. If the information is a response, the response is placed in the output queue 306 to be propagated towards the data interface module 108. However, if the information is a request that has not been performed, the decision unit can simply pass the information to the ring output 1120 and ultimately the next module on the ring 1030. As a result, the information can continue around the ring 1030 until the instruction is performed. Otherwise, the ring routing module 1010 functions in the same manner as the routing module 300 depicted in FIG. 3A.

Figure 12:
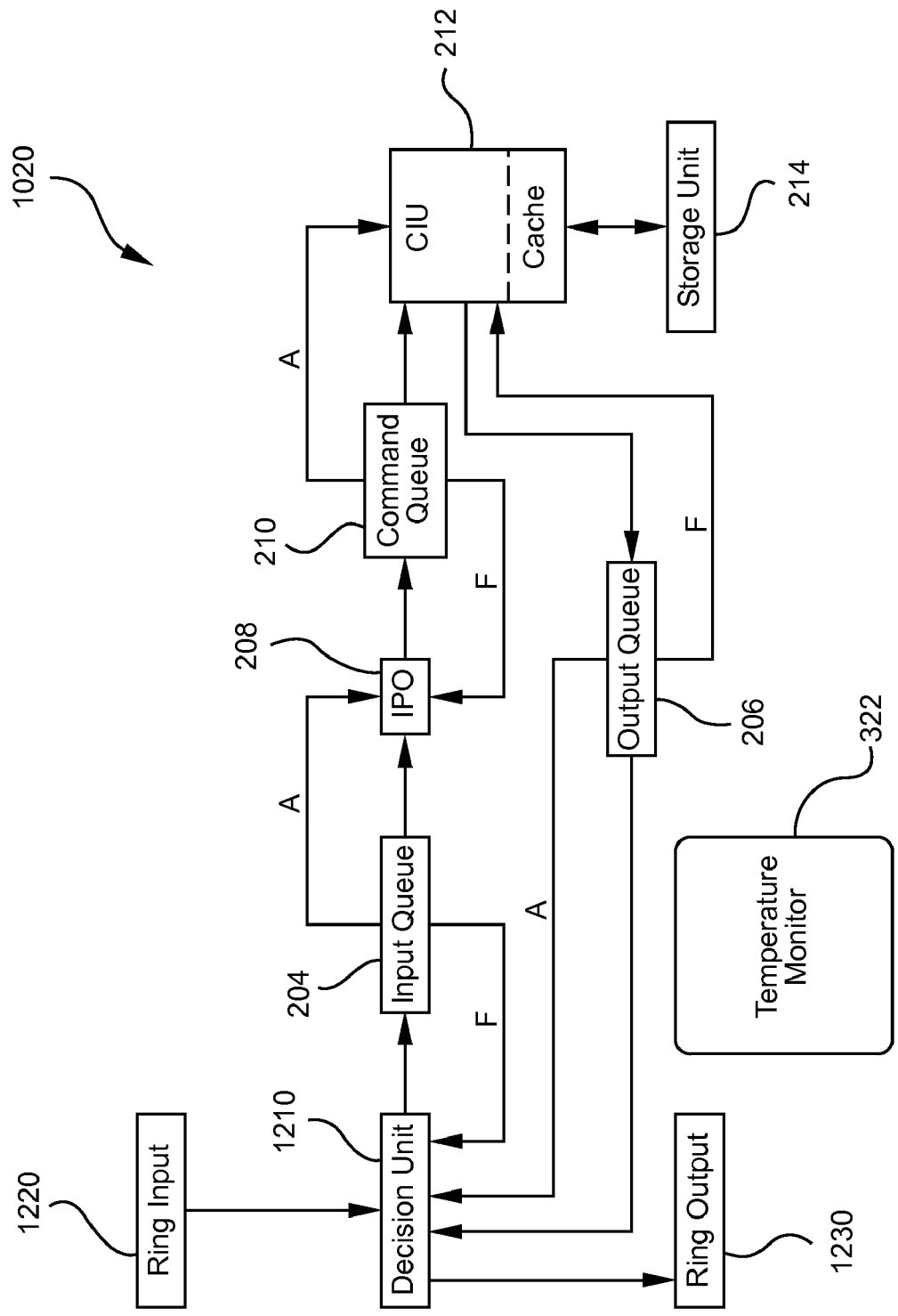
FIG. 12 depicts a block diagram of a ring memory module in accordance with a preferred embodiment of the present invention.

FIG. 12 depicts a preferred embodiment of the ring memory module 1020. The ring memory module 1020 preferably includes the input queue 204, output queue 206, IPO 208, command queue 210, CIU 212, storage unit 214, temperature monitor 216, a decision unit 1210, a ring input 1220, and a ring output 1230. The decision unit 1210 is connected to the input queue 204, output queue 206, ring input 1220, and the ring output 1230. Information can enter the ring memory module 1020 from the ring 1030 through the ring input 1220. The ring input 1220 can pass the information to the decision unit 1210. The decision unit 1210 determines whether it is the destination for the information based on an identifier, such as an address, included in the information. If so, the decision unit 1210 places the information in the input queue, after which the information is processed in a similar manner as the processing performed by the memory modules 102. Likewise, a response can be processed by the CIU 212 and sent to the decision unit 1210 in a similar manner as a response is processed by the memory module 102. When the ring memory module 1020 is not the destination and/or a response is available, the decision unit 1210 can pass the information and/or response to the ring output 1230, which can place the information and/or response ring 1030. The information can continue around the ring 1030 until the information reaches its destination or times out as described above. The response can ultimately be propagated towards the data interface.

Figure 13:
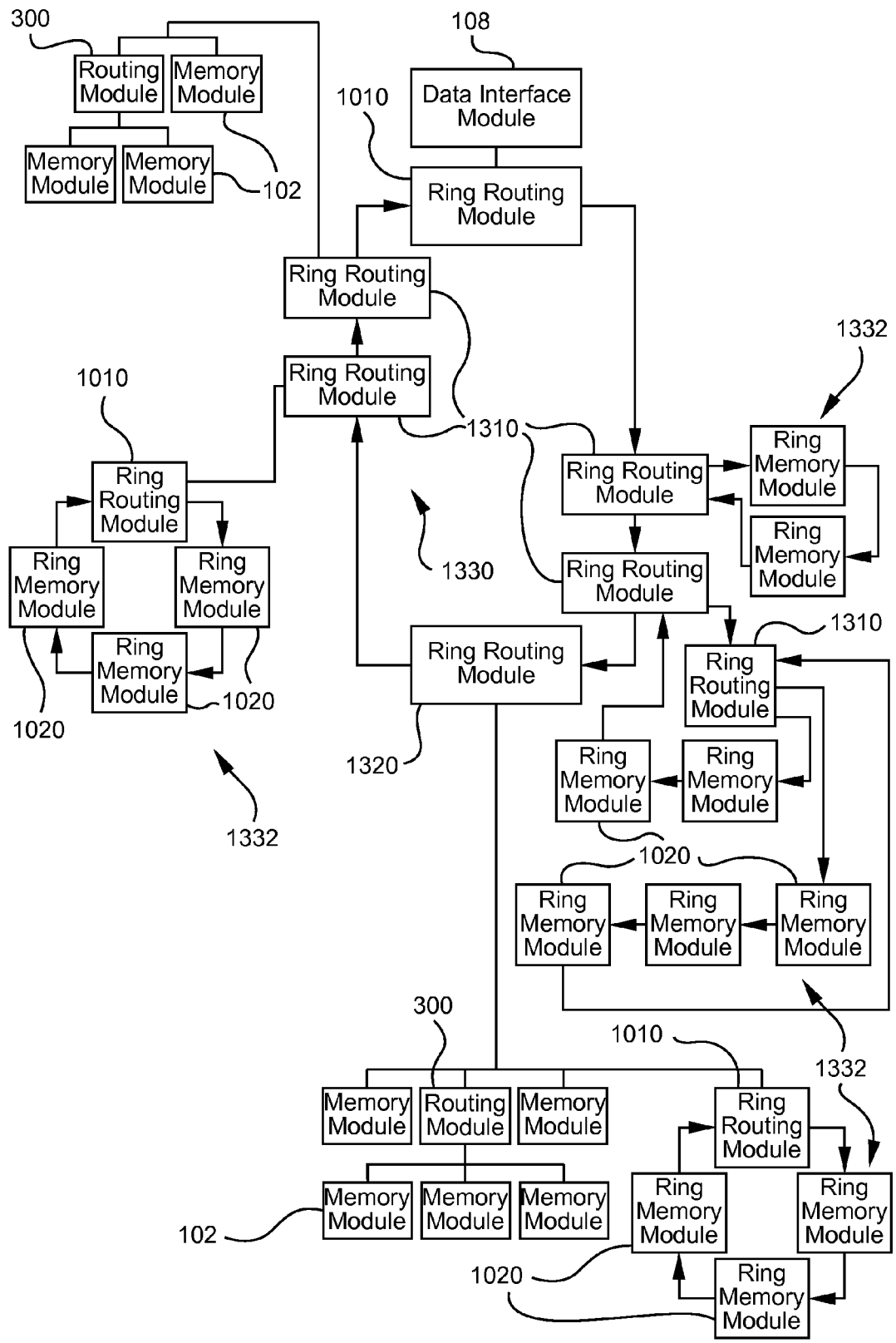
FIG. 13 depicts a block diagram of data storage device implemented with a modified ring network architecture.

FIG. 13 depicts another embodiment of the device 100 implemented with a ring network architecture. The device 100 can preferably include the memory modules 102, the routing module 300 (e.g., inner routing module 104 and outer routing module 106), data interface module 108, ring routing module 1010, ring memory module 1020, a ring routing module 1310, and a ring routing module 1320. The ring routing module 1010, ring routing modules 1310 and the ring routing module 1320 can be interconnected to form a ring 1330. Each of the ring routing modules 1310 and 1320 can connect to other modules. For example, the routing modules 1310 and 1320 can connect to one or more rings 1332, which can include ring memory modules 1020. Additionally, or in the alternative, each ring routing module 1310 and 1320 can connect to one or more memory modules 102 and/or routing modules 300.

Information can enter the device 100 through the data interface module 108, which can pass the information to the ring routing module 1010. The ring routing module 1010 can pass the information along the ring 1330. The information can pass through one or more of the ring routing modules 1310. When information enters each of the ring routing modules 1310 and 1320, the ring routing module determines whether it represents, at least in pail, a destination that corresponds to an identifier in the information. If it is not the destination, the information continues around the ring 1330 until the information reaches its destination or times out. When one of the ring routing modules 1310 and 1320 represents the destination, it removes the information from the ring 1330 and processes the information to propagate the information towards a final destination. The information may then pass around one of the rings 1332 until it reaches its final destination or may pass to one or more of the memory modules 102, in some cases, via one or more routing modules 300.

Figure 14:
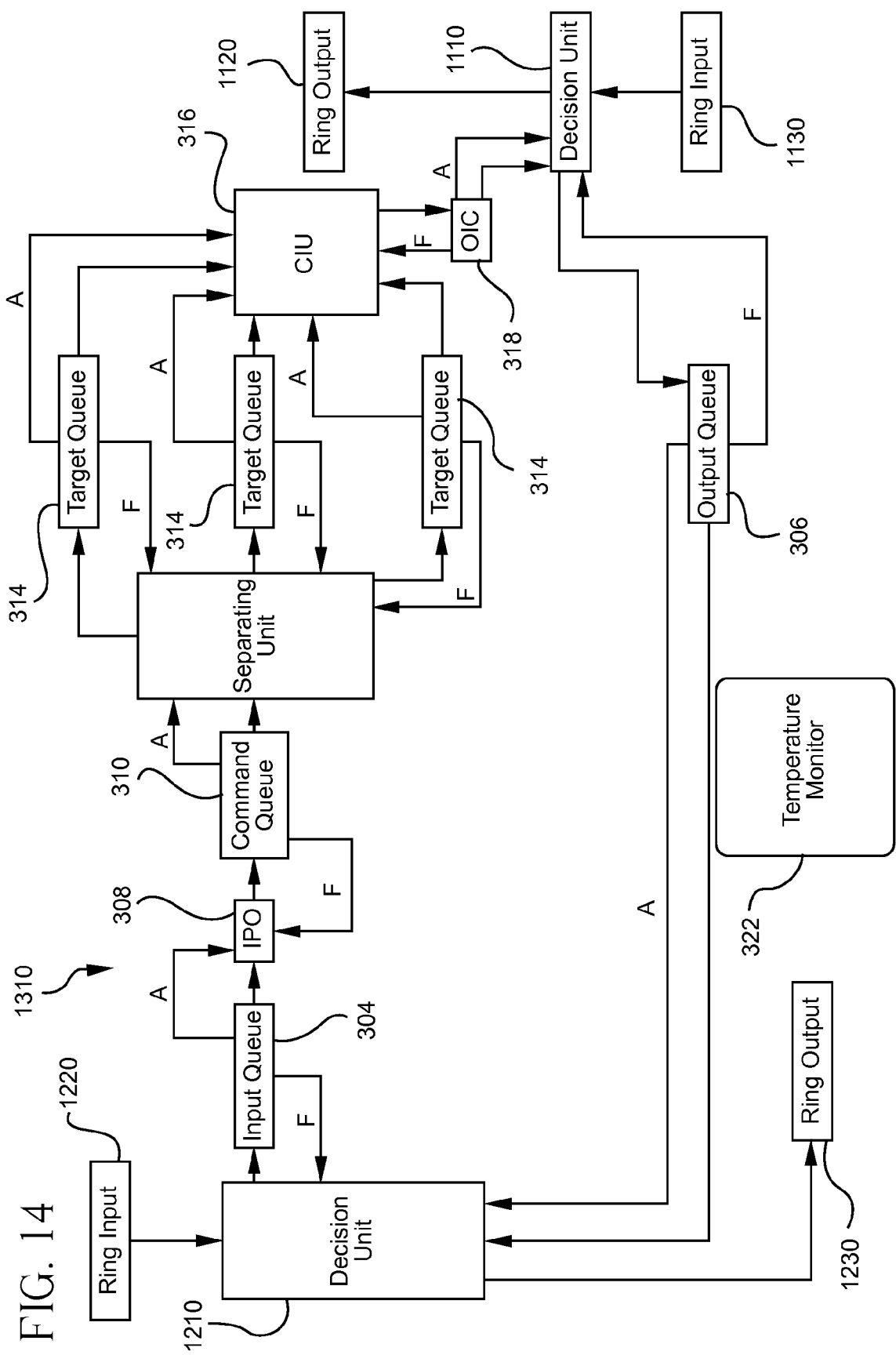
FIG. 14 depicts a block diagram of another ring routing module in accordance with a preferred embodiment of the present invention.

FIG. 14 depicts a preferred embodiment of the ring routing module 1310. The ring routing module 1310 can preferably include the decision unit 1110, ring output 1120, ring input 1130, decision unit 1210, ring input 1220, ring output 1230, as well as components of the routing module 300 with the exception of the EBS 302 and the EBM 320 (FIG. 3A). The connections of the components from the routing module 300 remain unchanged in the ring routing module 1310 except that the decision unit 1210 connects to the input queue 304 and the output queue 306 and the decision unit 1110 connects to the OIC 318 and the output queue 306. Information is passed between the decision unit 1210 and the decision unit 1110 in the same manner as information is passed between the EBS 302 and EBM 320.

Information can enter the ring routing module 1310 through the ring input 1220. The ring input 1220 can pass the information to the decision unit 1210. The decision unit 1210 processes information received, in the manner described herein, to either pass the information to the ring output 1230 or pass the information towards the decision unit 1110. The decision unit 1110 processes information it receives, in the manner described herein, to pass information to the ring out 1120 or towards the decision unit 1210.

Figure 15:
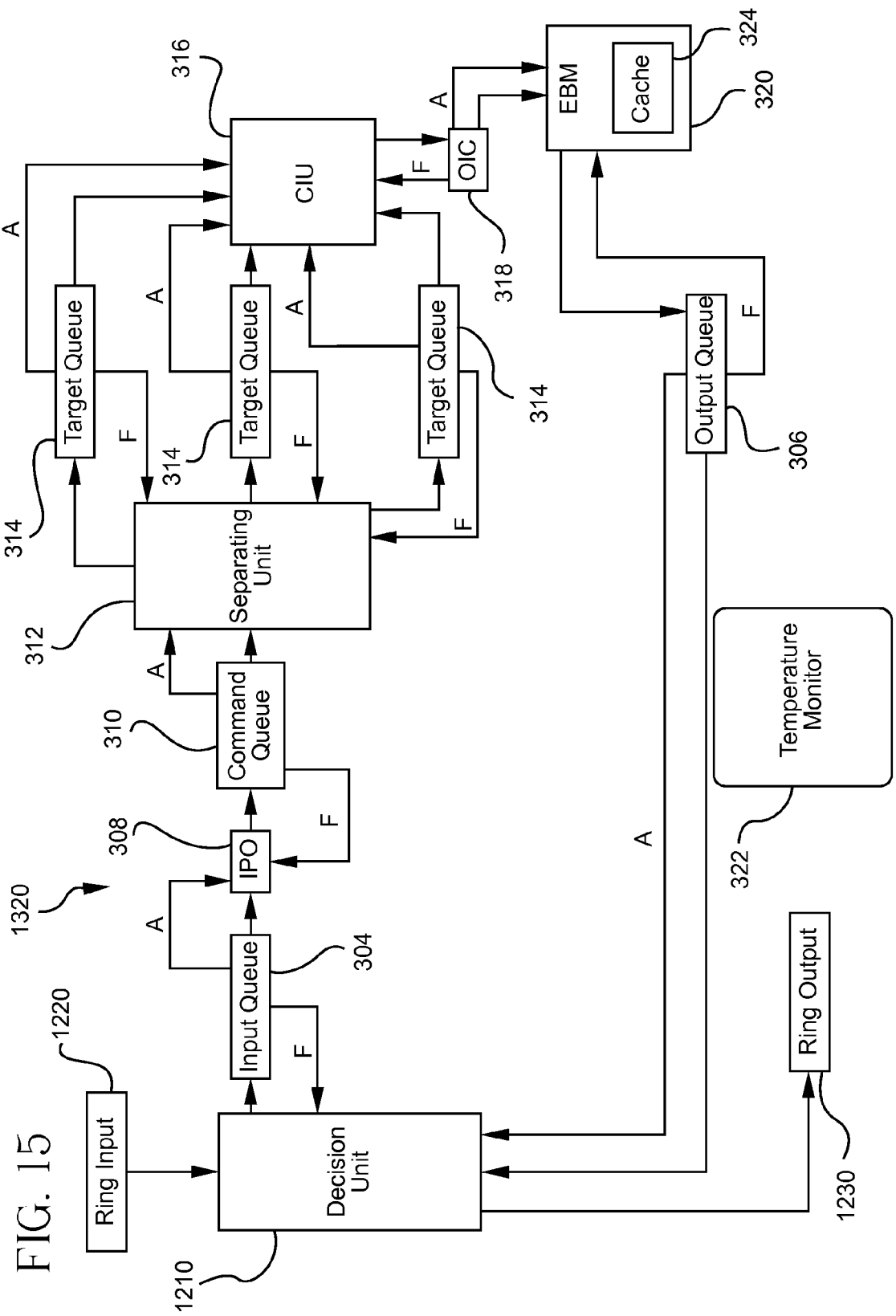
FIG. 15 depicts a block diagram of yet another ring routing module in accordance with a preferred embodiment of the present invention.

FIG. 15 depict a block diagram of a preferred embodiment of the ring routing module 1320. The ring routing module 1320 can preferably include the decision unit 1210, ring input 1220, and ring output 1230, as well as the components of the routing module 300 with the exception of the EBS 302 (FIG. 3A). The connections of the components in the ring routing module 1320 are identical to the connections of the routing module 300, except that the decision unit 1210, not the EBS 302, is connected to the input queue 304 and the output queue 306. The decision unit 1210 processes information it receives, in the manner described herein, to pass the information to the ring output 1230 or to pass information towards the EBM 320.

Figure 16:
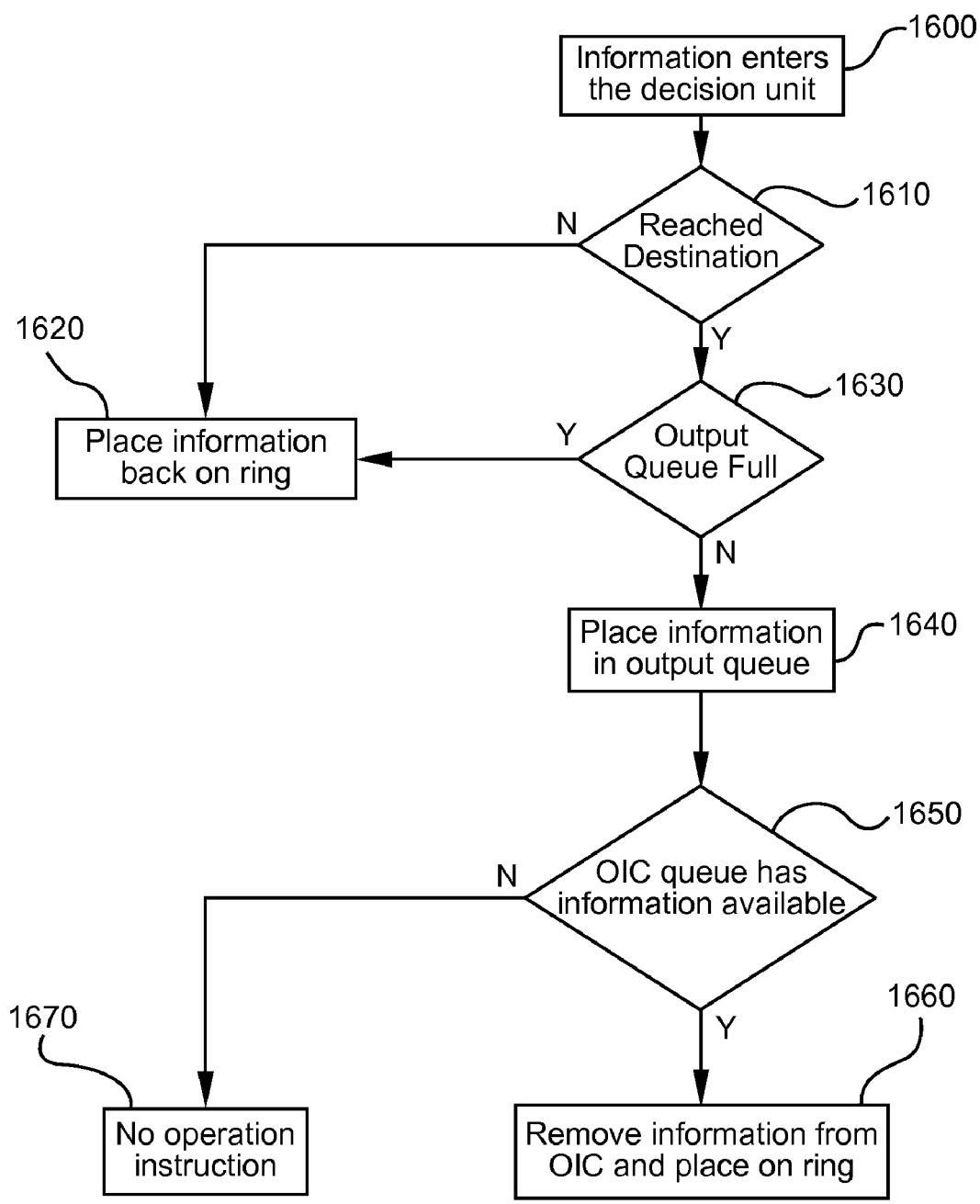
FIG. 16 depicts a flow diagram of the operation of a decision unit in a ring routing module.

FIG. 16 depicts a flow diagram of a preferred operation of the decision unit 1110. The decision unit 1110 can receive information from the ring input 1130 (step 1600). The decision unit 1110 determines whether it corresponds to a destination for the information based on one or more identifiers included in the information. If the decision unit 1110 determines that it does not correspond to a destination (step 1610), the decision unit 1110 sends the information to the ring output 1120, which places information back on the ring (e.g., ring 1030, 1330, and/or 1332) (step 1620). If the decision unit 1110 determines that it does correspond to a destination (step 1610), the decision unit 1110 checks to see if the output queue (e.g., output queue 206 or 306) is full. If the output queue is full (step 1730), the decision unit 1120 passes the information to the ring output 1120, which places the information back on the ring (step 1620). Otherwise, the decision unit 1110 places the information in the output queue for further processing (step 1640). Having removed information from the ring (e.g., the ring 1030, 1330, and/or 1332), the decision unit 1110 can place information in from the OIC 318 or a no-operation instruction onto the ring. The decision unit 1110 checks the status of the OIC 318 to determine whether information is available. If information is available (step 1650), the information is removed from the OIC 318 by the decision unit 1110 and is passed to the ring output 1120 to be placed on ring (step 1660). Otherwise, the decision unit 1110 generates a no-operation instruction to be placed on the ring (step 1670). In some instances, the decision unit 1110 can receive a no-operation instruction from the ring. In this case, the decision unit 1110 can check whether information is available in the OIC 318. If information is available, the decision unit 1110 can place the information onto the ring and delete the no-operation instruction. If no information is available, the decision unit 1110 can simply place the no-operation instruction back on the ring.

Figure 17:
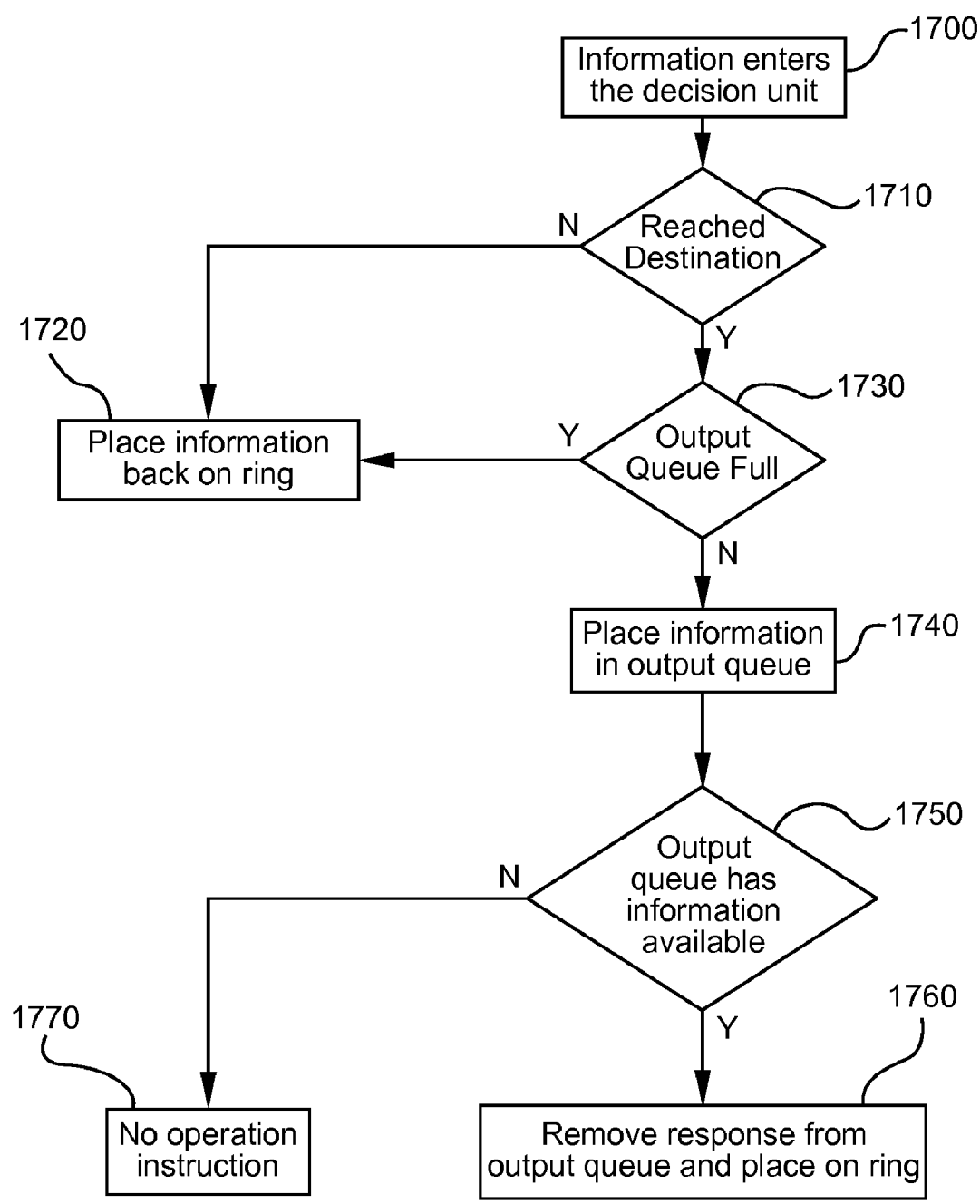
FIG. 17 depicts a flow diagram of the operation of another decision unit in a ring routing module.

FIG. 17 depicts a flow diagram of a preferred operation of the decision unit 1210. The decision unit 1210 can receive information from the ring input 1220 (step 1700). The decision unit 1210 determines whether it corresponds to a destination for the information based on one or more identifiers included in the information. If the decision unit 1210 determines that it does not correspond to a destination (step 1710), the decision unit 1210 sends the information to the ring output 1230, which places information back on the ring (e.g., ring 1030, 1330, and/or 1332) (step 1720). If the decision unit 1210 determines that it does correspond to a destination (step 1710), the decision unit 1210 checks to see if the input queue (e.g., input queue 204 or 304) is full. If the input queue is full (step 1730), the decision unit 1210 passes the information to the ring output 1230, which places the information back on the ring (step 1720). Otherwise, the decision unit 1210 places the information in the input queue for further processing (step 1740). Having removed information from the ring (e.g., the ring 1030, 1330, and/or 1332), the decision unit can place information in the form of a response or a no-operation instruction onto the ring. The decision unit 1210 checks the status of the output queue 306 to determine whether a response is available. If a response is available (step 1750), the response is removed from the output queue 306 by the decision unit 1210 and is passed to the ring output 1230 to be placed on the ring (step 1760). Otherwise, the decision unit 1210 generates a no-operation instruction to be placed on the ring (step 1770). In some instances, the decision unit 1210 can receive a no-operation instruction from the ring. In this case, the decision unit can check whether a response is available in the output queue 306. If a response is available, the decision unit 1210 can place the response onto the ring and delete the no-operation instruction. If no responses are available, the decision unit 1210 can simply place the no-operation instruction back on the ring.

In some embodiments, the memory modules 102, the data routing modules (e.g., inner routing modules 104, outer routing modules 106, routing memory modules 702, routing modules 904, ring routing modules 1010, 1310, and 1320, etc.), and/or the data interface modules 108 can be integrated on a single semiconductor die. For example, the hierarchical architecture of FIG. 1A can be implemented so that each of the groups 10 and their corresponding inner routing module 104 can be integrated on a single semiconductor die, while the outer routing module 106 and the data interface module 108 can be formed on one or more semiconductor dies. The device 100 can be configured in a multi-chip module (MCM) using known configurations. For example, each semiconductor die can be positioned in a side-by-side configuration or a stacked die configuration. In other embodiments, the device 100 can be implemented so that various modules of the device 100 are in separate chips that are communicatively coupled. In yet other embodiments, a semiconductor wafer-based implementation can be used, where one or more wafers can form the device 100. In the case where more than one (1) wafer is used, some of the wafers can include metal bumps disposed on the wafer and other wafers can include through-holes etched in the wafer for receiving the metal bumps. The metal bumps can engage the etched through-holes to communicatively couple the wafers. One or more of the modules may be implemented using MEMS technology. For example, components of the routing modules or memory modules can be implemented using MEMS technology.

While preferred embodiments of the present invention have been described herein, it is expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

What is claimed:

1. A data storage device comprising:
   an outer routing module receiving data to be stored in the data storage device;
   a plurality of inner data routing modules operatively coupled to the outer routing module, the outer routing module routing the data to the plurality of inner routing modules based on at least one identifier;
   a first plurality of memory modules operatively coupled to a first one of the inner data routing modules, the first plurality of memory modules configured to receive the data from the first one of the plurality of inner data routing modules and, wherein at least one of the first plurality of memory modules includes non-volatile memory for storing at least a portion of the data;
   a plurality of buses including at least first and second buses through which the data is routed, the first and second buses being decoupled by the first one of the inner data routing modules to permit concurrent operation of the first and second buses, the first one of the inner data routing modules being configured to route the data to at least one of the memory modules in the first plurality of memory modules through at least one of the first bus or the second bus; and
   means for controlling the flow of the data in the data storage device, wherein routing of the data between the outer routing module and the memory modules via the buses is controlled based on flow control information utilized by at least one of the outer routing module and the inner routing modules to determine when to transmit the data via the buses, the flow control information being related to an ability of the outer routing modules, the inner routing modules, or the memory modules to process the data such that timing of transmission of the data is determined in part by availability of the data.

2. The data storage device of claim 1, further comprising:
   extra normally unavailable memory for storing a portion of the data when one or more memory locations fail, the data storage device remapping memory locations that fail to the extra memory in order to increase an available number of read/write cycles and the at least one data routing module routing the data to the extra memory location based on the remapping.

3. The data storage device of claim 1, further comprising:
   at least one data interface module for facilitating communication between the data storage device and an external device.

4. The data storage device of claim 1, wherein at least one of the inner routing modules includes memory for storing at least a portion of the data.

5. The data storage device of claim 1, wherein the plurality of inner data routing modules and the plurality of memory modules are configured hierarchically so that the outer data routing module connects to the plurality of inner data routing modules through the first bus and the first one of the plurality of inner data routing modules connects to the first plurality of memory modules through the second bus.

6. The data storage device of claim 1, wherein the plurality of inner data routing modules are configured to form a ring and wherein the data is routed around the ring based on the at least one identifier.

7. The data storage device of claim 1, wherein the at least one data routing module holds the data in a queue before the data is routed.

8. The data storage device of claim 1, wherein operation of the first bus and the second bus is performed with at least one of different frequencies and different electrical levels.

9. The data storage device of claim 1, wherein at least one of the memory modules or the at least one inner data routing module is configured to:
   remain in a low power state until receipt of a look-ahead signal;
   enter a high power state upon receipt of the look ahead signal; and reenter low power state when no operation is pending therein.

10. The data storage device of claim 1, wherein at least one of the memory modules or at least one of the inner data routing modules is configured to:
   generate a full signal to prevent data from being sent thereto; and
   generate an available signal to indicate data is available to be passed therefrom.

11. The data storage device of claim 1, wherein increasing the number of memory modules increases a data transfer rate within the storage device.

12. The data storage device of claim 1, wherein the data storage device performs data transfer at a rate in excess of about 16 GB/s and has a volume to storage capacity ratio of about 16 cubic centimeters (cm3) per terabyte (TB).

13. The data storage device of claim 1, wherein one or more of the at least one of the inner data routing modules or the plurality of the memory modules are configured to:
   determine whether a temperature exceeds a predetermined threshold temperature;
   reduce power needs by powering down based on the determination that the temperature exceeds the predetermined threshold; and
   generate a signal when powered down to prevent the data from being sent thereto.

14. The data storage device of claim 1, further comprising:
   a second plurality of memory modules operatively coupled to a second one of the inner data routing modules, the second plurality of memory modules configured to receive data from the second one of the plurality of inner data routing module.

15. The data storage device of claim 1, wherein at least a portion of the inner data routing modules are connected in series.

16. The data storage device of claim 1, wherein at least a portion of the inner data routing modules are connected in parallel.

17. A data storage device comprising:
   a plurality of data routing modules configured to route data to a storage destination in the data storage device based on at least one identifier, wherein at least one of the data routing modules includes non-volatile memory for storing at least a portion of the data;
   a plurality of buses through which the data is routed, the plurality of buses connecting the plurality of data routing modules to each other so that at least three of the data routing modules are connected in a series or parallel, at least two of the buses being decoupled by one of the data routing modules to permit concurrent operation of the at least two buses and wherein the plurality of data routing modules are configured to route the data through at least one of the plurality of buses to a storage destination; and
   means for controlling the flow of the data in the data storage device, wherein routing of the data between the routing modules and the storage destination via the buses is controlled based on flow control information utilized by at least one of the routing modules to determine when to transmit the data via the buses, the flow control information being related to an ability of the routing modules or the memory modules to process the data such that timing of transmission of the data is determined in part by availability of the data.

18. The data storage device of claim 17, further comprising:
   at least one memory module, the at least one memory module providing the storage destination and comprising non-volatile memory for storing at least a portion of the data, the at least one memory module interconnected with at least one of the data routing modules.

19. A data storage device comprising:
   a plurality of memory modules, at least one of the memory modules including a non-volatile memory for storing data;
   at least one data interface module for facilitating communication between the memory modules and an external device;
   a plurality of data routing modules including first, second, and third data routing modules each having at least two target queues, wherein at least one of the data routing modules is configured to:
      receive data to be routed from the at least one data interface module, the data being associated with at least one identifier identifying a destination for the data;
      separate the data into the at least two target queues based on the destination of the data, wherein each of the at least two target queues identifies a unique path for routing the data; and
      route the data to the destination via the unique path, the destination corresponding to one or more of the memory modules,
   the first data routing module being coupled to a second data routing module, a third data routing module, and the at least one data interface module, the second data routing module being communicatively coupled to a first group of the plurality of memory modules and the third data routing module being communicatively coupled to a second group of the plurality of memory modules,
   the first group of plurality of memory modules including at least two memory modules and the second data routing module determining to which of the at least two memory modules to route the data; and
   means for controlling the flow of the data in the data storage device, wherein routing of the data between the first routing module and the memory modules is controlled based on flow control information utilized by at least one of the first routing module, the second routing module, and the third routing module to determine when to transmit the data, the flow control information being related to an ability of the first routing module, the second routing module, the third routing module, or the memory modules to process the data such that timing of transmission of the data is determined in part by availability of the data.

20. The data storage device of claim 19, wherein the first data routing module comprises:
   a first target queue corresponding to the second data routing module; and
   a second target queue corresponding to the third data routing module,
   wherein the first data routing module separates the data into the first target queue and the second target queue based on identifiers associated with the data.

21. The data storage device of claim 19, wherein the second data routing module separates the data into queues based on the at least one identifier, each of the queues corresponding to one of the memory modules in the first group.

22. The data storage device of claim 19, further comprising a first bus and a second bus through which the data is routed, the first and second buses being decoupled by the at least one of the data routing modules to permit the memory modules to carry out operations concurrently.

23. A method for routing data in a data storage device comprising the steps of:
   providing a plurality of data routing modules configured to route data within the data storage device based on at least one identifier;
   providing a plurality of memory modules, the plurality of memory modules configured to receive the data from the data routing modules, wherein at least one of the memory modules includes non-volatile memory for storing at least a portion of the data;
   providing a plurality of buses including at least first and second buses through which the data is routed;
   decoupling the first and second buses with at least one of the data routing modules to permit concurrent operation of the first and second bus;
   receiving the data to be routed by a first one of the data routing modules, the data being associated with at least one identifier identifying one or more target memory module destinations for the data;
   controlling the flow of the data in the data storage device, wherein routing of the data between the routing modules and the memory modules is controlled based on flow control information utilized by at least one of the routing modules to determine when to transmit the data, the flow control information being related to an ability of one or more of the routing modules or the memory modules to process the data such that timing of transmission of the data is determined in part by availability of the data;
   routing the data to at least one of a second data routing module and a third data routing module from the first data routing module based on the at least one identifier, the second data routing module connecting to a first subset of the plurality of memory modules and the third data routing module connecting to a second subset of the plurality of memory modules;
   routing the information to one or more target memory modules through at least one of the first bus or the second bus; and
   processing an instruction included in the information to perform one of storing data or retrieving data from the memory of the target memory modules.

24. The method of claim 23, wherein the routing step comprises:
   routing the data using a first bus connecting a first one of the data routing modules to a remainder of the data routing modules; and
   routing the data using a second bus connecting a first one of the remainder of the data routing modules to the target memory module.

25. The method of claim 23, further comprising:
   receiving data to be routed by a second one data routing module, the data being associated with at least one identifier identifying another target memory module destination for the data;
   routing the data to the other target memory module through a third bus,
   processing an instruction associated with the data to perform one of storing the data or retrieving other data from the memory of the other target memory modules, the processing occurring concurrently with the processing of the by the target memory module.

26. The method of claim 23, further comprising:
   storing the data in a queue after the data is received, but before the data is routed, wherein the step of routing removes the data from the queue and routes the data.

27. A data storage device comprising:
   at least one data interface module for facilitating communication between the data storage device and an external device; and
   a plurality of data routing modules, a first one of the plurality of data modules being operatively coupled to the at least one data interface module and having an output that is operatively coupled to an input of a second one of the plurality of data routing modules, an output of the second one of the plurality of data routing modules being operatively coupled to an input of a third one of the plurality of data routing modules, an output of the third data routing module begin operatively coupled to an input of the first data routing module;
   the plurality of data routing modules being configured to store incoming data and transmit outgoing data enabling the data routing module to route information to a storage destination based on at least one identifier included in the information; and
   means for controlling the flow of the data in the data storage device, wherein routing of the data around the routing modules is controlled based on flow control information utilized by at least one of the routing modules to determine when to transmit the data, the flow control information being related to an ability of the routing modules to process the data such that timing of transmission of the data is determined in part by availability of the data.

28. The data storage device of claim 27, wherein the output of the third data routing module is operatively coupled to the input of the first data routing module through at least a fourth data routing modules.

* * * * *